United States Patent
Hiraishi et al.

(10) Patent No.: US 8,086,636 B2
(45) Date of Patent: Dec. 27, 2011

(54) DATA STORAGE SYSTEM, DATA STORAGE SERVER APPARATUS, CONTROL METHOD, AND PROGRAM FOR STORING DATA ON A SERVER APPARATUS ON A NETWORK

(75) Inventors: Tomonobu Hiraishi, Ohta-ku (JP); Hiroshi Satomi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 517 days.

(21) Appl. No.: 11/152,414

(22) Filed: Jun. 14, 2005

(65) Prior Publication Data

US 2005/0289117 A1 Dec. 29, 2005

(30) Foreign Application Priority Data

Jun. 23, 2004 (JP) .................................. 2004-185027
Jun. 23, 2004 (JP) .................................. 2004-185028

(51) Int. Cl.
*G06F 7/00* (2006.01)
*G06F 17/30* (2006.01)

(52) U.S. Cl. .......................... 707/784; 707/782; 707/783

(58) Field of Classification Search ............ 707/9, 104.1
See application file for complete search history.

(56) References Cited

U.S. PATENT DOCUMENTS

| | | | | |
|---|---|---|---|---|
| 6,035,323 A * | 3/2000 | Narayen et al. | ............... | 709/201 |
| 6,301,586 B1 * | 10/2001 | Yang et al. | ................. | 707/104.1 |
| 7,120,687 B1 * | 10/2006 | Tessman et al. | ............. | 709/224 |
| 7,206,781 B2 * | 4/2007 | Miyamoto et al. | ................ | 707/9 |
| 2005/0120055 A1 * | 6/2005 | Kawaguchi | ................ | 707/104.1 |
| 2005/0160094 A1 * | 7/2005 | Morgenstern et al. | ............ | 707/9 |

FOREIGN PATENT DOCUMENTS

| JP | 2002366479 A | 12/2002 |
|---|---|---|
| JP | 2003150489 A | 5/2003 |

\* cited by examiner

*Primary Examiner* — Tim T Vo
*Assistant Examiner* — Garrett Smith

(57) ABSTRACT

A data storage system requires no special operation by owner users (who make data available) and provides guest users (who view the data) with ease of management of information required to access the data. For example, a URL providing access to data is issued in association with the combination of an owner user and a guest user. This provides ease of information management since only a single URL is required for a guest user to access a plurality of data made available by one owner user.

5 Claims, 41 Drawing Sheets

FIG. 6

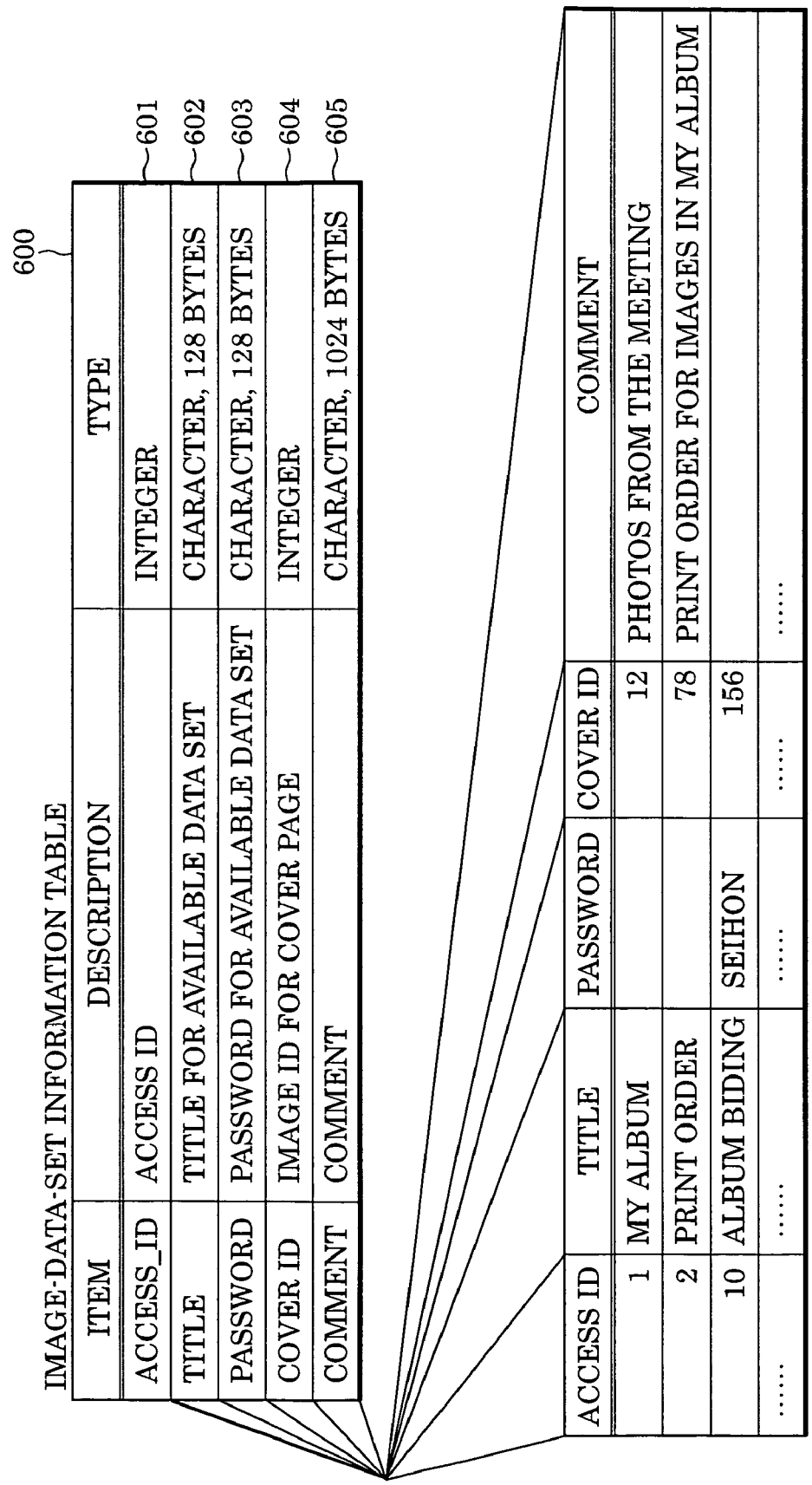

IMAGE-DATA-SET INFORMATION TABLE

| ITEM | DESCRIPTION | TYPE |
|---|---|---|
| ACCESS_ID | ACCESS ID | INTEGER |
| TITLE | TITLE FOR AVAILABLE DATA SET | CHARACTER, 128 BYTES |
| PASSWORD | PASSWORD FOR AVAILABLE DATA SET | CHARACTER, 128 BYTES |
| COVER ID | IMAGE ID FOR COVER PAGE | INTEGER |
| COMMENT | COMMENT | CHARACTER, 1024 BYTES |

| ACCESS ID | TITLE | PASSWORD | COVER ID | COMMENT |
|---|---|---|---|---|
| 1 | MY ALBUM | | 12 | PHOTOS FROM THE MEETING |
| 2 | PRINT ORDER | | 78 | PRINT ORDER FOR IMAGES IN MY ALBUM |
| 10 | ALBUM BIDING | SEIHON | 156 | |
| ...... | | | | |

FIG. 9

ADDRESS BOOK — 900

| ADD ADDRESS — 901 | DELETE ADDRESS — 902 | SELECT ALL — 903 | DESELECT ALL — 904 |

| TO | NAME | EMAIL ADDRESS | ACCESS URL |
|---|---|---|---|
| ☑ | ○△□ | aaa@○△□.com | http://○○○.com/PhotoSite/Album/AlbumEntry.cgi?accessID=XXXXX |
| ☐ | △□○ | bbb@△□○.jp | http://○○○.com/PhotoSite/Album/AlbumEntry.cgi?accessID=YYYYY |
| ☑ | □○△ | ccc@□○△.net | http://○○○.com/PhotoSite/Album/AlbumEntry.cgi?accessID=ZZZZZ |

— 905

PROCEED TO MAILING — 906

FIG. 10

ADD ADDRESS — 1000

| OK — 1003 | CANCEL — 1004 |

| NAME | EMAIL ADDRESS |
|---|---|
| (1001) | (1002) |

FIG. 12

Date: Fri,19 Mar 2004 11:19:08+09
From: PhotoSite<△△△@×××.co.jp>
To:aaa@○△□.com
Subject: Album posted !
Error-to: △△△@×××.co.jp
Content-Type:text/plain;charset=" ISO-2022-JP"
Content-Transfer-Encoding:7bit <Taro Canon> has posted an album titled "My album" for you !

Click on the following URL to view the album:
http://○○○. com/PhotoSite/Album/AlbumEntry.cgi?accessID=XXXXX This is a private URL that allows you to view albums and other resources provided by <Taro Canon>.
Please bookmark the URL for future use.

-- MESSAGE FROM SENDER --
Photos from the previous meeting have been uploaded.
Please contact me upon receipt.
-- END OF MESSAGE --

GUEST USER URL TABLE 2400

| ITEM | TYPE |
|---|---|
| GUEST USER NUMBER | INTEGER | 2401
| GUEST USER EMAIL ADDRESS | CHARACTER, 128 BYTES | 2402
| ACCESS URL | CHARACTER, 128 BYTES | 2403
| GUEST USER PASSWORD | CHARACTER, 16 BYTES | 2404
| GUEST USER PRINT ORDER FLAG | CHARACTER, 8 BYTES | 2405

| GUEST USER NUMBER | GUEST USER EMAIL ADDRESS | ACCESS URL | GUEST USER PASSWORD | GUEST USER PRINT ORDER FLAG |
|---|---|---|---|---|
| a123 | aaa@○○□.com | http://○○○.com/PhotoSite/Album/Album Entry.cgi?access ID=XXXXX | 1234 | 2 |
| a246 | bbb@△□○.jp | http://○○○.com/PhotoSite/Album/Album Entry.cgi?access ID=YYYYY | ab12 | 3 |
| ...... | ...... | ...... | ...... | ...... |
| b135 | ccc@□○△.net | http://○○○.com/PhotoSite/Album/Album Entry.cgi?access ID=ZZZZZ | 33cd | 1 |

DATA STORAGE SYSTEM, DATA STORAGE SERVER APPARATUS, CONTROL METHOD, AND PROGRAM FOR STORING DATA ON A SERVER APPARATUS ON A NETWORK

BACKGROUND OF THE INVENTION

1. Field of the Invention

The present invention relates to a data storage system, data storage server apparatus, control method, and program for storing data on a server apparatus on a network such that the data can be shared among client apparatuses.

2. Description of the Related Art

One information service based on a communication infrastructure, such as the Internet, is a service that enables users to upload image data captured by a digital camera to a storage area on a server apparatus, and allows users to access the server apparatus to view uploaded image data at any time. A network service provider with such a server apparatus will be hereinafter referred to as "photo site".

A case is described here in which a known photo site makes data from a user who uploaded the data (hereinafter referred to as "owner user") available to a third party designated by the owner user (hereinafter referred to as "guest user").

First, an owner user launches a Web browser on a personal computer (PC), accesses a photo site, uploads data, and informs the photo site of a guest user's name, email address, and the like. The photo site creates a universal resource locator (URL) for providing access to the uploaded data. The URL is an address unique to the data and is created, for example, using a table of random numbers uniquely unpredictable. An example of such a URL is as follows:

http://OOO.com/PhotoSite/Album/
AlbumEntry.cgi?AlbumID=A JNWDMF

The photo site sends an email message including the URL in the message field and the guest user's email address in the receiver field via the Internet. Upon receipt of the email message, the guest user launches a Web browser on a PC, enters the URL included in the email message, and is thus permitted to view the data of the owner user.

A problem of such a known technology is that since the URL is issued to each data, a different URL must be created for each data or a different email message must be created and sent for each URL created, if a plurality of data is made available by one or more owner users.

Moreover, it is extremely cumbersome for the guest user to receive many email messages and manage URLs issued to each data from the owner users.

To view particular image data many times, the guest user, for example, registers the URL of the image data in a bookmark in the browser to have easy access to the image data without entering the URL. However, if a URL is issued every time image data is made available, the user has to go though the cumbersome process of adding a long list of URLs to the bookmark. Moreover, every time an owner user deletes data from the photo site, the guest user must delete the URL for the data to organize the bookmark.

Furthermore, although the guest user can send a print order to the photo site for image data made available by an owner user, it is cumbersome to select image data and to configure settings, such as the type of paper suitable for the image data and paper size.

SUMMARY OF THE INVENTION

The present invention is directed to a system that requires no special operation by owner users and provides guest users with ease of management of information required to access data made available by the owner users.

According to an aspect of the present invention, a data storage system managing data in a data storage apparatus on a network includes: an authenticating unit configured to authenticate a first user ID; a storing unit configured to store data in the data storage apparatus with the data being associated with the first user ID authenticated by the authenticating unit; a designating unit configured to designate a second user ID; a generating unit configured to generate, based on the first user ID and the second user ID, access information for accessing data stored in the data storage apparatus; and an informing unit configured to send, based on the second user ID, the access information generated by the generating unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 shows an example of an image-data-set information table of the present invention.

FIG. 9 shows an example of an address book screen of the present invention.

FIG. 10 shows an example of an address addition screen of the present invention.

FIG. 12 shows an example of an email message for image availability notification in the present invention.

FIG. 19 shows an example of a print order screen of the present invention.

FIG. 24 shows an example of a guest-user URL table of the present invention.

DESCRIPTION OF THE EMBODIMENTS

First Embodiment

An exemplary embodiment of the present invention will now be described in detail with reference to the drawings. Unless otherwise specified, the scope of the present invention is not limited to the relative arrangement of components, display screen, and the like that are described in the present embodiment.

<Structure of Data Storage System>

First, a data sharing system for providing an image data sharing service via the Internet will be described as an embodiment of the present invention.

Figure 1:
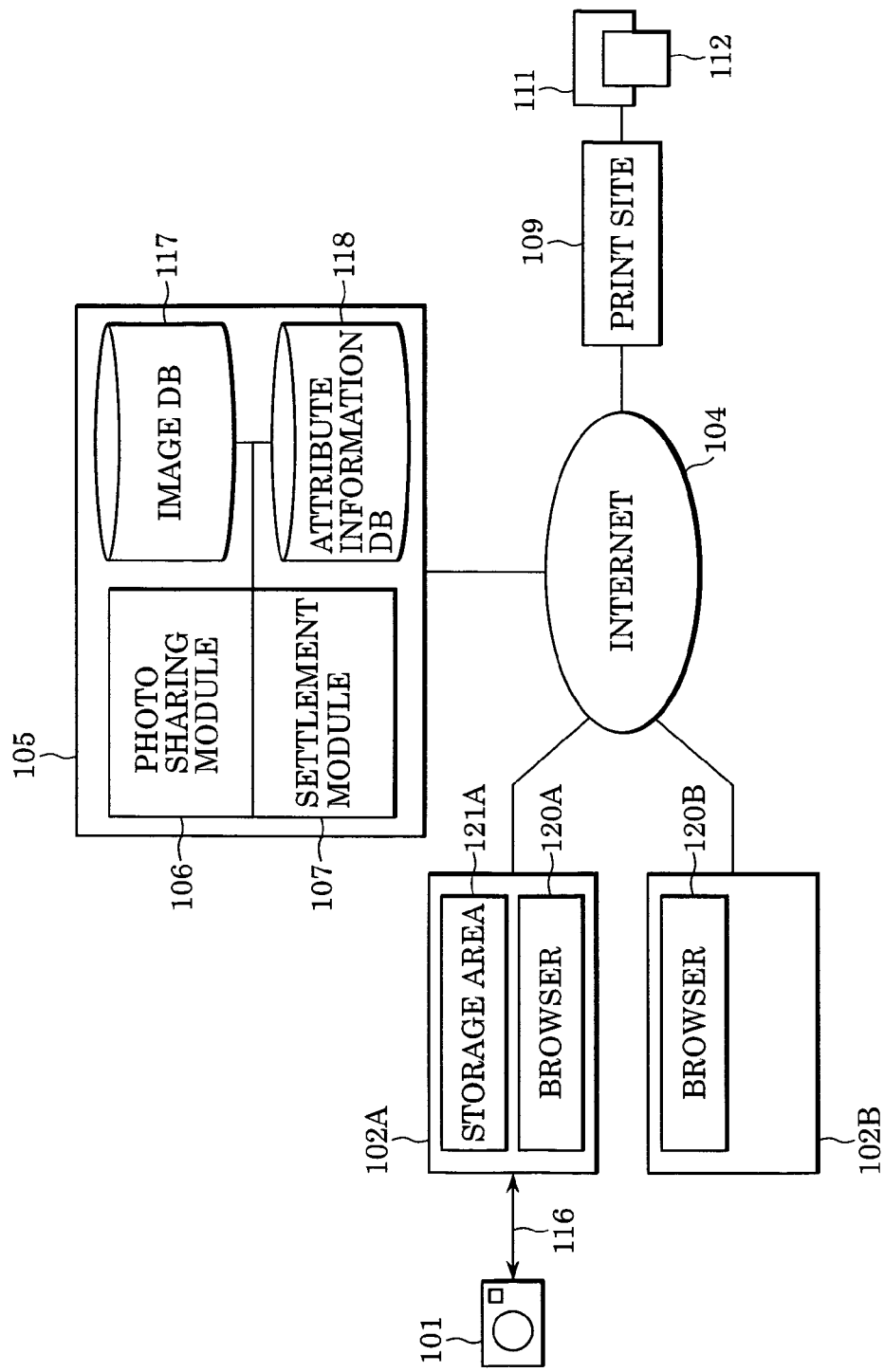
FIG. 1 shows an overall structure of a data storage system according to the present invention.

FIG. 1 shows the overall structure of a data storage system as an embodiment of the present invention. In the following description, a party who uploaded image data to a photo site on the Internet is called an "owner user", and a third party who is permitted to view image data provided by the owner user is called a "guest user".

An image input apparatus 101 in FIG. 1 is, for example, a digital still camera capable of capturing images of subjects and recording the captured images as still image data, a digital video camera capable of capturing images of subjects and recording the captured images as moving image data, and a scanner capable of scanning documents and recording the scanned documents as still image data. After the conversion of optical images (image information) into electrical signals, and predetermined image processing, the image input apparatus 101 records and reproduces the image information as digital information.

In the data storage system, an owner user uses an owner PC 102A and a guest user uses a guest PC 102B.

A data transfer interface 116 is for transferring image data input by the image input apparatus 101 to the owner PC 102A. The data transfer interface 116 is, for example, a wired interface typified by a universal serial bus (USB) device and an IEEE 1394 device, a wireless interface typified by an IrDA device or a short range wireless device, such as a BLUETOOTH® device. Image data transferred from the image input apparatus 101 via the data transfer interface 116 to the owner PC 102A is stored in a storage area 121A of an information storage device, typified by a hard disk drive (HDD), of the owner PC 102A. The transfer of image data from the image input apparatus 101 to the owner PC 102A is performed by a central processing unit (CPU) that runs an operating system (OS) or special-purpose software installed on the owner PC 102A to read image data stored in a storage area of the image input apparatus 101. Alternatively, in response to a transfer command issued from the image input apparatus 101 to the owner PC 102A, the OS or special-purpose software on the owner PC 102A reserves a space in the storage area 121A to accommodate image data from the image input apparatus 101, thus transferring the image data from the image input apparatus 101 to the owner PC 102A.

A photo site 105 is composed of server apparatuses of a provider providing users' terminals (such as the owner PC 102A and the guest PC 102B) with various services using the Internet 104 as a communication infrastructure. Of services provided by the photo site 105, the present embodiment deals with a service for storing image data sent from the owner PC 102A via the Internet 104, a service for making such stored image data available to the guest PC 102B, and a service for sending a request for printing stored image data to one of print sites 109, where a printer 111 is used to output printed material 112 from image data. These services will be described in the present embodiment.

The photo site 105 is composed of a plurality of server apparatuses that independently or collectively implement functions described below. The photo site 105 includes database apparatuses. An image database 117 stores image data sent from the owner PC 102A and a low-resolution image (thumbnail) of the image data. An attribute information database 118 unifies various types of data, such as attributes of image data stored in the image database 117, attributes of owner and guest users registered in the photo site 105, and attributes of the print sites 109 to which a request for prints from image data is sent.

An owner browser 120A and a guest browser 120B are installed on the owner PC 102A and the guest PC 102B, respectively, and use a standard protocol, such as an HTTP protocol, that allows data transfer via the Internet 104. The owner browser 120A and the guest browser 120B access the photo site 105 using a standard protocol and display information that is managed on the server apparatuses of the photo site 105, created using a markup language, such as HTML and XML, and linked to multimedia information, such as image data and audio data. This operation enables the photo site 105 to provide the owner PC 102A and the guest PC 102B with services using the Internet 104 as a communication infrastructure.

At least one of the server apparatuses in the photo site 105 includes a photo sharing module 106 that is executed by the CPU of the server apparatus.

In the present embodiment, the owner PC 102A and the guest PC 102B will be taken as examples to describe terminals used by owner users and guest users. However, they may be other terminals, such as camera cell-phones and digital cameras, digital video cameras, scanners, and copiers with communication functions. In other words, the image input apparatus 101 may be incorporated in the owner PC 102A and the guest PC 102B.

<Database Structure>

Tables maintained, by the photo site 105, in the attribute information database 118 will now be described with reference to FIGS. 2 to 8.

Figure 2:
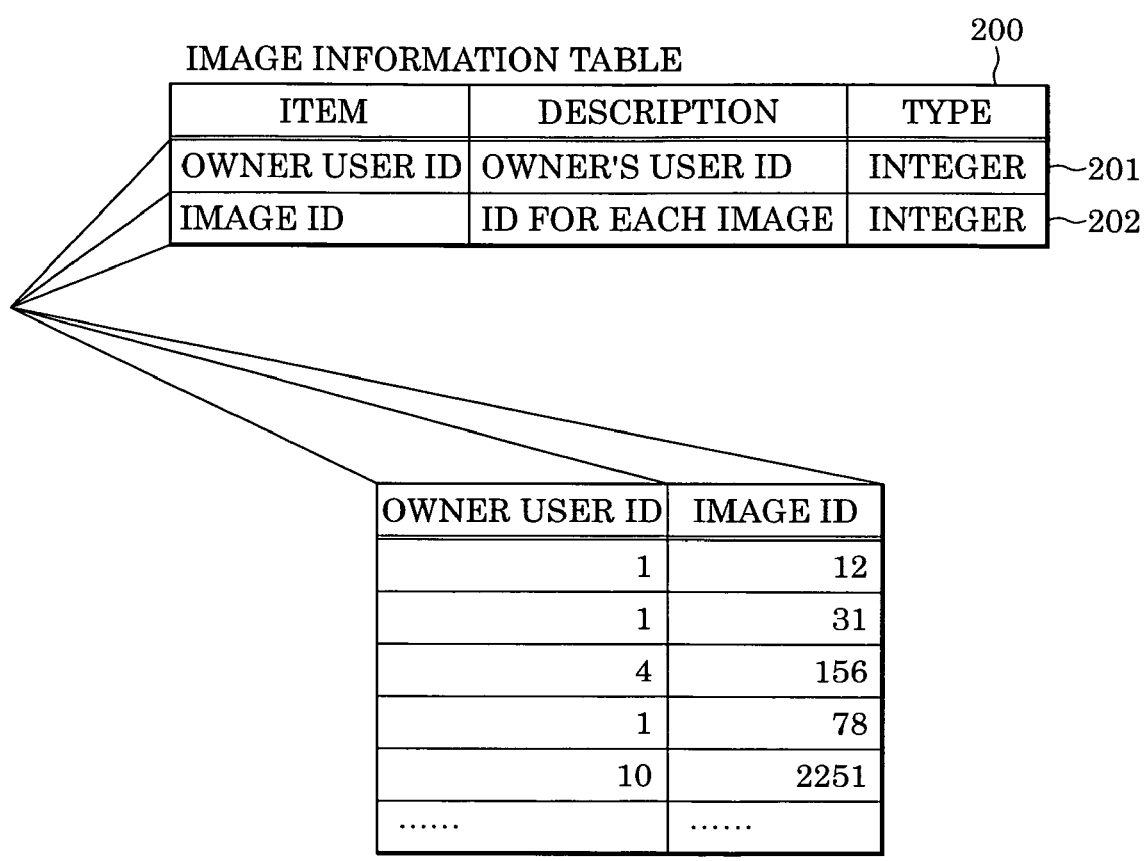
FIG. 2 shows an example of an image information table of the present invention.

FIG. 2 shows an example of an image information table. Every time image data of an owner user is uploaded, the photo site 105 creates a new record in an image information table 200 while issuing an image ID for each image data. In response to the deletion of image data from the image database 117, the corresponding record is deleted from the image information table 200. In the image information table 200, an image ID 202 for each image data uploaded by owner users is managed using an owner user ID 201 as a key.

Figure 3:
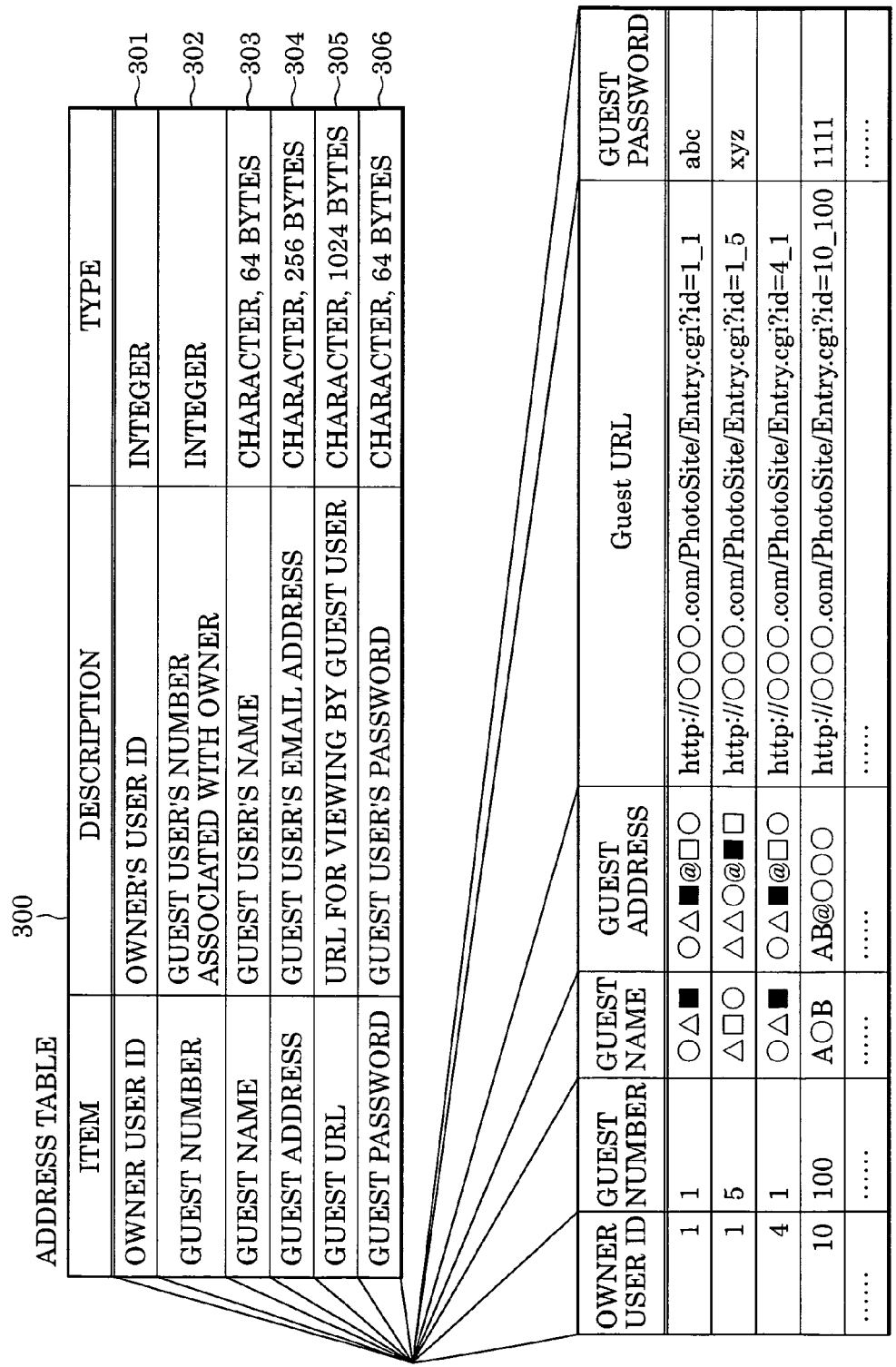
FIG. 3 shows an example of an address table of the present invention.

FIG. 3 shows an example of an address table. When an owner user registers, in an address management mechanism including an address book (hereinafter collectively referred to as "address book"), the address of a guest user to which a notification that image data has been made available is directed, the photo site 105 creates a new record in an address table 300 while issuing a guest user number and a guest URL. In the address table 300, a guest name 303, a guest address 304, a guest URL 305, and a guest password 306 to be used for viewing image data are managed using an owner user ID 301 and a guest user number 302 as keys. The address table 300 associates a guest URL with the combination of an owner user and a guest user. A record in the address table 300 is deleted when the photo site 105 receives a deletion instruction from the owner PC 102A according to the settings of an address book.

Figure 4:
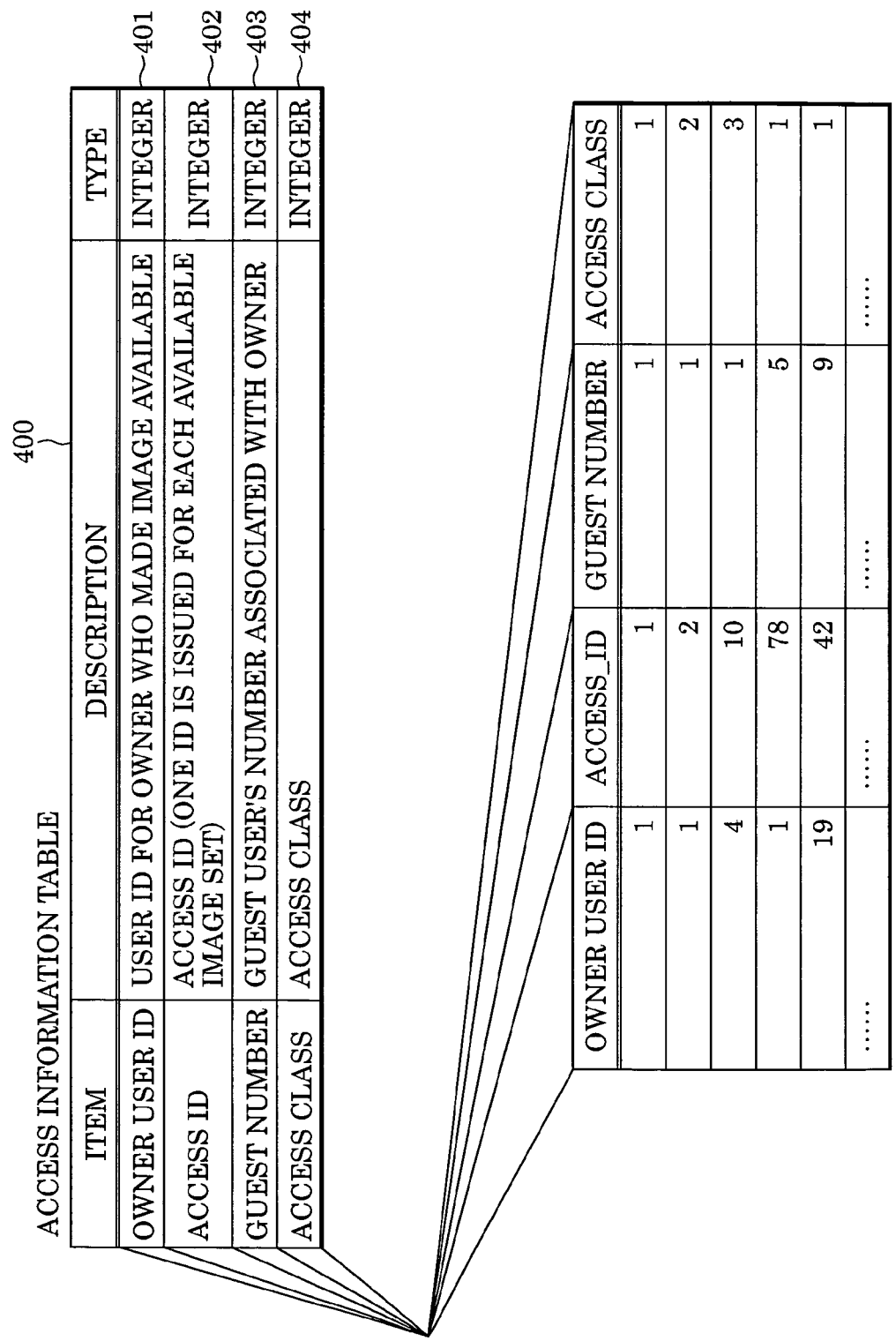
FIG. 4 shows an example of an access information table of the present invention.

FIG. 4 shows an access information table. A record is created in an access information table 400 when a notification that image data or an album has been made available, or that print order information has been made available is sent to a guest user. In the case of image data or an album, a record is deleted from the access information table 400 if the owner PC 102A sends the photo site 105 an instruction to cancel the availability of the image data or album to the guest user, or an instruction to delete the image data or album from the image database 117 in the photo site 105. As for print order information, a record is deleted from the access information table 400 if an owner user sends the photo site 105 an instruction to cancel the availability of the print order information to the guest user, or an instruction to delete, from the image database 117 in the photo site 105, any of images from which prints have been ordered. In the access information table 400, an access ID 402 and an access class ID 404 are managed using an owner user ID 401 and a guest user number 403 as keys. The access ID 402 is assigned to image data, an album, and print order information that are made available by an owner user. The access class ID 404 is defined in an access class table 700 in FIG. 7 to specify the type of availability. For example, the access class ID is set to "1" for making a set of images available in the form of an album, and is set to "2", for making a set of images available in the form of print order information. Further details will be given later in the description for the access class table 700.

Since, in the access information table 400, a plurality of access IDs 402 and access class IDs 404 are managed with respect to the owner user ID 401 and the guest user number 403, the guest URL 305 in the address table 300 can be associated with the plurality of access IDs 402 and access class IDs 404. Therefore, by entering a single guest URL, a guest user can access various types of image data sets, such as an album containing archived image data of an owner user, and a group of image data from which an owner user ordered prints.

Figure 5:
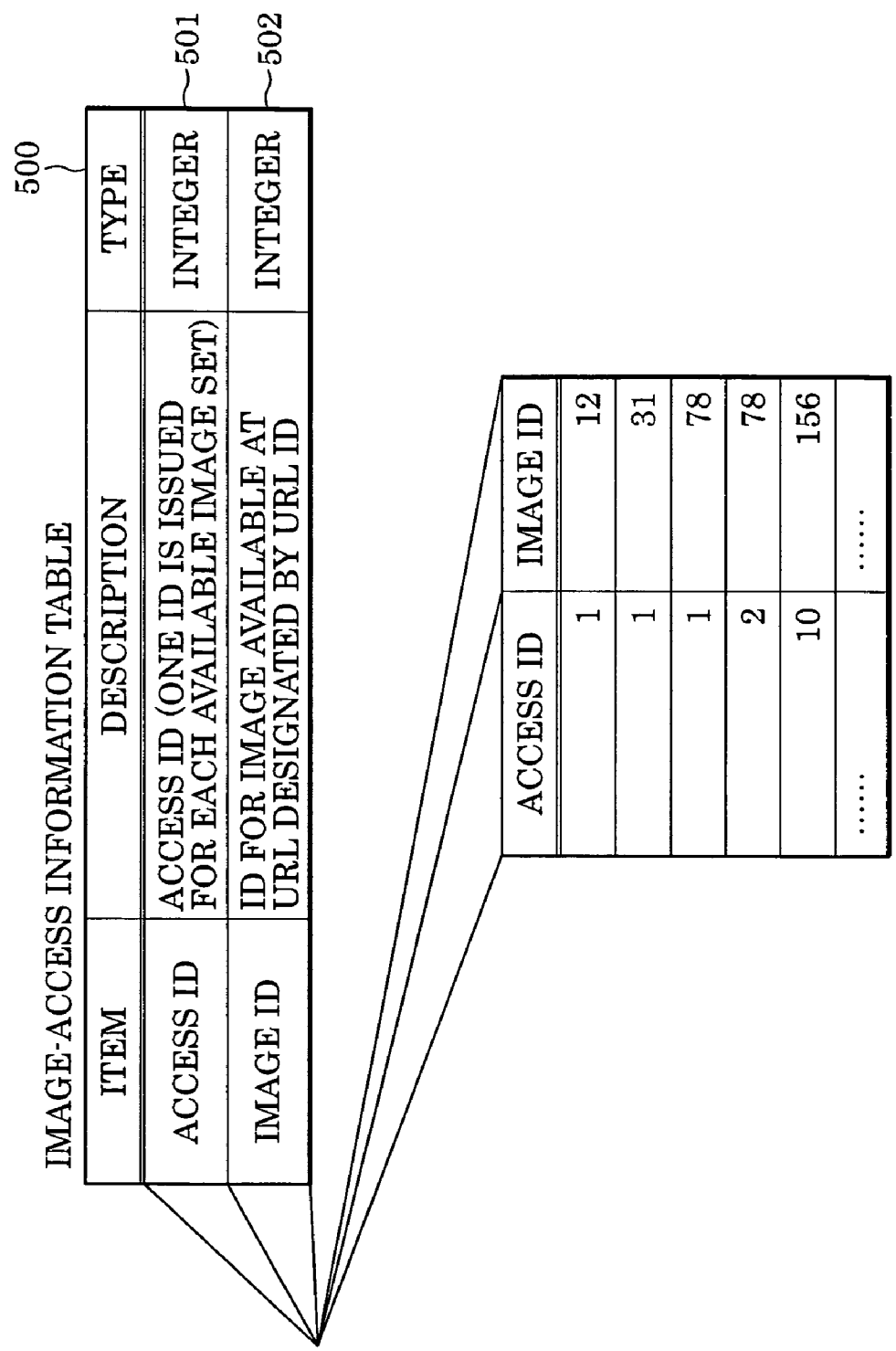
FIG. 5 shows an example of an image-access information table of the present invention.

FIG. 5 shows an image-access information table. A record is created in an image-access information table 500 when a notification that image data or an album has been made available, or that print order information has been made available is sent to a guest user. In the case of image data or an album, a record is deleted from the image-access information table 500 if the owner PC 102A sends the photo site 105 an instruction to cancel the availability of the image data or album to the guest user, or an instruction to delete the image data or album. As for print order information, a record is deleted from the image-access information table 500 if an owner user sends the photo site 105 an instruction to cancel the availability of the print order information to the guest user, or an instruction to delete, from the image database 117 in the photo site 105, any of images from which prints have been ordered. In the image-access information table 500, an image ID 502 is managed using an access ID 501 as a key. Images can be made available on an image-by-image basis by limiting the number of image IDs 502 that can be registered with respect to an access ID 501 to one. On the other hand, by permitting a plurality of image IDs 502 to be registered, images can be made available on an album-by-album basis, each album containing a plurality of archived image data, or available on a per print-order basis, each print order containing a plurality of image data.

FIG. 6 shows an image-data-set information table 600. The image-data-set information table 600 stores attribute information for image data sets made available to a guest user by an owner user. A record is created in the image-data-set information table 600 when a notification that image data or an album has been made available, or that print order information has been made available is sent to a guest user. In the case of image data or an album, a record is deleted from the image-data-set information table 600 if the owner PC 102A sends the photo site 105 an instruction to cancel the availability of the image data or album to the guest user, or an instruction to delete the image data or album. As for print order information, a record is deleted from the image-data-set information table 600 if an owner user sends the photo site 105 an instruction to cancel the availability of the print order information to the guest user, or an instruction to delete, from the image database 117 in the photo site 105, any of images from which prints have been ordered. Items managed in the image-data-set information table 600, using an access ID 601 as a key, are a title 602 for an image data set, a password 603 for an image data set, a cover image ID 604 for an image data set, and a comment 605 associated with an image data set. Values for these items represent attribute information for an image data set. Attribute values of an album or attribute values of print order information are shown in the image-data-set information table 600, depending on the value of the access class ID 404 corresponding to the access ID 601.

Figure 7:
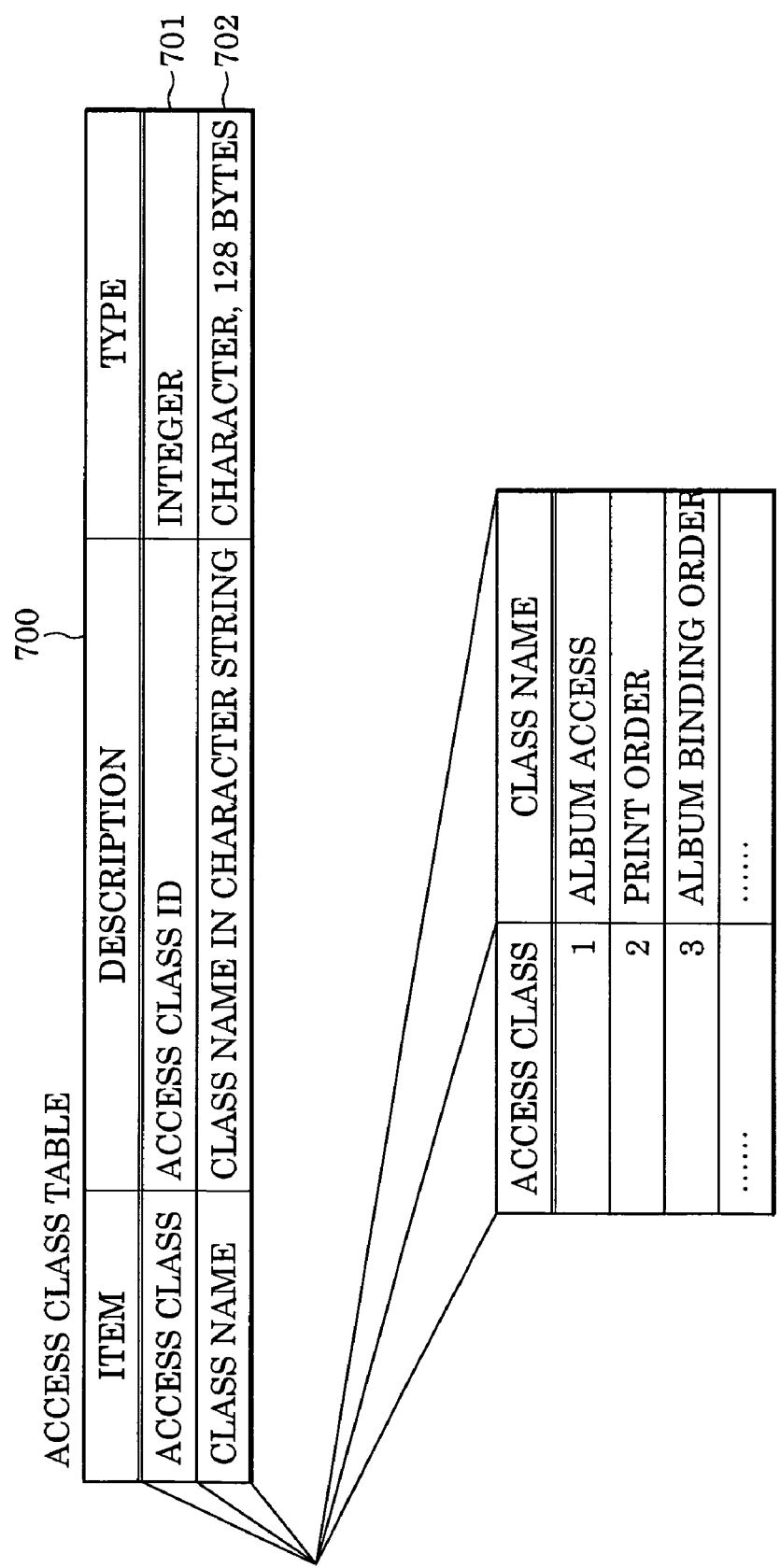
FIG. 7 shows an example of an access class table of the present invention.

FIG. 7 shows the access class table 700. As described above, the access class table 700 stores an access class ID 701 for specifying the class of access, and a class name 702 describing the class by a character string. The access class table 700 is predefined in the attribute information database 118 in the photo site 105.

Figure 8:
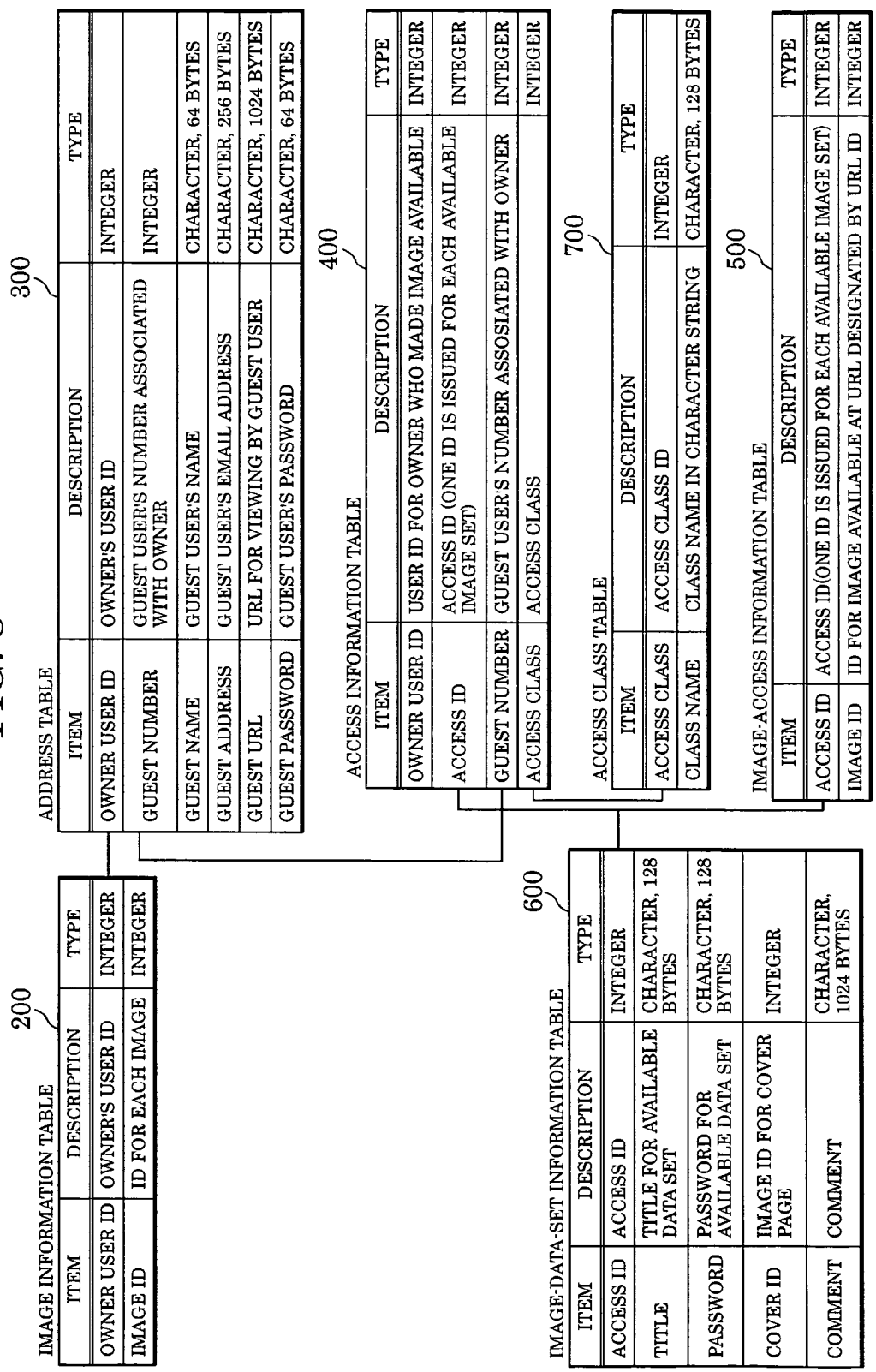
FIG. 8 shows the relationships between the tables that a photo site of the present invention manages in an attribute information database.

FIG. 8 shows the relationships between the tables in FIGS. 2 to 7 that the photo site 105 of the present embodiment manages in the attribute information database 118. Since, as illustrated, the photo site 105 creates a database with the tables associated with one another, a guest user can access, by using a single access URL, various types of image data sets, such as an album containing a plurality of archived image data sets of an owner user, and a print order containing a plurality of image data sets.

<Uploading of Owner User's Image Data>

The uploading of image data stored in the storage area 121A in the owner PC 102A to the photo site 105 will now be described.

Figure 14:
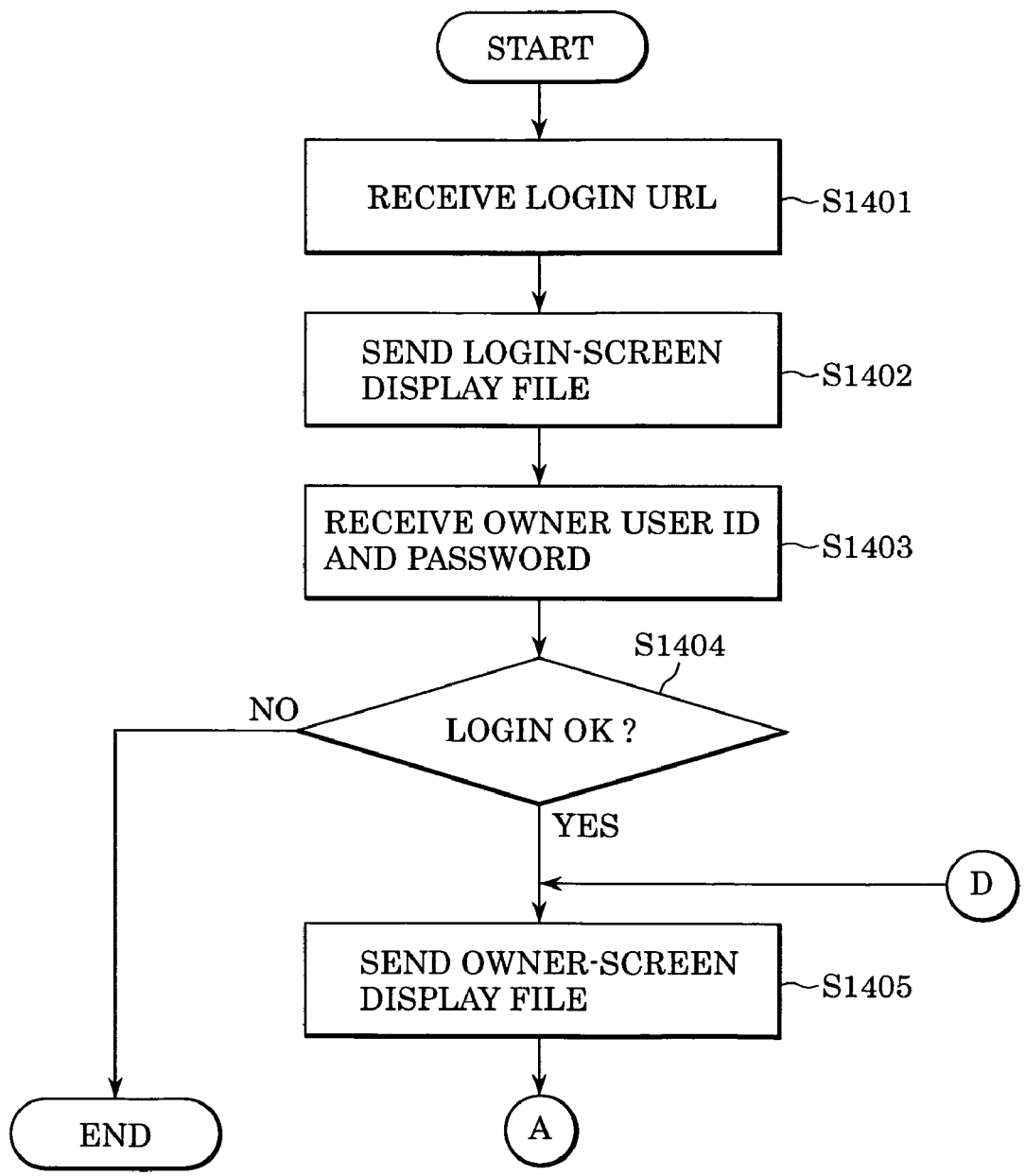
FIG. 14 is a flowchart showing the login process in the photo site of the present invention.

Before uploading the image data, the owner PC 102A goes through the login process to the photo site 105. The login process will now be described with reference to FIG. 14.

Step S1401: The photo site 105 receives, from the owner PC 102A, a login URL for accessing a login screen for the photo site 105. The photo site 105 executes various processing operations by communicating with the owner browser 120A run by the CPU of the owner PC 102A, thus providing the owner PC 102A with various services.

Step S1402: The photo site 105 sends a login-screen display file to the owner PC 102A. Based on the login-screen display file received, the owner PC 102A displays a login screen on the display.

Step S1403: The photo site 105 receives, from the owner PC 102A, an owner user ID and password entered on the login screen.

Step S1404: The photo site 105 verifies the owner user ID and password received in Step S1403 against owner user information read from the attribute information database 118 for authentication, and determines whether or not execution of the following steps should be permitted. If it is determined to permit the execution (valid login), the process proceeds to Step S1405, otherwise, processing ends.

Step S1405: The photo site 105 sends an owner-screen display file to the owner PC 102A.

Figure 22:
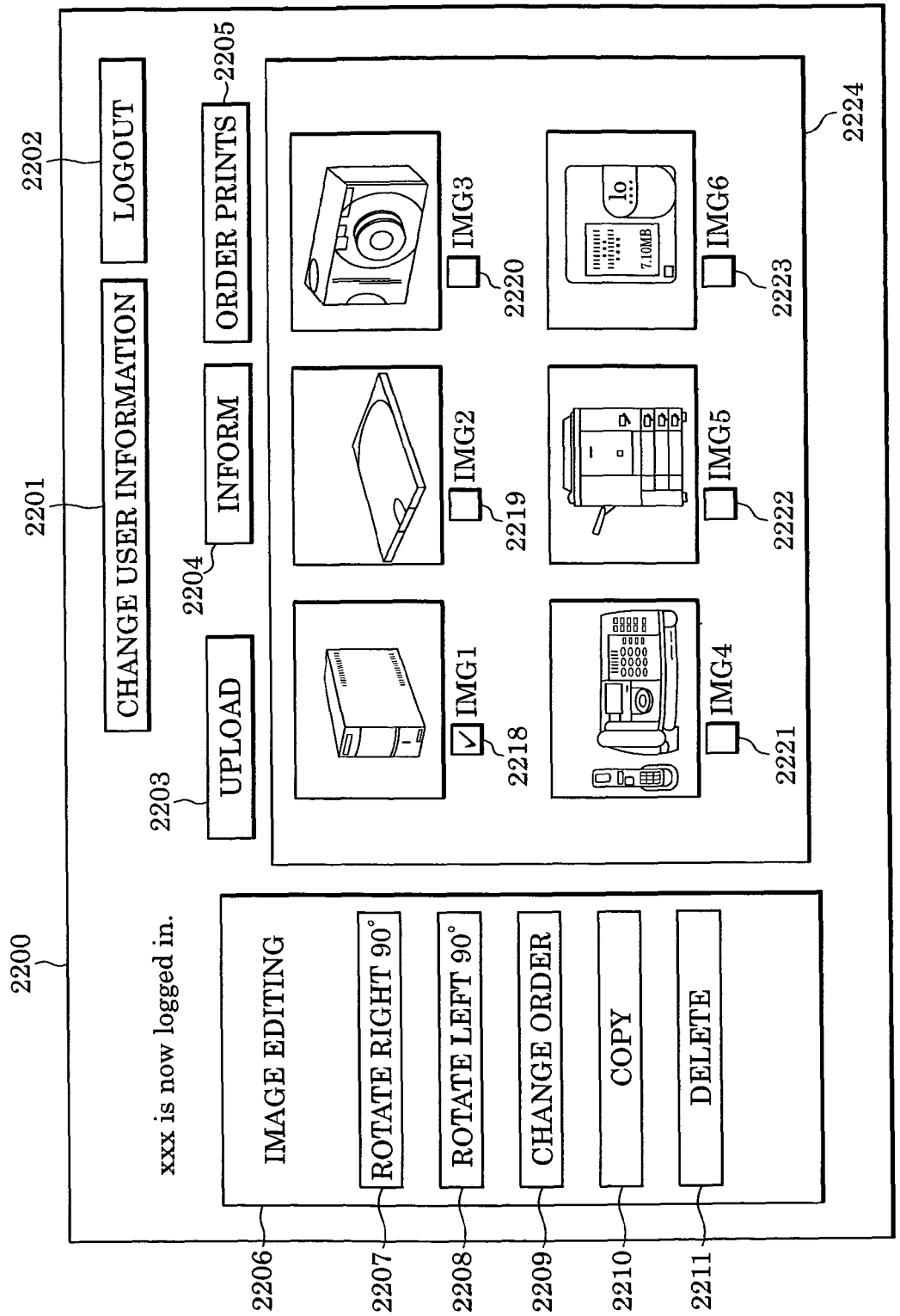
FIG. 22 shows an example of an owner screen of the present invention.

FIG. 22 shows an example of an owner screen 2200 that the owner PC 102A displays by expanding the owner-screen display file, according to the first embodiment. On the owner screen 2200, a change user information button 2201 is for changing the owner user's information (for example, a login password, name, and email address). A logout button 2202 is for logging out of the photo site 105. An inform button 2204 is for informing that an image data set with a checked check box has been made available. An upload button 2203 is for uploading image data. An order prints button 2205 is for ordering prints from image data. An image editing section 2206 provides buttons for editing image data. When the pressing of image editing buttons 2207 to 2211 is detected, the owner PC 102A sends the photo site 105 information (image IDs) for identifying which of check boxes 2218 to 2223 corresponding to the respective images presented on a display area 2224 has been checked, and information as to which of the image editing buttons 2207 to 2211 has been pressed to edit image data. Based on the image IDs and editing information sent from the owner PC 102A, the photo site 105 edits image data stored in the image database 117 and sends the owner PC 102A an edited-image-data display file for displaying the edited image data. The image display area 2224 is for displaying image data associated with an album. Thumbnail images corresponding to the respective image data are sequentially displayed in the image display area 2224, and the check boxes corresponding to the respective image data are arranged in place. Pressing each thumbnail image displays a property setting screen for each image data.

Figure 16:
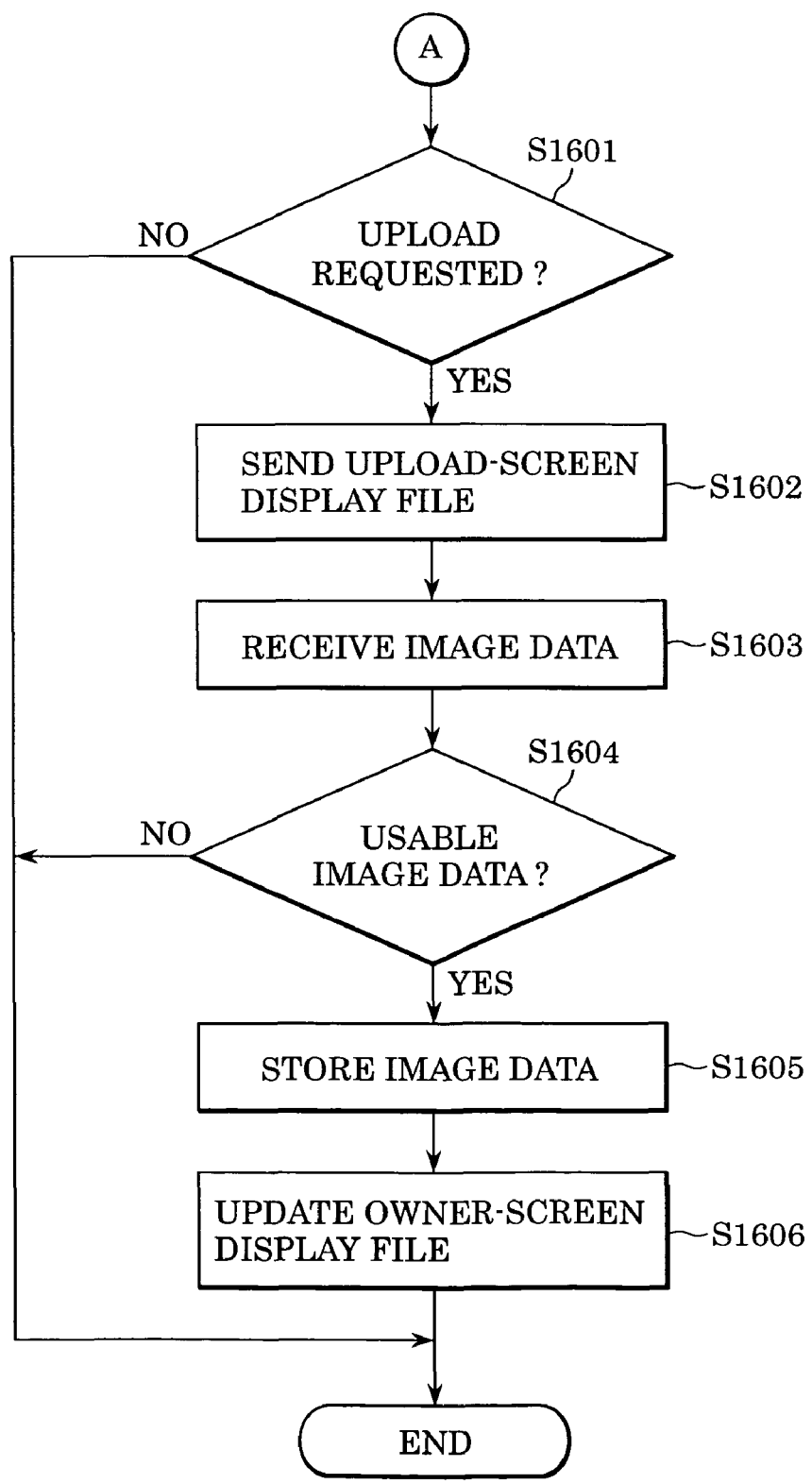
FIG. 16 is a flowchart showing the process of uploading image data in the photo site of the present invention.

Next, the uploading of image data from the owner PC 102A displaying the owner screen 2200 to the photo site 105 will be described with reference to FIG. 16.

Step S1601: The photo site 105 determines whether or not the owner PC 102A has informed the photo site 105 that the "upload" button 2203 has been pressed. The process proceeds to Step S1602 if it is determined that the pressing of the button 2203 has been detected, otherwise processing ends.

Step S1602: The photo site 105 sends an upload-screen display file to the owner PC 102A.

Step S1603: The photo site 105 receives image data selected, on an upload screen (not shown), from the storage area 121A in the owner PC 102A.

Instead of performing Steps S1602 and S1603, the photo site 105 may receive image data selected by using software separately run by the owner PC 102A, the software being specifically designed for image uploading. Such software is also capable of performing communication based on protocols, such as hypertext transfer protocol (HTTP) and file transfer protocol (FTP) that can be used on the Internet 104.

Step S1604: The photo site 105 checks, using the photo sharing module 106, whether or not the image data received in Step S1603 can be used. If it is determined that the image data can be used, the process proceeds to Step S1605, otherwise processing ends.

Step S1605: The photo site 105 stores, in the image database 117, the image data received in Step S1603. At the same time, the photo site 105 issues an image ID to the image data for its unique identification, and stores the image ID in the image information table 200 along with an owner user ID.

Step S1606: The photo site 105 informs the owner PC 102A that the image data has been successfully uploaded. At the same time, the photo site 105 updates the owner-screen display file for displaying thumbnail images in the display area 2224 on the owner screen 2200, the thumbnail images corresponding to the image data stored in the image database 117 in Step S1605. Then the photo site 105 sends the updated owner-screen display file to the owner PC 102A.

<Notification of Image Availability>

Figure 15:
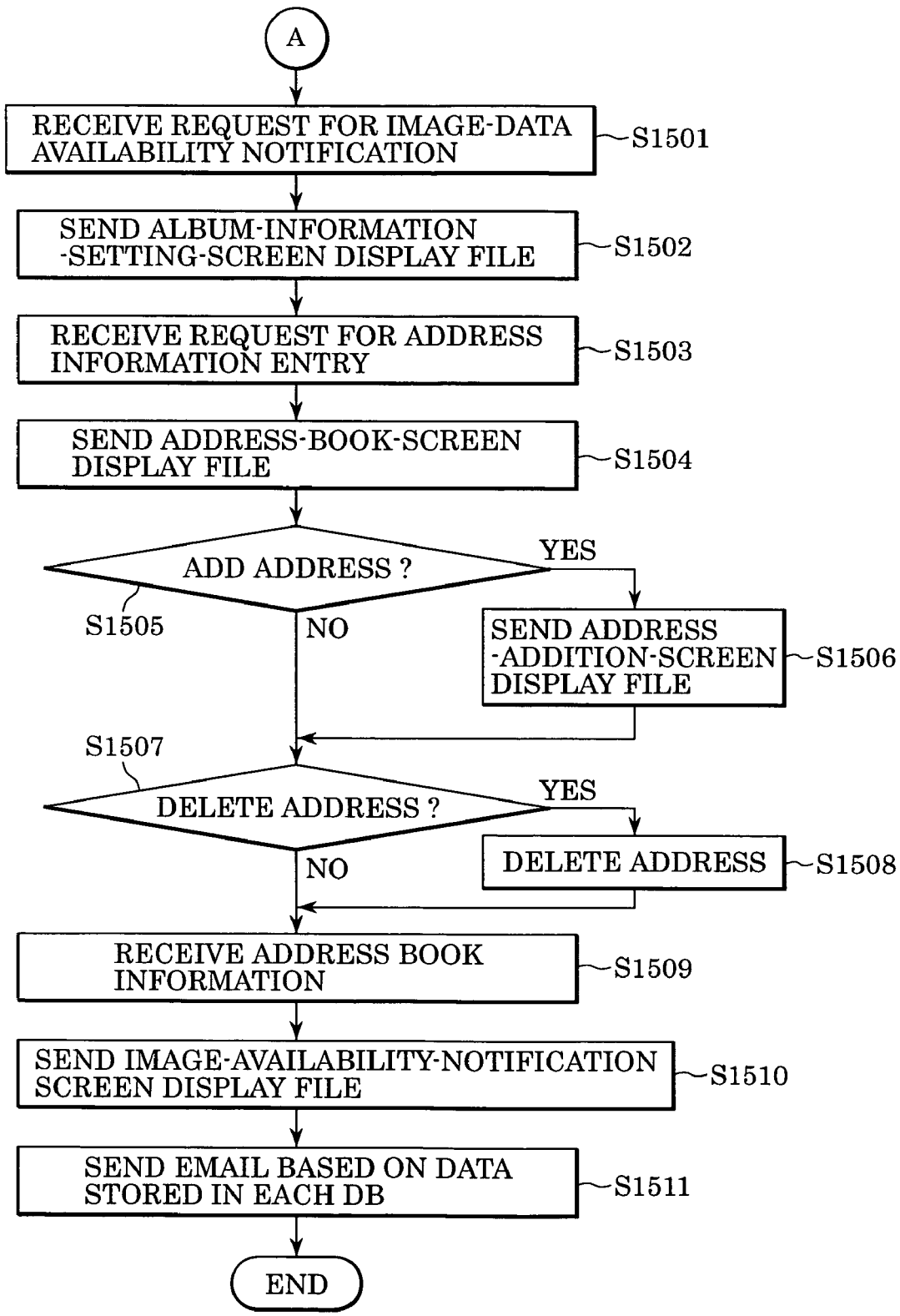
FIG. 15 is a flowchart showing the process by which the photo site of the present invention informs a guest user that image data has been made available.

The flowchart in FIG. 15 shows the process by which the photo site 105 informs a guest user selected by the owner PC 102A that designated image data has been made available.

Before informing the guest user of the availability of the image data, the photo site 105 executes the login process (FIG. 14) for the owner PC 102A and sends the owner-screen display file to the owner PC 102A.

Step S1501: With some image data selected to be made available from those displayed on the owner screen 2200, the photo site 105 is informed by the owner PC 102A of the pressing of an inform button 2204 on the owner screen 2200. If the inform button 2204 is pressed, when some check boxes corresponding to images on the owner screen 2200 are selected, the photo site 105 receives information of the images with selected check boxes from the owner PC 102A, so that only the images with selected check boxes are to be made available. On the other hand, if no check box is selected, the photo site 105 is informed by the owner PC 102A that no check box is selected. As a result, for example, all the image data owned by the owner user may be made available. It is also possible for the photo site 105 to display a warning message to the owner user, in response to the notification that no check box is selected.

Step S1502: To form an album containing archived image data sets to be made available, the photo site 105 issues an access ID to each image data set. Since the data set has not yet been made available to the guest user at this stage, the photo site 105 retains the access ID as Web application data, instead of storing it in the access information table 400 and the image-access information table 500.

At the same time, the photo site 105 sends the owner PC 102A an album-information-setting-screen display file for entering attribute information for the image data set (album).

Figure 21:
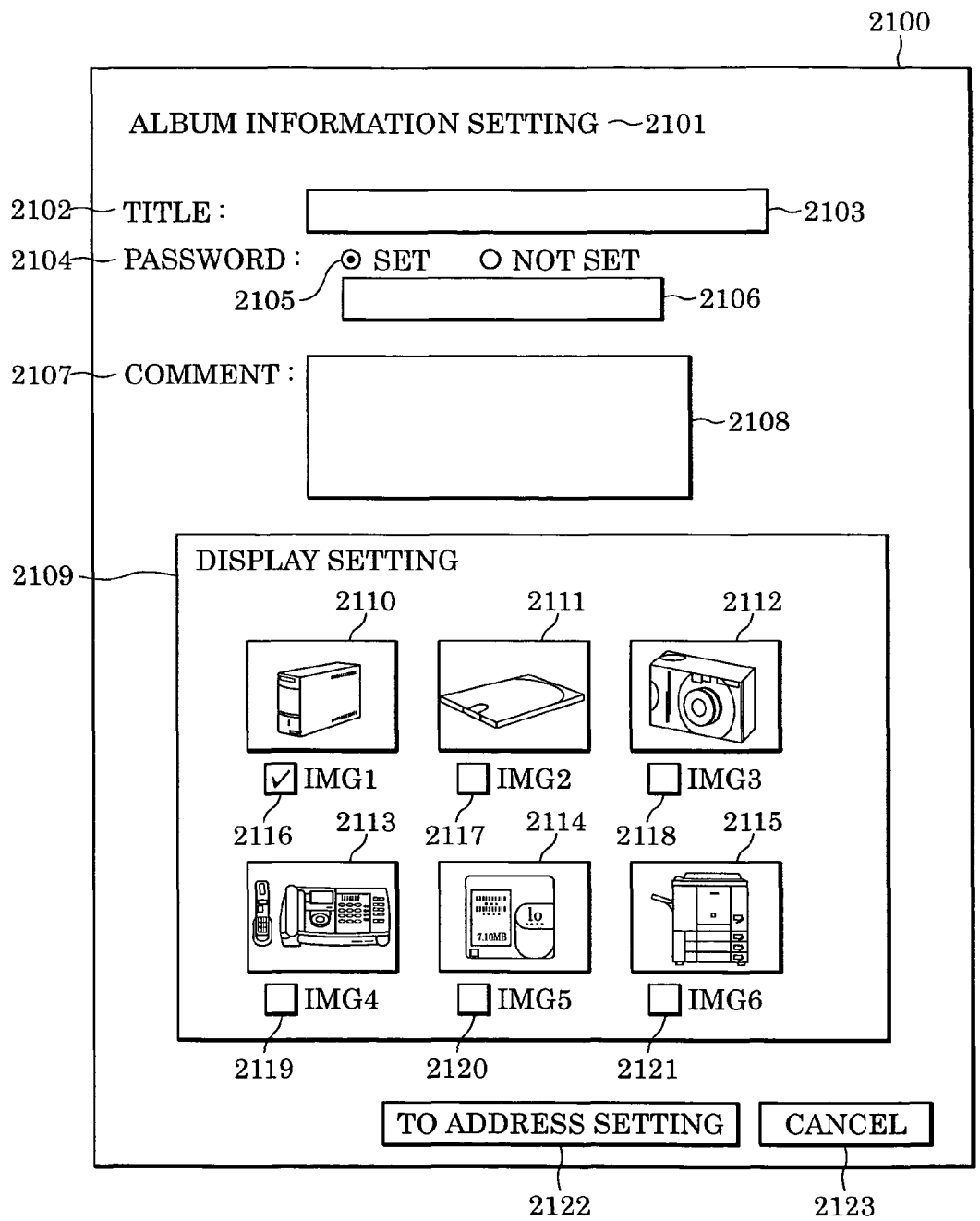
FIG. 21 shows an example of an album-information-setting screen of the present invention.

Step S1503: FIG. 21 shows an example of an album-information-setting screen that the owner PC 102A displays by expanding the album-information-setting-screen display file on the display. The owner user enters attributes of an album containing image data sets on an album-information-setting screen 2100. A character string 2101 shows a screen title for the album-information-setting screen 2100. A title entry field 2103 is provided for setting an album title as indicated by a title label (character string) 2102. A password setting radio button 2105 and a password entry field 2106 are provided for setting a password for the album as indicated by a password label (character string) 2104. If "set" is selected with the radio button 2105, a password can be set by entering a character string in the password entry field 2106. A comment entry field 2108 is provided for adding a comment to the album as indicated by a comment label (character string) 2107. A display area 2109 provides thumbnail images 2110 to 2115 corresponding to image data to be made available. Selecting check boxes 2116 to 2121 allows the setting of images to be included in the album. An address setting button 2122 is provided to end the setting of album information and move to a screen for entering address information of the guest user to which image data is to be made available. A cancel button 2123 is provided to cancel the settings of album information to cancel the availability of the image data set. Upon completion of the entry of values, using the owner PC 102A, in each item on the album-information-setting screen 2100, the owner user presses the button 2122 to send the photo site 105 a request for address entry.

Step S1504: The photo site 105 is informed by the owner PC 102A of the pressing of the address setting button 2122 on the album-information-setting screen 2100, creates a record in the image-data-set information table 600, and stores a title, a password, a cover image ID for the cover page, and a comment in the columns for the title 602, password 603, cover image ID 604, and comment 605, respectively, using the access ID issued in Step S1502 as a key. At the same time, the photo site 105 sends an address-book-screen display file to the owner PC 102A. When the photo site 105 is informed of the pressing of the address setting button 2122, if the registration in the image-data-set information table 600 has been unsuccessful due to, for example, errors in entering data in any of the data entry fields on the album-information-setting screen 2100, or a fault in the photo site 105, the photo site 105 sends an error-screen display file to the owner PC 102A.

FIG. 9 shows an example of an address book screen 900 that the owner PC 102A displays by expanding the address-book-screen display file. The owner user can confirm, on the address book screen 900, whether or not an email address of a guest user to which image data is to be made available is registered. An add address button 901 is for adding a new address. A delete address button 902 is for deleting an address. A select all button 903 is for selecting all check boxes in an address entry field 905. A deselect all button 904 is for clearing all the check boxes in the address entry field 905. The address entry field 905 is for selecting addresses to be subjected to the operation with the buttons 902 and 906. The mailing button 906 is for sending an email message to an email address with a checked check box. When being informed of the pressing of the mailing button 906, the photo site 105 sends an image-availability-notification-screen display file to the owner PC 102A.

Step S1505: When being informed by the owner PC 102A of the pressing of the add address button 901, the photo site 105 sends an address-addition-screen display file to the owner PC 102A. If the add address button was pressed, processing proceeds to Step S1506. If the add address button was not pressed, processing proceeds to Step S1507.

Step S1506: FIG. 10 shows an example of an address addition screen that the owner PC 102A displays by expanding the address-addition-screen display file. An address addition screen 1000 provides a name entry field 1001 for a guest user's name, and an email address entry field 1002 for an email address of a guest user. When being informed by the owner PC 102A of the pressing of an OK button 1003, the photo site 105 registers, in the address table 300, the information entered in the name entry field 1001 and the email address entry field 1002. Then, the photo site 105 sends the owner PC 102A the address-addition-screen display file to which the new email address is added. When the photo site 105 is informed of the pressing of the OK button 1003, if the registration in the address table 300 has been unsuccessful due to, for example, problems in the entry of data in the name entry field 1001 and/or the email address entry field 1002, or a failure in the photo site 105, the photo site 105 sends the error-screen display file to the owner PC 102A. When being informed of the pressing of a cancel button 1004, the photo site 105 sends the address-book-screen display file to the owner PC 102A without registering the information entered in the name entry field 1001 and the email address entry field 1002.

Step S1507: When being informed by the owner PC 102A of the pressing of the delete address button 902, the photo site 105 deletes an address from the address table 300 as described in Step S1508.

Step S1508: If the photo site 105 is informed of the pressing of the delete address button 902 with a check box in the address entry field 905 selected, the photo site 105 deletes the corresponding record including an email address and guest URL for the guest user from the address table 300. At the same time, the photo site 105 also deletes a record from the access information table 400, the record having the same guest user number 302 as that of the record deleted from the address table 300.

Step S1509: The photo site 105 is informed of the pressing of the mailing button 906 together with an ON/OFF value entered in the address entry field 905, its corresponding email address, and guest URL. If none of the check boxes in the address entry field 905 is selected when being informed of the pressing of the mailing button 906, the photo site 105 sends an alert-screen display file to the owner PC 102A.

Step S1510: The photo site 105 sends the image-availability-notification-screen display file to the owner PC 102A.

Figure 11:
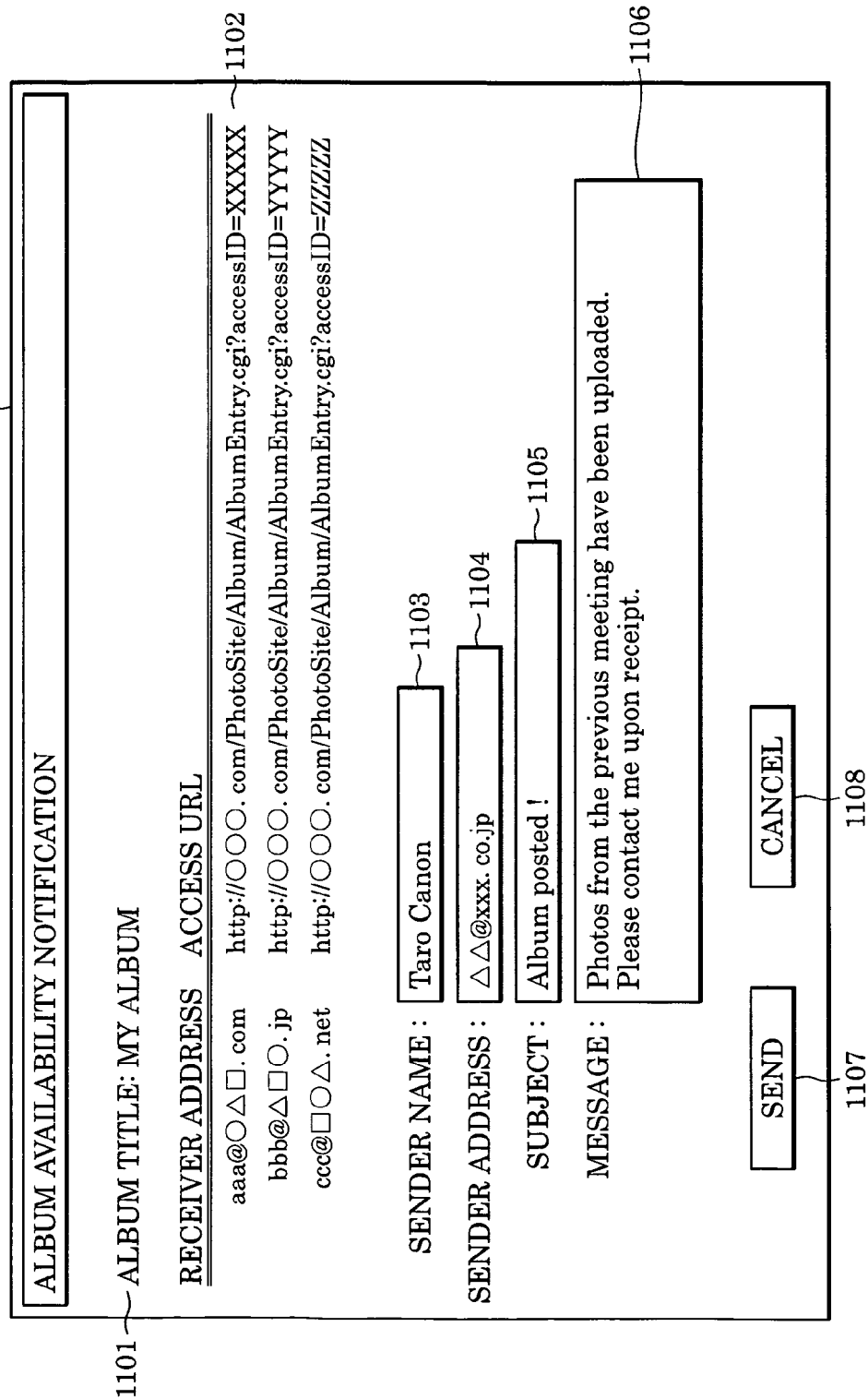
FIG. 11 shows an example of an album-availability notification screen of the present invention.

FIG. 11 shows an example of an image-availability notification screen 1100 that the owner PC 102A displays by expanding the image-availability-notification-screen display file. The image-availability notification screen 1100 provides a character string 1101 showing the title of the album to be made available, the title being stored in the image-data-set information table 600 in Step S1504. Receivers' email addresses and a URL list 1102 appearing on the image-availability notification screen 1100 are those stored in the columns with selected name check boxes and are received in Step S1504. A sender entry field 1103 is a field for an owner user's name, which is supplied by the owner user or appears as a default value if one is already stored in the attribute information database 118. A sender address entry field 1104 is a field for an owner user's email address, which is supplied by the owner user or appears as a default value if one has already been stored in the attribute information database 118, similarly to the sender name entry field 1103 above. A subject entry field 1105 is a field for entering information to be set as the subject of the email message. A character string entered by the owner user or a fixed phrase provided by the photo site 105 appears in the subject entry field 1105. A message entry field 1106 is a field for entering a message to be shown in a message field of the email message. A send button 1107 is pressed to send an email message containing the data entered on the image-availability notification screen 1100.

Step S1511: While being informed of the pressing of the send button 1107 on the image-availability notification screen 1100, the photo site 105 receives various information entered, thus creating and sending an email message. Upon successful sending of the email message, the photo site 105 creates a new record in the access information table 400 and the image-access information table 500 in the attribute information database 118. Values of the image ID 502 for image data to be made available (checked image data or all image data in the album) are registered in the image-access information table 500, using the access ID 501 issued in Step S1502 as a key. Values of the owner user ID 401, guest user number 403, access ID 402 issued in Step S1502, and access class ID 404 are registered in the access information table 400. These registrations associate the guest URL 305 in the address table 300 with the image data to be made available. In Step S1511, upon successful sending of an email message and successful creation of a record in both the access information table 400 and the image-access information table 500, the photo site 105 sends the owner-screen display file to the owner PC 102A.

On the other hand, in the case of unsuccessful email delivery or if the photo site 105 cannot create a record in the access information table 400 and the image-access information table 500 due to, for example, a failure in the photo site 105, the photo site 105 sends an error-screen display file to the owner PC 102A.

If the pressing of a cancel button 1108 is detected, the photo site 105 ends the process of image availability notification, sends an owner-screen display file to the owner PC 102A and discards the access ID issued in Step S1502.

FIG. 12 shows an example of an email message sent to the guest PC 102B. The information entered on the image-availability notification screen 1100 appears in the message.

<Registration of Print Order Data>

Figure 17:
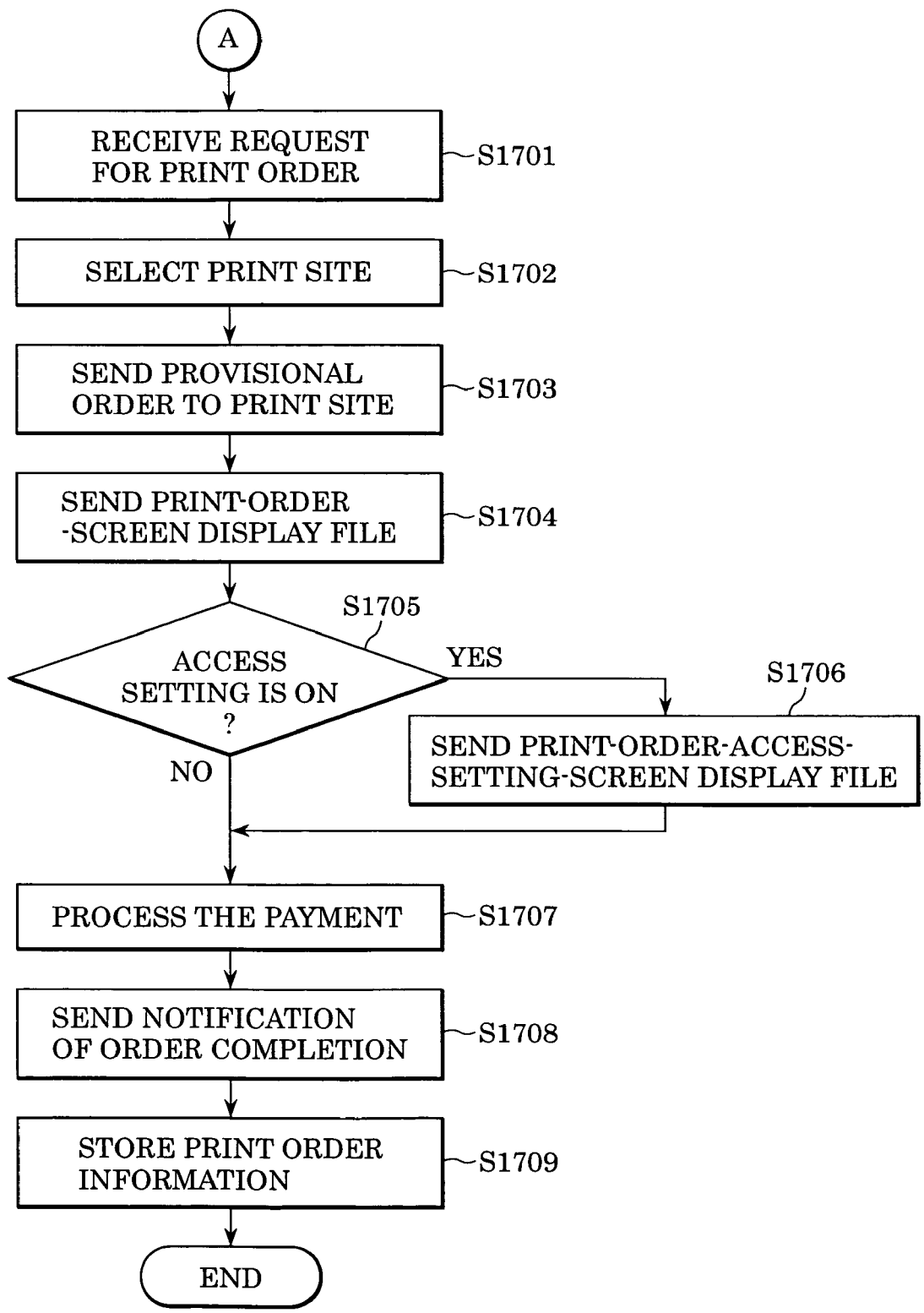
FIG. 17 is a flowchart showing the process of ordering prints from image data in the photo site of the present invention.

In response to a request from the owner PC 102A, the photo site 105 instructs one of the print sites 109 to print the owner user's image data uploaded to the image database 117, and then the print site 109 processes the order. This print order process will now be described with reference to the flowchart in FIG. 17. From one or a plurality of print sites 109, the photo site 105 selects one print site 109 depending on the request from the owner PC 102A or the printing capability of the print site, and instructs the selected print site 109 to print image data. While, in the description below, the photo site 105 and the print site 109 carry out their respective tasks, it is possible that the photo site 105 also serves as a print site and performs the entire process.

Step S1701: When being informed of the pressing of the print order button 2205, the photo site 105 sends a print-site-selection-screen display file to the owner PC 102A. Similarly to the case where an image data set is made available as an album, if some check boxes corresponding to images on the owner screen 2200 are selected, the photo site 105 receives information of images with selected check boxes from the owner PC 102A, so that only images with selected check boxes are to be printed. On the other hand, if no check box is selected, the photo site 105 is informed by the owner PC 102A that no check box is selected. As a result, for example, all the image data owned by the owner user are to be printed. It is also possible for the photo site 105 to display a warning message for the owner user, in response to the notification that no check box is selected. The photo site 105 issues an access ID to each image data set (print information) to be printed. Since the data set has not yet been made available to the guest user at this stage, the photo site 105 retains the access ID as Web application data, instead of storing it in the access information table 400 and the image-access information table 500.

Figure 20:
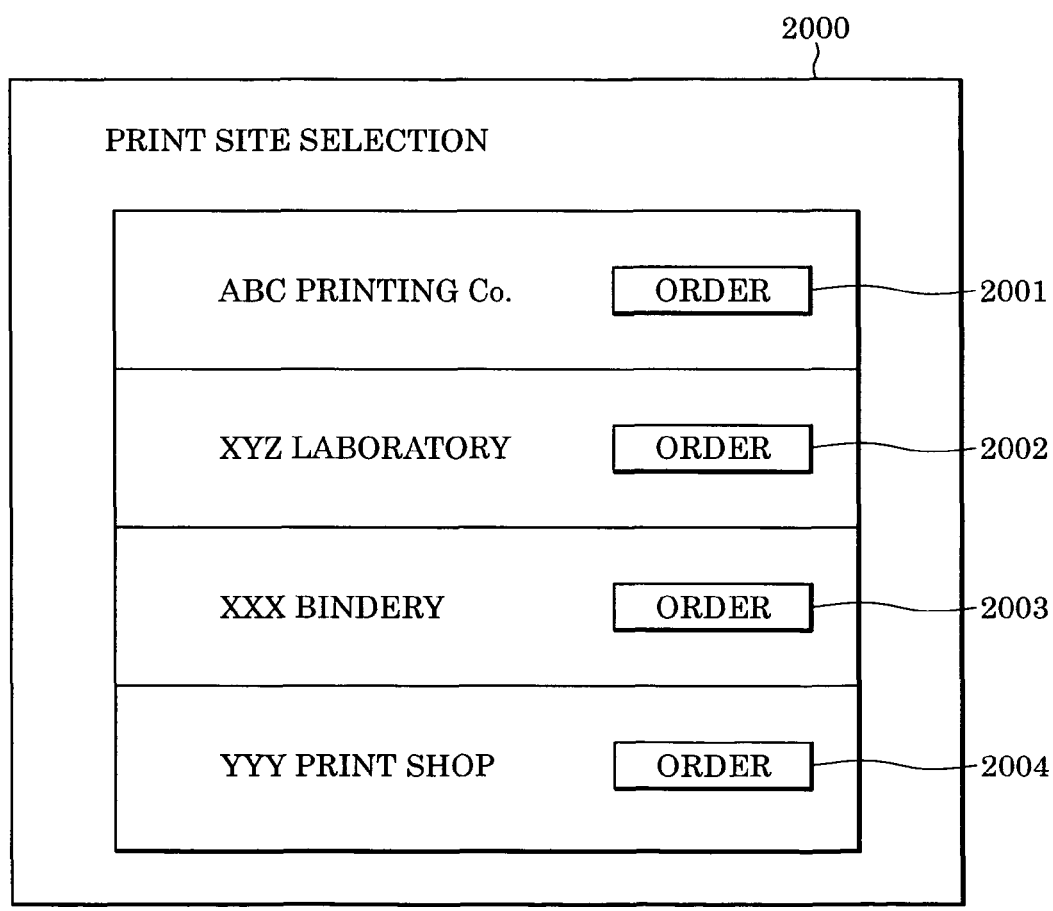
FIG. 20 shows an example of a print-site selection screen of the present invention.

FIG. 20 shows an example of a print-site selection screen 2000, which provides details of print services (such as available types and sizes of paper), unit prices, delivery schedules, and the like, of each print site 109.

Step S1702: The photo site 105 detects the pressing of one of print-site selection buttons 2001 to 2004 corresponding to the respective print sites 109 displayed on the print-site selection screen 2000.

Step S1703: The photo site 105 creates a provisional print order containing the access ID and a list of image IDs of images to be printed, and sends it to the print site 109 selected in Step S1702.

Step S1704: Upon receipt of the provisional print order in Step S1703, using the list of image IDs contained in the provisional order, the print site 109 obtains thumbnail images of the image data to be printed, from the image database 117 in the photo site 105. Then, the print site 109 creates and sends a print-order-screen display file to the owner PC 102A.

Figure 19:
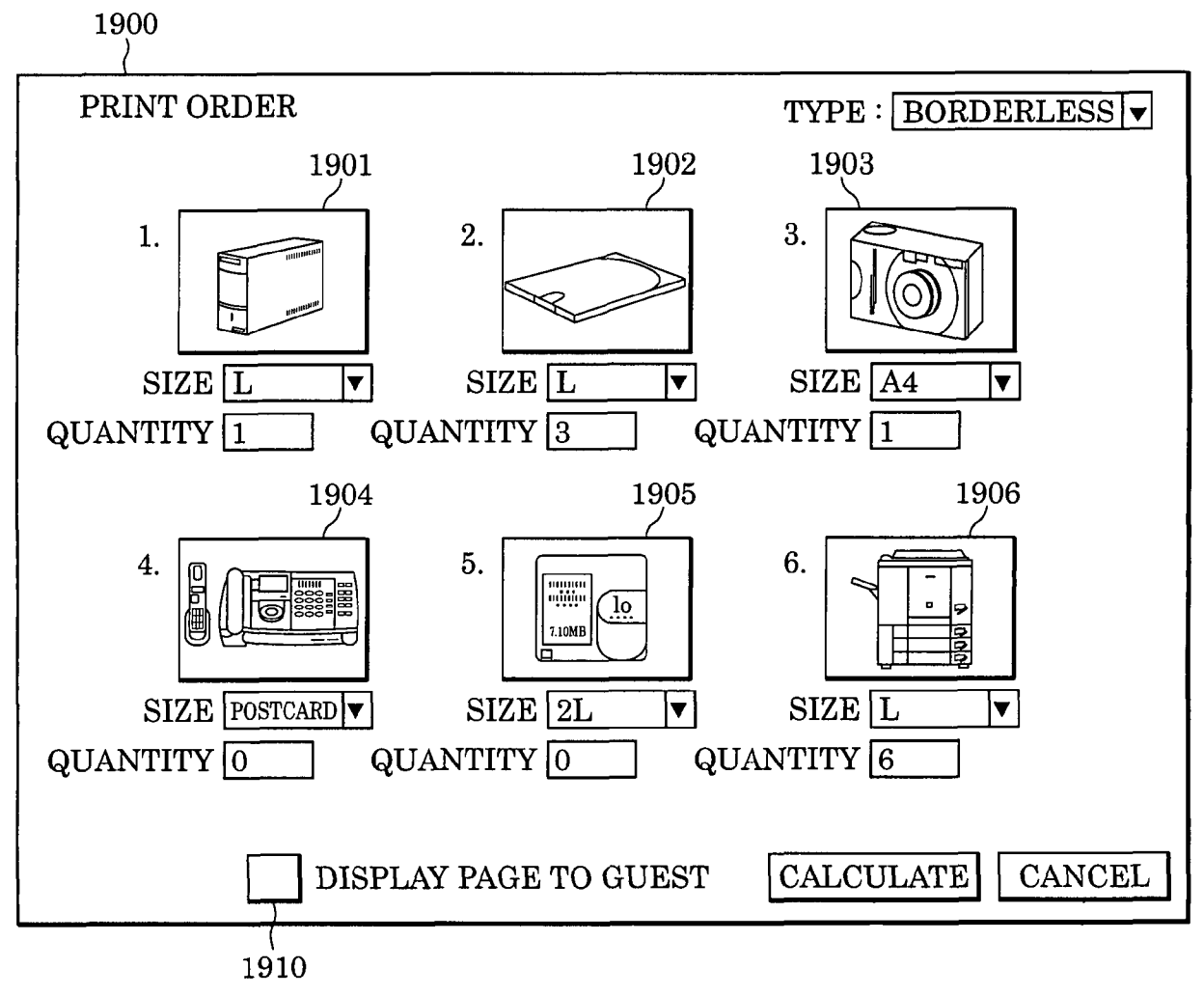

FIG. 19 shows an example of a print order screen 1900 that the owner PC 102A displays by expanding the print-order-screen display file on the display. Based on thumbnail images 1901 to 1906 presented on the print order screen 1900, the owner PC 102A selects image data to be printed and inputs information, such as the type and size of paper, the number of copies, and address for delivery, in the corresponding entry fields. The print order information can be made available to a guest user by selecting a check box 1910 for access setting.

Step S1705: The print site 109 determines whether or not the check box 1910 on the print order screen 1900 is selected, and forwards the result to the photo site 105. If it is determined that access setting is on, processing proceeds to Step S1706, otherwise processing proceeds to Step S1707.

Step S1706: If it is determined, in Step S1705, that the check box 1910 is selected, the photo site 105 sends a print-order-access-setting-screen display file to the owner PC 102A.

Figure 23:
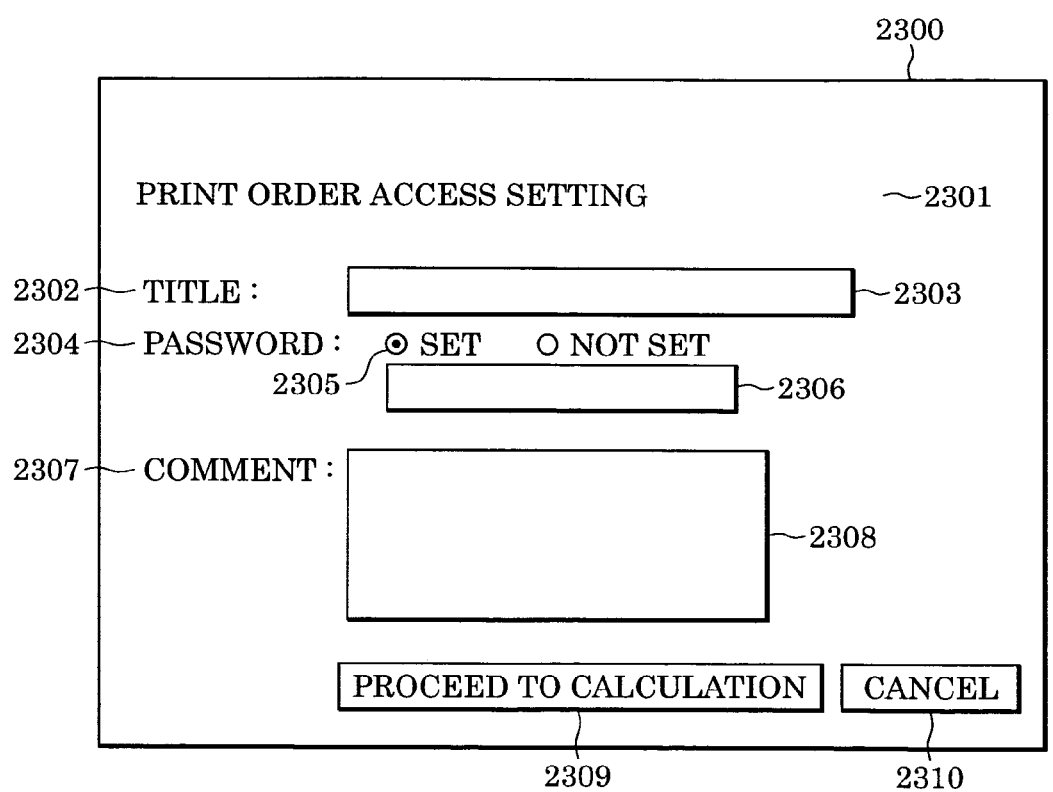
FIG. 23 shows an example of a print-order-access setting screen of the present embodiment.

FIG. 23 shows an example of a print-order-access setting screen 2300 that the owner PC 102A displays by expanding the print-order-access-setting-screen display file. Similarly to the case of the setting for album availability described above, a character string 2301 shows a screen title for the print-order-access setting screen 2300. A title entry field 2303 is provided for setting a title for the print order information as indicated by a title label (character string) 2302. A password radio button 2305 and a password entry field 2306 are provided for setting a password for the print information as indicated by a password label (character string) 2304. A comment entry field 2308 is provided for adding a comment to the print information as indicated by a comment label (character string) 2307. A calculation button 2309 is provided to end the setting for the print information and to move to a calculation screen. If the pressing of the calculation button 2309 is detected, the photo site 105 creates a record in the image-data-set information table 600 and stores, using the access ID issued in Step S1701 as a key, the entered title, password, and comment in the columns for the title 602, password 603, and the comment 605, respectively.

At the same time, the photo site 105 creates a new record in the access information table 400 and the image-access information table 500 in the attribute information database 118. Values of the image ID 502 of image data to be made available (checked image data or all image data in the album) are registered in the image-access information table 500, using the access ID issued in Step S1701 as a key. Values of the owner user ID 401, guest user number 403, access ID 402 issued in Step S1502, and access class ID 404 representing the print order are registered in the access information table 400.

On the other hand, when the photo site 105 is informed of the pressing of the button 2309, if the registration in the image-data-set information table 600, the access information table 400, and image-access information table 500 has been unsuccessful due to, for example, errors in the entry fields 2303, 2306, and 2308, or a fault in the photo site 105, the photo site 105 sends the error-screen display file to the owner PC 102A.

A cancel button 2310 is for canceling the setting for the print information to cancel the availability of the print order. If the pressing of the button 2310 is detected, the photo site 105 stops the print order and sends the owner PC 102A a file for displaying the owner screen 2200.

Step S1707: Based on the information, such as the type and size of paper and the number of copies, received from the owner PC 102A, the print site 109 calculates the printing costs using a cost calculation module (not shown). The print site 109 then outputs the printing costs to the photo site 105.

Based on the printing costs and the like received from the print site 109, the photo site 105 creates and sends a print-order-confirmation-screen display file to the owner PC 102A. When the owner user approves the method of payment and the details of the print order presented on a print-order-confirmation screen (not shown), the photo site 105 receives a print-order approval action from the owner PC 102A.

The photo site 105 sends a payment-screen display file to the owner PC 102A. Then, the photo site 105 receives payment information input according to a payment screen (not shown) by the owner PC 102A, the payment information being required for the payment (for example, a credit card number and expiration date). A settlement module 107 in the photo site 105 accepts the payment information and processes the payment. Instead of the photo site 105, a settlement site (not shown) provided by a bank or credit card company may communicate with the owner PC 102A to process the payment, thus outputting the result of the settlement process to the photo site 105.

On completion of the settlement process, the photo site 105 sends a firm print order to the print site 109.

In response to the firm print order, the print site 109 obtains, from the image database 117 in the photo site 105, the image data selected by the owner PC 102A and prints the obtained image data on the printer 111. The printed material 112 is delivered to the address designated by the owner PC 102A.

Step S1708: The photo site 105 informs the owner PC 102A of the completion of the print order process.

Step S1709: The photo site 105 receives, from the print site 109, the print order information of the owner PC 102A, such as the image ID for the printed image, the type and size of paper, the number of copies, and the order date, creates a new record in an order information table (not shown), and stores the print order information therein. In the example described above, after the print order information has been correctly input in Step S1706, and records have been created in the image-data-set information table 600, the access information table 400, and the image-access information table 500, the guest URL can be associated with the print order information, so that the guest user can place the same print order as the owner user did.

However, there may be cases where the guest user is not permitted to place a print order until the photo site 105 receives the print order information from the print site 109 after the completion of the delivery of printed material. In such a case, although the registration in the database is performed in Step S1706, a flag is set in an extra column to specify whether or not the access ID is to be enabled. That is, if the access ID is disabled in Step S1706 and then enabled in Step S1709, the guest user is allowed to place a print order after the completion of the delivery for the owner user.

<Image Viewing of Guest User>

The guest PC 102B receives an email notification when the owner user's image data uploaded to the photo site 105 has been made available for viewing. The following describes, with reference to the drawings, the method by which the guest PC 102B receives and displays the owner user's image data stored in the image database 117 for the photo site 105.

The guest user enters and sends, using the guest browser 120B on the guest PC 102B, a guest URL appearing in the email notification to the photo site 105 via the Internet 104. The guest user receives, expands, and displays an available-image-screen display file sent from the photo site 105.

Figure 13:
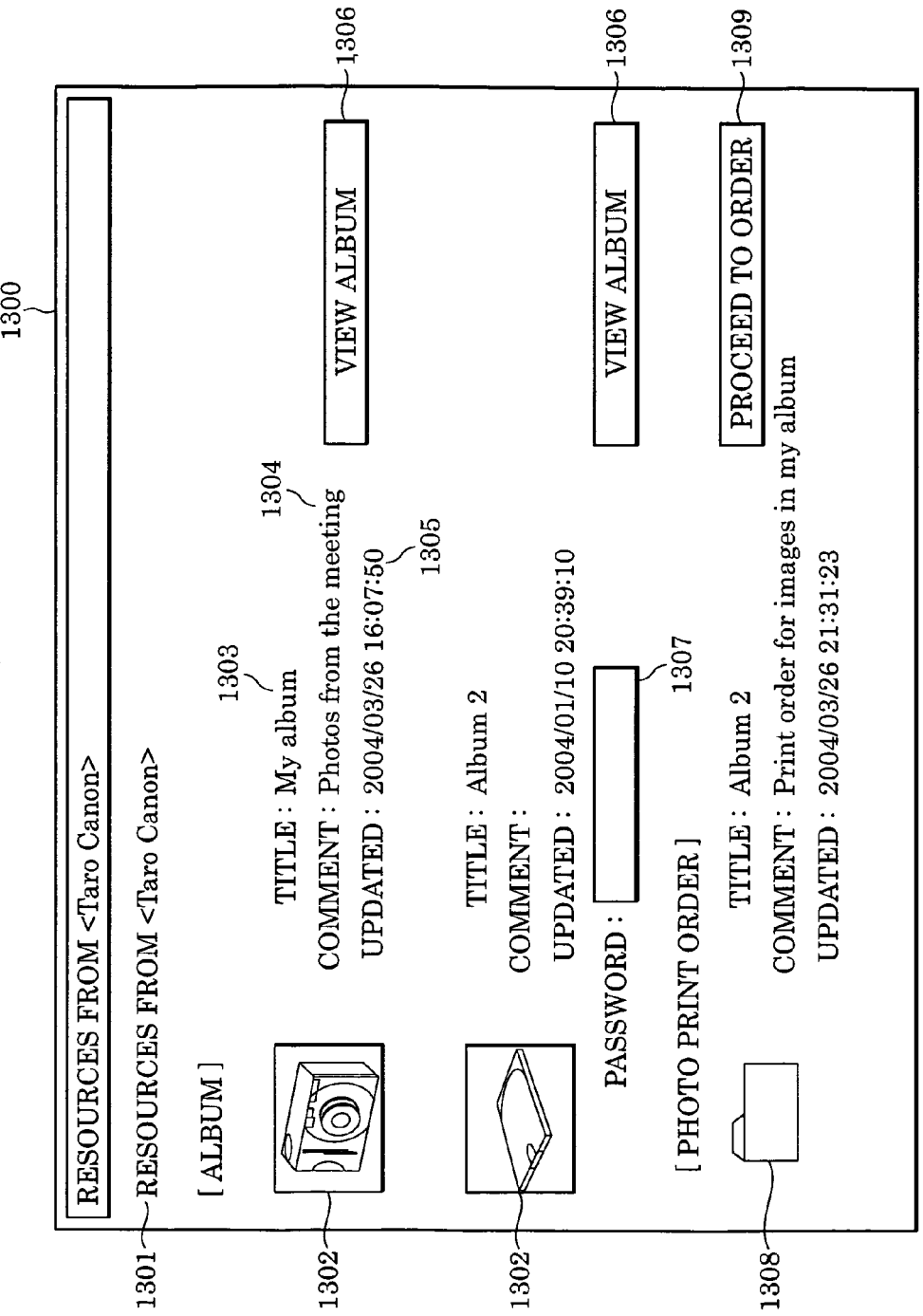
FIG. 13 shows an example of a screen presenting image data sets made available to a guest user, in the present invention.

FIG. 13 shows an example of an available-image screen that the guest PC 102B of the present embodiment displays, for the guest user, by expanding the available-image-screen display file. An available-image screen 1300 provides a title 1301 including the owner user's name such that the guest user can recognize who has made the images or albums available. The available-image screen 1300 in FIG. 13 displays two sets of album data and a set of print order data. Each album data presented in the available-image screen 1300 provides the guest user with an overview of the album by showing a cover image 1302, an album title 1303, a comment 1304 to the album, and a time 1305 when the album was made available. Upon detection of the pressing of a view album button 1306, the photo site 105 sends an album screen (not shown) to the guest PC 102B.

While the most recent update can be checked by the time 1305, it is also possible to clearly indicate the latest addition, for example, by placing a highlighted "It's NEW!" or a special symbol on the cover page. As described above, a password can be set for albums and print information. If, in the image-data-set information table 600, a password is stored in a column for the password 603 corresponding to the access ID, a password entry field 1307 appears before the photo site 105 sends an album-screen display file to the guest PC 102B.

The guest user enters, in the entry field 1307, the password for the email by which the notification has been received. The photo site 105 receives and verifies the entered password against the password for the album, the password being stored in the attribute information database 118. If the guest user is authenticated, the photo site 105 sends the album-screen display file to the guest user.

The available-image screen 1300 also provides the guest user with image data from which prints were ordered. An icon 1308 is displayed to highlight such image data. When the photo site 105 is informed by the guest PC 102B that an order button 1309 has been pressed, the photo site 105 sends a print-order-information-screen display file to the guest PC 102B.

The screen to be displayed will not be detailed here, as it is identical to the print order screen 1900 for the owner user except that the screen to be displayed does not have the check box 1910. When being informed of the pressing of an order button, the photo site 105 can place the same print order for the guest user as the owner did.

Figure 18:
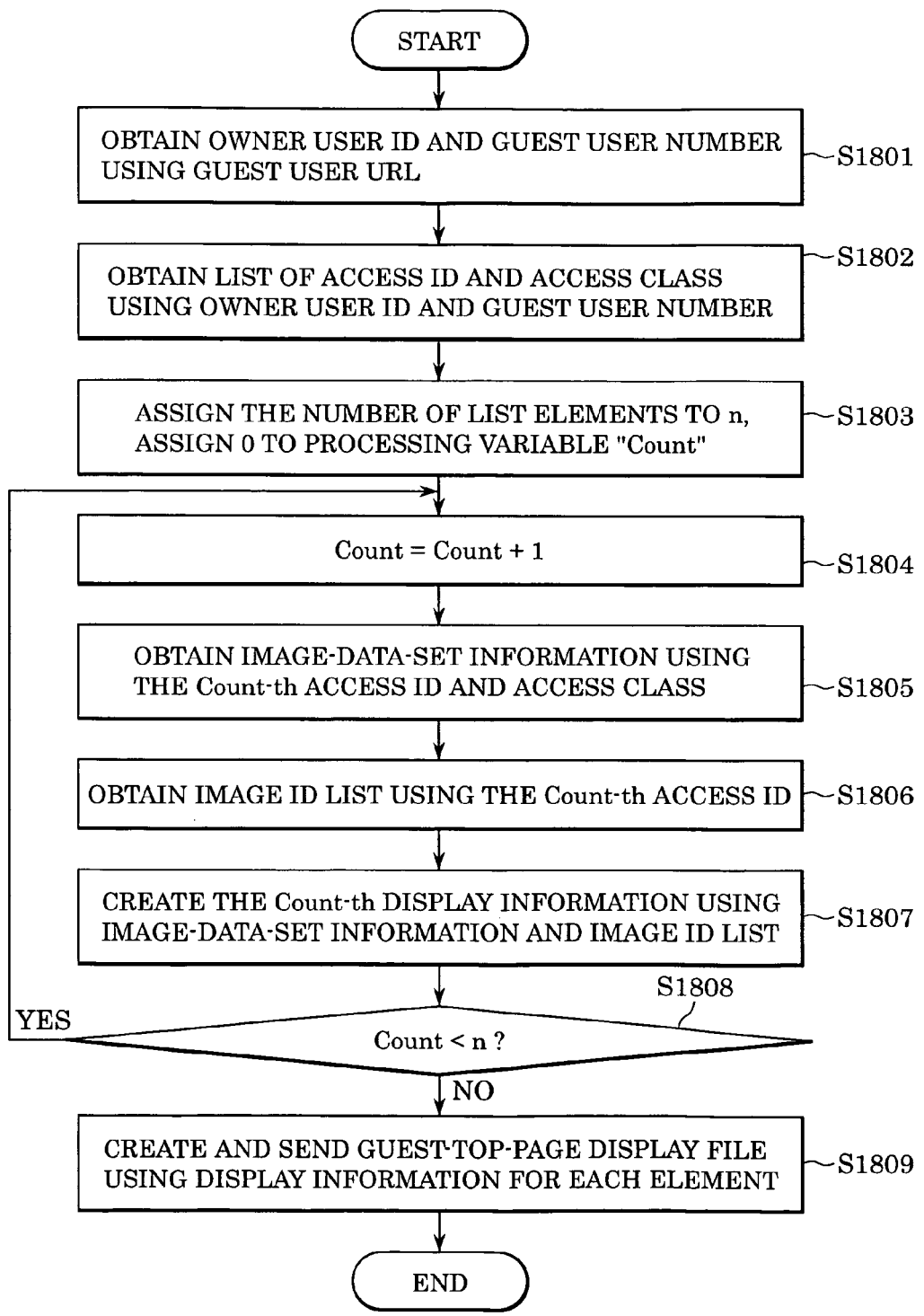
FIG. 18 is a flowchart showing the process by which the photo site of the present invention creates an available-image screen to be displayed when a guest user enters a guest URL.

FIG. 18 is a flowchart showing the process by which the photo site 105 displays the available-image screen 1300 in the guest browser 120B on the guest PC 102B, according to the present embodiment.

Step S1801: After being informed of a guest user's URL, the photo site 105 obtains the owner user ID 301 and the guest user number 302 from the address table 300.

Step S1802: The photo site 105 obtains, from the access information table 400, a list of access IDs and access class IDs for the guest user, using the owner user ID 301 and the guest user number 302 obtained in Step S1801. The access IDs have a one-to-one correspondence with the access class IDs.

Step S1803: The photo site 105 counts the number of list elements obtained in Step S1802, assigns the number to n, and assigns zero to a processing variable "Count" for counting the number of image data sets.

Step S1804: A value obtained by adding one to the processing variable Count is stored in the variable itself, i.e., the processing variable Count is incremented.

Step S1805: The photo site 105 obtains the Count-th access ID and access class ID from the list of access IDs and access class IDs obtained in Step S1802. The photo site 105 obtains, using the values of the Count-th access ID and access class ID, attribute information for the corresponding image data set from the image-data-set information table 600. Thus, the photo site 105 can obtain the class of resources (such as album and print order) and attribute information to be presented to the guest user.

Step S1806: The photo site 105 obtains the Count-th access ID from the list of access IDs obtained in Step S1802. The photo site 105 obtains, using the value of the Count-th access ID, a list of corresponding image IDs from the image-access information table 500. Thus, the photo site 105 can obtain the number and contents of images included in the corresponding image data set.

Step S1807: The photo site 105 organizes information obtained in Step S1805 and Step S1806 to create the Count-th display information.

Step S1808: The photo site 105 determines whether or not the value of the processing variable Count has reached n. If it is determined that the value of the processing variable Count has not yet reached n, Steps S1804 to S1807 are repeated. If it is determined that the value of the processing variable Count has reached n, the process proceeds to Step S1809.

Step S1809: The photo site 105 sends the guest PC 102B, via the Internet 104, an available-image-screen display file created by combining display information for each list element in Step S1807. The guest browser 120B on the guest PC 102B receives and expands the available-image-screen display file to display the available-image screen 1300 for the guest user.

Upon receipt of the guest URL from the guest PC 102B in Step S1801, the photo site 105 may send the guest PC 102B a password-entry-screen display file for the guest user, and proceed to Step S1802 only when the password received from the guest PC 102B is verified. This can prevent an album from being exposed to an unauthorized user who has obtained the guest user's URL by improper means. In this case, the photo site 105 verifies the entered password against the guest password read from the guest password 306 in the address table 300. It is also possible that the photo site 105 allows a password to be set on the guest PC 102B when the guest user's URL is initially received. The photo site 105 stores the set password in a column for the guest password 306 in the address table 300, thus performing password authentication for the guest user.

Second Embodiment

The structure of a data sharing system of the present embodiment is substantially the same as that of the first embodiment and is shown in FIG. 1.

In the present embodiment, image data in the image database 117 is stored in association with a directory (hereinafter referred to as "album"). That is, one or a plurality of image data is managed in association with an album. For example, a plurality of image data, such as "start.jpg", "lunchtime.jpg", and "in_bus.jpg", is managed in association with an album titled "Picnic". The photo site 105 manages one or a plurality of albums in association with an owner user.

In the present embodiment, the owner user selects image data to be made available to the guest user on an album-by-album basis. That is, the owner PC 102A informs the photo site 105 of the image data to be made available to the guest PC 102B on an album-by-album basis.

<Uploading of Owner User's Image Data>

The uploading of image data stored in the storage area 121A in the owner PC 102A to the photo site 105 will now be described.

Before uploading the image data, the owner PC 102A goes through the login process to the photo site 105. The login process is the same as that in the first embodiment, and is shown in the flowchart in FIG. 14.

Figure 30:
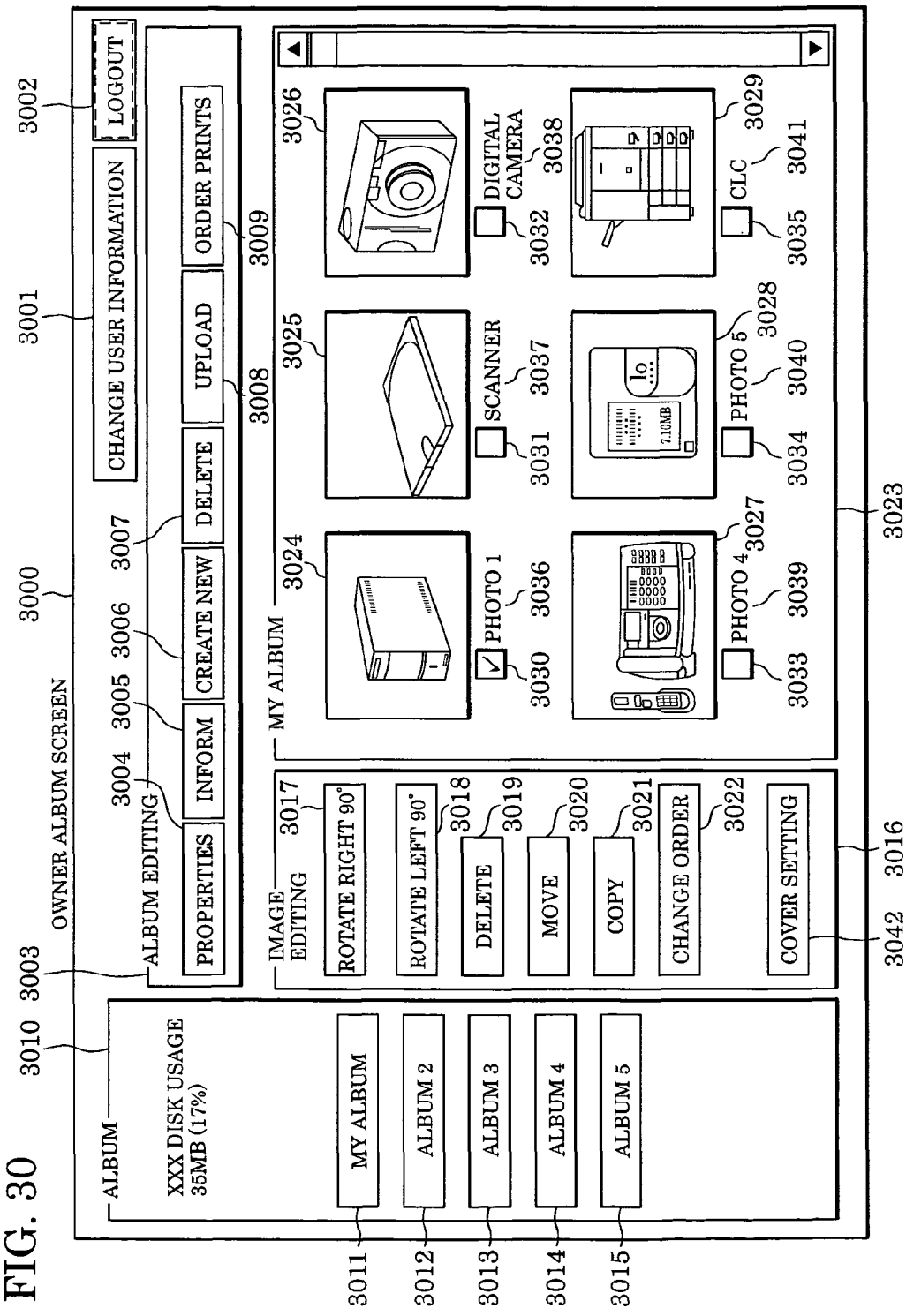
FIG. 30 shows an example of an owner album screen of the present invention.

FIG. 30 shows an example of an owner album screen 3000 that the owner PC 102A displays by expanding an owner-album-screen display file, according to the second embodiment. On the owner album screen 3000, a change user information button 3001 is for changing the owner user's information (for example, a login password, name, and email address). A logout button 3002 is for logging out of the photo site 105. An album editing section 3003 provides buttons for editing an album displayed on the owner album screen 3000. A properties button 3004 is for setting the properties of an album. To set a password for displaying an album, the owner PC 102A sends the photo site 105 a password entered by the owner user on an album property screen that is displayed by pressing the properties button 3004. The photo site 105 stores the password in a column for an album password 2604 of an album information table 2600 shown in FIG. 26 and described below. An inform button 3005 is for informing that an album has been made available. A create new button 3006 is for creating a new album. A delete button 3007 is for deleting an album. An upload button 3008 is for uploading images to an album. An order prints button 3009 is for ordering prints from images in an album. An album selection section 3010 provides buttons for selecting an album. The total size of the owner user's image data stored in the image database 117 for the photo site 105 and its proportion to the total allowable size are indicated near the top of the album selection section 3010. The number of the buttons in the album selection section 3010 corresponds to the number of the owner user's albums stored in the photo site 105. In FIG. 30, buttons 3011 to 3015 on the owner album screen 3000 indicate that five albums of the owner user are stored in the photo site 105. When the owner PC 102A informs the photo site 105 of the pressing of one of the album selection buttons 3011 to 3015, the photo site 105 changes the image data presented on an album display area 3023 depending on which of the album selection buttons 3011 to 3015 has been pressed, and shows the album title at the upper left end of the album display area 3023. For example, the screen shown in FIG. 30 is displayed after selection of album selection button 3011. Thus, the title of the album "MY ALBUM" is displayed in the album display area 3023. An image editing section 3016 provides buttons for editing image data contained in the album. When the pressing of an image editing button 3017 to 3022 is detected, the owner PC 102A sends the photo site 105 information (image IDs) for identifying which of check boxes 3030 to 3035 corresponding to the respective images displayed in the display area 3023 has been checked, and information as to which of the image editing buttons 3017 to 3022 has been pressed to edit image data. Based on the image IDs and editing information sent from the owner PC 102A, the photo site 105 edits image data stored in the image database 117, sends the owner PC 102A an edited-image-data display file for displaying the edited image data, thus displaying the edited image data in the display area 3023 in the owner album screen 3000 on the owner browser 120A on the owner PC 102A. The display area 3023 is for displaying image data in an album. Thumbnail images 3024 to 3029 corresponding to the respective image data are sequentially displayed in the display area 3023, and image names 3036 to 3041 and check boxes 3030 to 3035 corresponding to the respective image data are arranged in place. When the pressing of one of thumbnail images 3024 to 3029 is detected, the owner PC 102A sends the photo site 105 an image ID corresponding to the thumbnail image pressed. The owner PC 102A receives, from the photo site 105, a property-setting-screen display file for the corresponding image data, expands the property-setting-screen display file, and displays a property setting screen.

Figure 38:
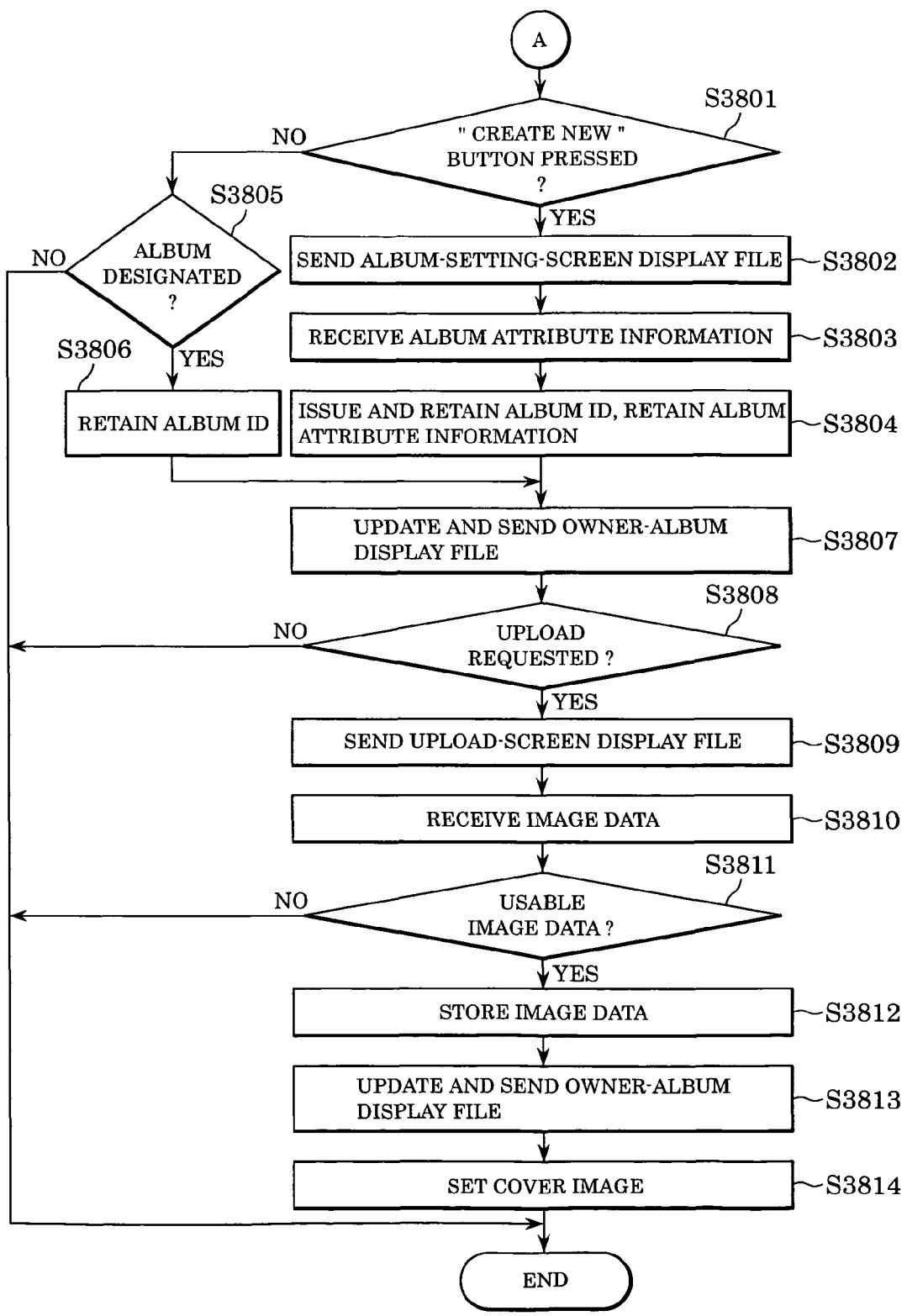
FIG. 38 is a flowchart showing the process of uploading image data from an owner user to the photo site of the present invention.

Next, the uploading of image data from the owner PC 102A displaying the owner album screen 3000 to the photo site 105 will be described with reference to FIG. 38.

Step S3801: The photo site 105 determines whether or not the owner PC 102A has informed the photo site 105 that the create new button 3006 for creating a new album has been pressed. The process proceeds to Step S3802 if it is determined that the photo site 105 has been informed of the pressing of the create new button 3006. The process proceeds to Step S3805 if it is determined that the photo site 105 has not been informed of the pressing of the button 3006.

Step S3802: The photo site 105 sends an album-setting-screen display file to the owner PC 102A.

Step S3803: The photo site 105 receives, from the owner PC 102A, album attribute information entered on an album-setting screen (not shown).

Step S3804: The photo site 105 issues an album ID to the newly created album for its unique identification. The photo site 105 creates a new record in the album information table 2600 managed in the attribute information database 118, and stores the album ID along with the owner user ID received in Step S1403 and album attribute information received in Step S3803. The photo site 105 retains the newly issued album ID as an album ID for the album selected by the owner user.

Figure 26:
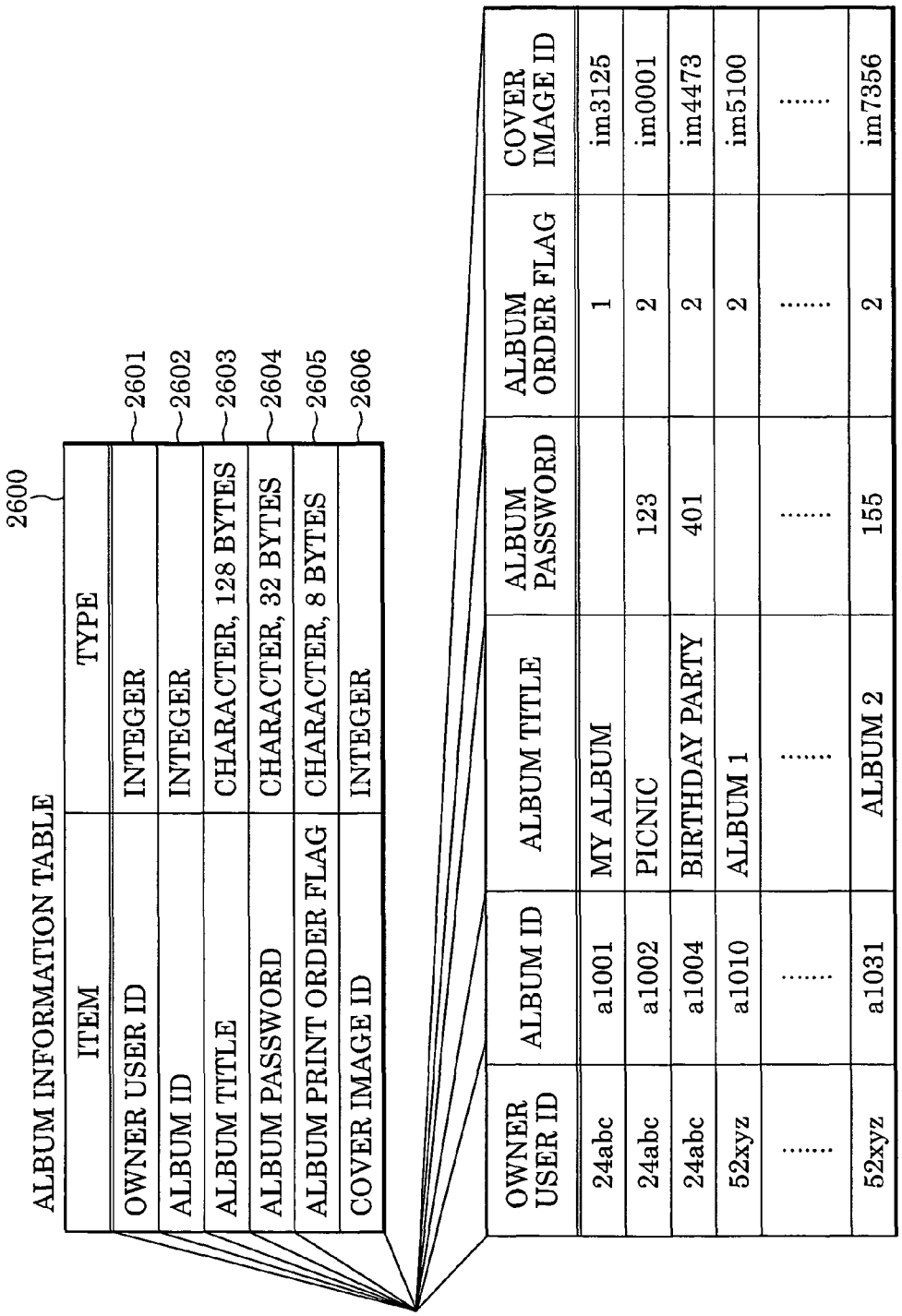
FIG. 26 shows an example of an album information table of the present invention.

FIG. 26 shows an example of the album information table 2600 according to the present embodiment. Items stored and managed in the album information table 2600 are an owner user ID 2601, an album ID 2602, an album title 2603, an album password 2604 for authentication when making an album available, an album-print-order flag 2605 for specifying whether or not prints can be ordered from images in an album, and a cover image ID 2606. If no authentication is to be performed when making an album available, a NULL value is assigned to a column for the album password 2604.

If the photo site 105 is informed by the owner PC 102A of the pressing of the delete button 3007 on the owner album screen 3000, along with a selected album ID, the photo site 105 deletes a record of the corresponding album from the album information table 2600.

Step S3805: The photo site 105 determines whether or not the owner PC 102A has informed the photo site 105 of the pressing of any of the buttons 3011 to 3015 representing albums along with an album ID corresponding to the button pressed. If it is determined that the photo site 105 has been informed of pressing of any of the buttons 3011 to 3015, the process proceeds to Step S3806, otherwise the process ends.

Step S3806: The photo site 105 retains the album ID received in Step S3805 as an album ID for the album selected by the owner user.

Step S3807: The photo site 105 obtains a thumbnail image of the image data associated with the album corresponding to the album ID retained in Step S3804 or Step S3806, and sends the owner PC 102A an owner-album-screen display file for displaying the thumbnail image in the display area 3023. For the newly created album, a blank is displayed in the display area 3023.

Step S3808: The photo site 105 determines whether or not the owner PC 102A has informed the photo site 105 that the upload button 3008 has been pressed. If it is determined that the upload button 3008 has been pressed the process proceeds to Step S3809, otherwise the process ends.

Step S3809: The photo site 105 sends an upload-screen display file to the owner PC 102A.

Step S3810: The photo site 105 receives image data selected, on an upload screen (not shown), from the storage area 121A.

Instead of performing Steps S3809 and S3810, the photo site 105 may receive image data selected by using software separately run by the owner PC 102A, the software being specifically designed for image uploading. Such software is also capable of performing communication based on protocols, such as HTTP and FTP that can be used on the Internet 104.

Step S3811: The photo site 105 checks, using the photo sharing module 106, whether or not the image data received in Step S3810 can be used. If it is determined that the image data can be used the process proceeds to Step S3812, otherwise the process ends.

Step S3812: The photo site 105 stores, in the image database 117, the image data received in Step S3810. The photo site 105 issues an image ID to the image data for its unique identification, and stores the image ID along with attribute information in an image information table 2700 in the attribute information database 118.

Figure 27:
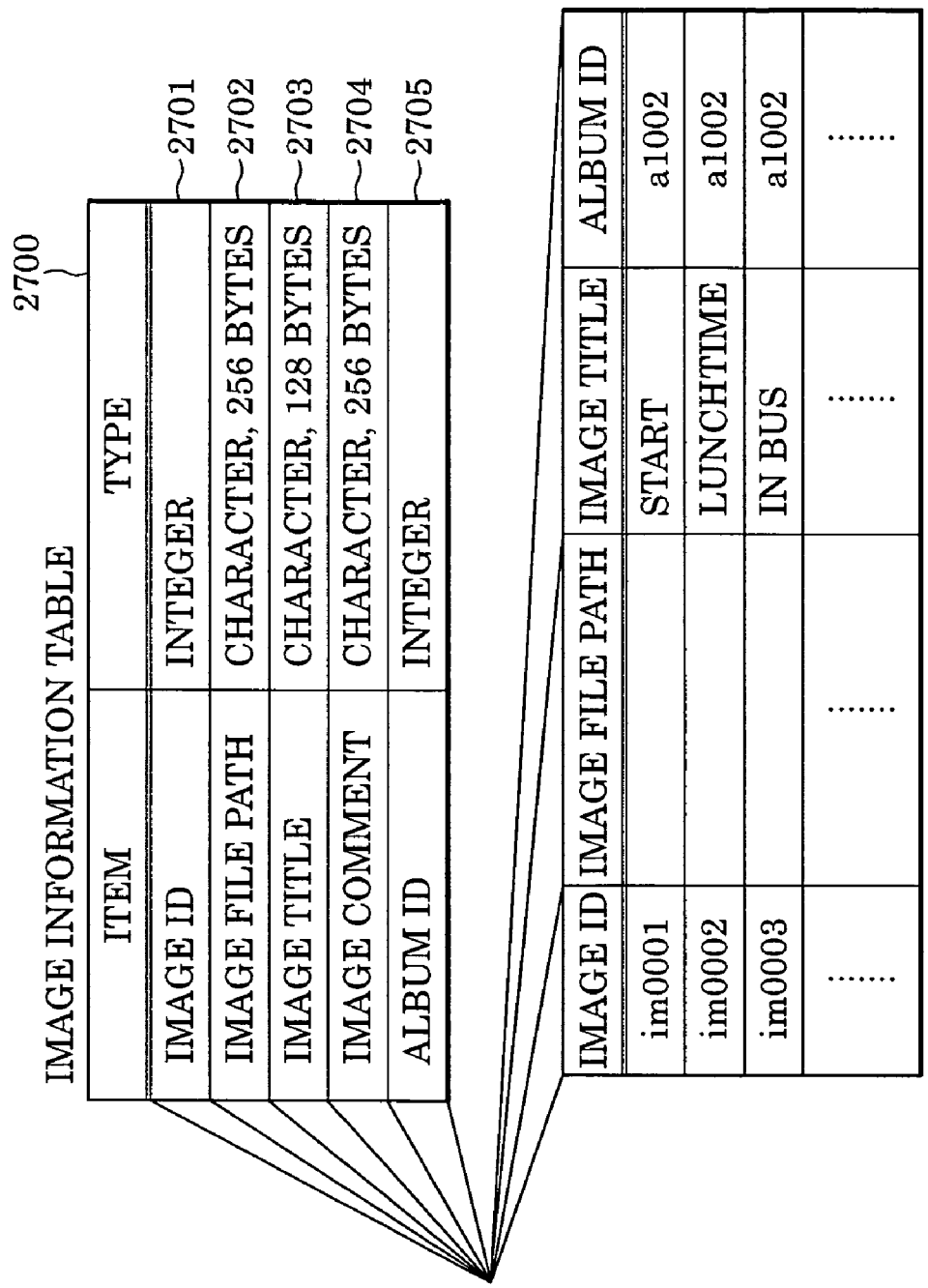
FIG. 27 shows an example of an image information table of the present invention.

FIG. 27 shows an example of an image information table 2700 according to the present embodiment. The image information table 2700 stores records, each containing an image ID 2701 for the unique identification of image data, a file path 2702 indicating the location of image data stored, an image title 2703 indicating the name of image data, an image comment 2704 for adding a comment to image data, and an album ID 2705 for the unique identification of an album associated with image data. Every time new image data is uploaded, the photo site 105 creates a record in the image information table 2700. The initial value of each of the image title 2703 and the image comment 2704 is NULL.

If the photo site 105 is informed by the owner PC 102A of the pressing of the delete button 3019 on the owner album screen 3000, along with a selected image ID, the photo site 105 deletes a record of the corresponding image data from the image information table 2700.

Step S3813: The photo site 105 informs the owner PC 102A that the image data has been successfully uploaded. At the same time, the photo site 105 updates the owner-album-screen display file for displaying thumbnail images in the display area 3003 on the owner screen 3000, the thumbnail images corresponding to the image data stored in the image database 117 in Step S3812. Then the photo site 105 sends the updated owner-screen display file to the owner PC 102A.

Step S3814: When the photo site 105 is informed of the selection of one of the check boxes 3030 to 3035 while being informed of the pressing of a cover setting button 3042 for the setting of a cover page, the photo site 105 selects image data corresponding to the checked check box as a cover image for the album. Specifically, the photo site 105 assigns the image ID of the selected image data to the cover image ID 2606 in the album information table 2600 in the attribute information database 118. If no cover image is to be selected, "0" is assigned to the cover image ID 2606.

<Notification of Album Availability>

Figure 39:
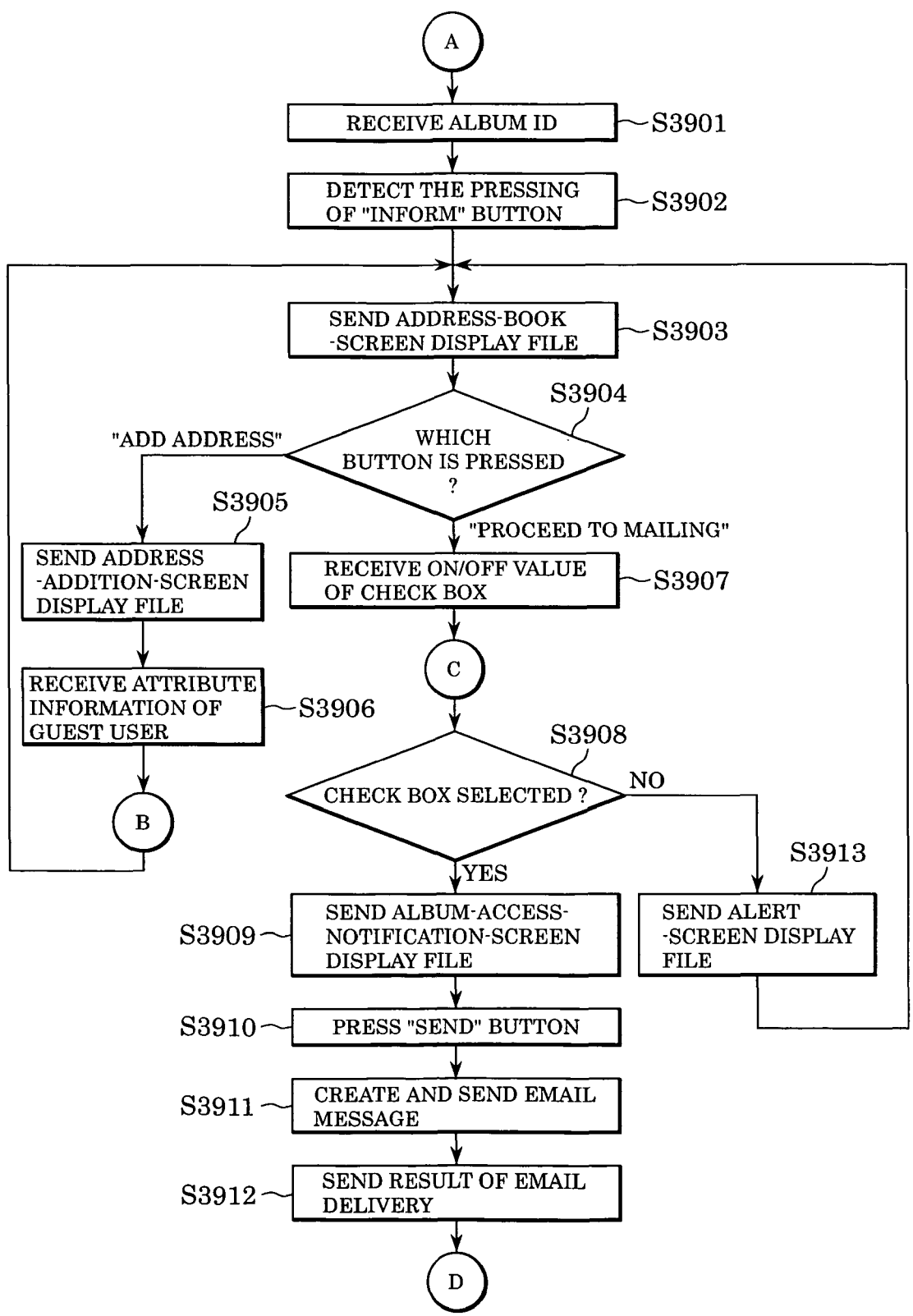
FIG. 39 is a flowchart showing the process by which the photo site of the present invention sends a guest user an email notification that an album has been made available.

FIG. 39 shows the process by which the photo site 105 informs a guest user selected by the owner PC 102A that a designated album has been made available.

Before informing the guest user of the availability of the album, the photo site 105 executes the login process (FIG. 14) for the owner PC 102A and sends an owner-album display file to the owner PC 102A.

Step S3901: The photo site 105 receives from the owner PC 102A an album ID for an album selected from albums displayed on the owner album screen 3000.

Step S3902: The photo site 105 is informed by the owner PC 102A of the pressing of the inform button 3005 on the owner album screen 3000.

Step S3903: The photo site 105 sends an address-book-screen display file to the owner PC 102A.

Figure 31:
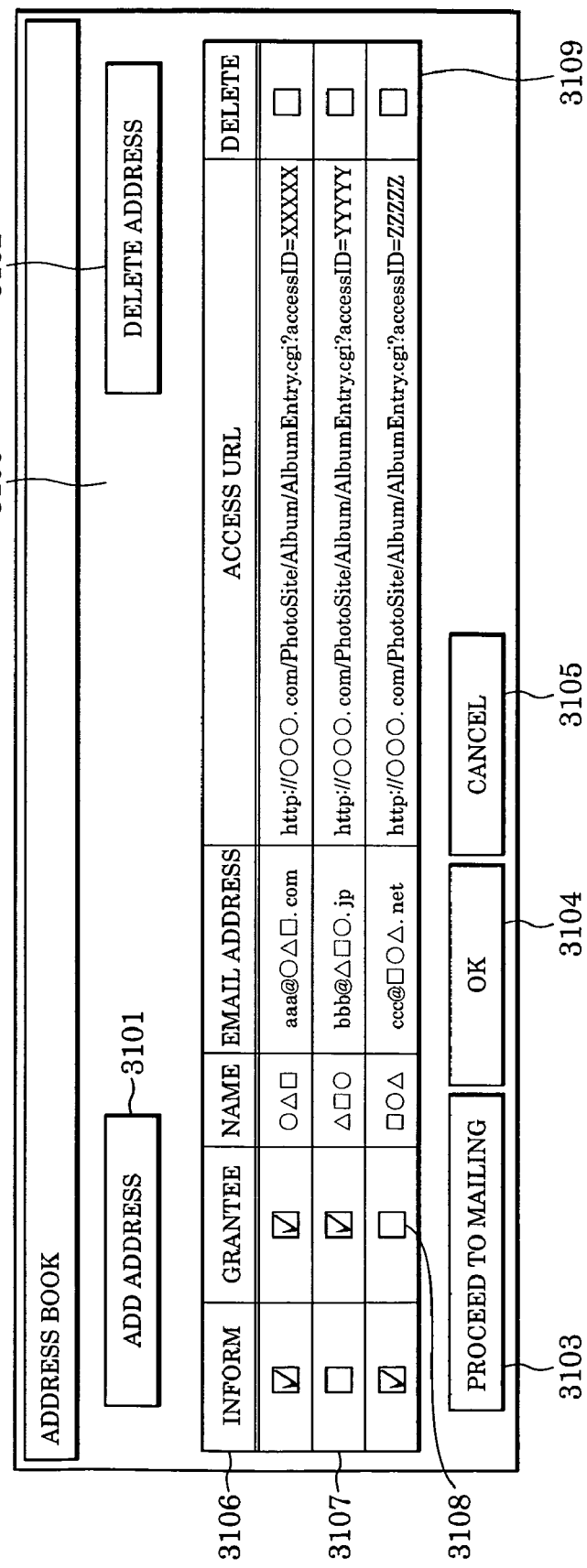
FIG. 31 shows an example of an address book screen of the present invention.

FIG. 31 shows an example of an address book screen 3100 that the owner PC 102A displays by expanding the address-book-screen display file. The address book screen 3100 provides an add address button 3101 for instructing the photo site 105 to add a new address, a delete address button 3102 for deleting an address, a mailing button 3103 for moving to an email notification screen, an OK button 3104 for informing the photo site 105 of the completion of address book setting, and a cancel button 3105 for canceling the setting. A display area 3106 for displaying an address list provides guest users' names and email addresses read from an address book table 2500 described below, and an access URL read from a guest-user URL table 2400 described below. Each address is provided with an inform check box 3107 for selecting the corresponding guest user as a recipient of an album availability notification, a grantee check box 3108 for selecting the corresponding guest user as a recipient to whom an album has been made available, and a delete check box 3109 for deleting the corresponding address from the address book table 2500.

Figure 32:
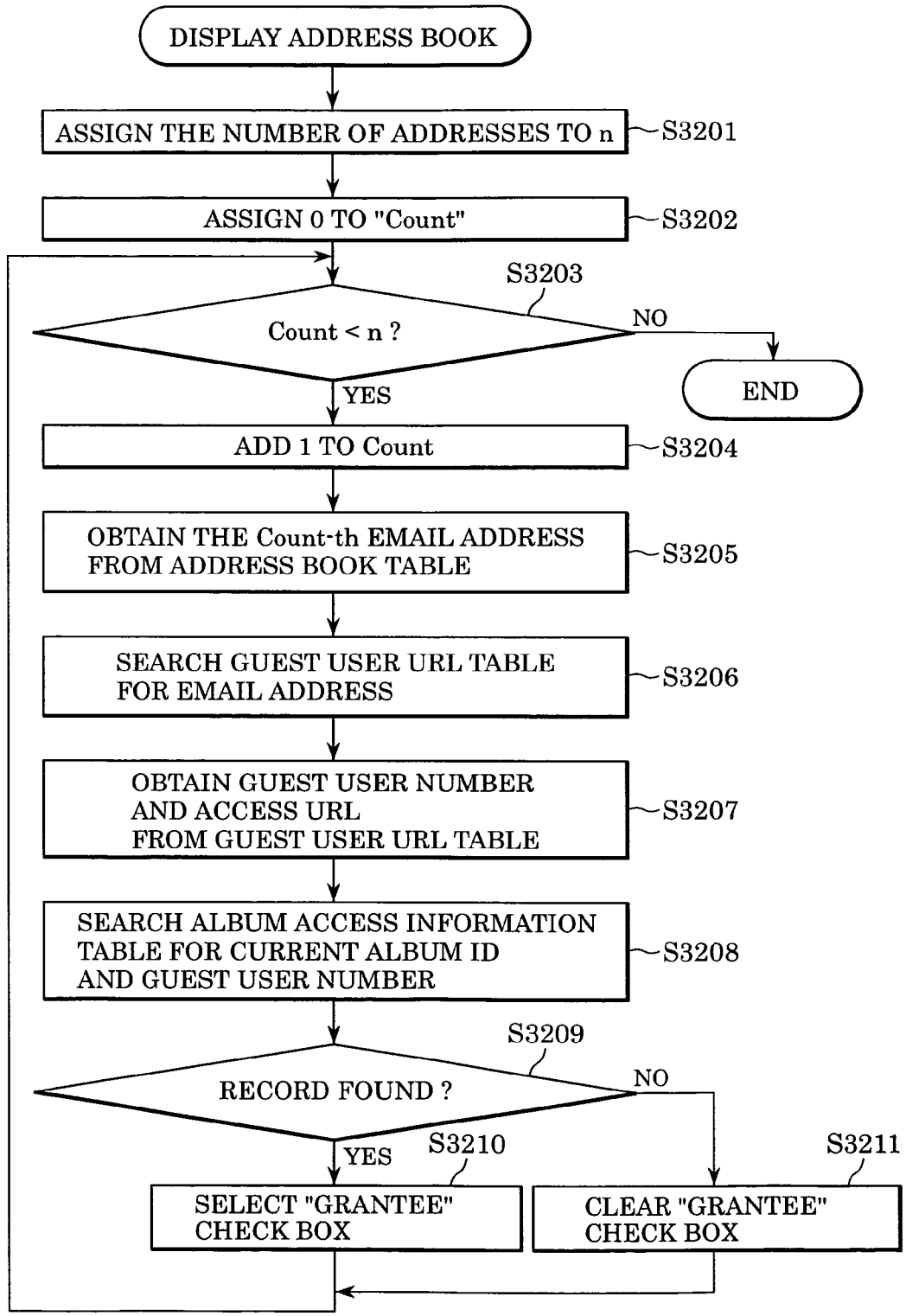
FIG. 32 is a flowchart showing the process by which the photo site of the present invention displays an address list on the address book screen.

The flowchart in FIG. 32 shows the process by which the photo site 105 of the present embodiment creates an address-book-screen display file related to display in the display area 3106.

Step S3201: The photo site 105 searches the address book table 2500, counts the number of records having the owner user ID received from the owner PC 102A in Step S1403, and assigns the number to n.

Step S3202: the photo site 105 assigns zero to a processing variable "Count" for counting the number of guest users.

Step S3203: Set values are compared between Count and n. If the value of Count is not smaller than n, processing ends. On the other hand, if the value of Count is smaller than that of n, processing proceeds to Step S3204.

Step S3204: Count is incremented by one.

Step S3205: The photo site 105 obtains, from the address book table 2500, the Count-th record having the same owner user ID 2501 as that received in Step S1403, and obtains a guest-user email address 2502 from the record.

Step S3206: The photo site 105 obtains, from the guest-user URL table 2400, a record having the same email address as that obtained in Step S3205.

Step S3207: The photo site 105 obtains a guest user number 2401 and an access URL 2403 from the record obtained in Step S3206.

Step S3208: The photo site 105 searches an album-access information table 2800 for a record having the album ID received from the owner PC 102A in Step S3901 and the guest user number obtained in Step S3207.

Step S3209: The photo site 105 determines whether or not the record has been found. If it is determined that the record has been found, processing proceeds to Step S3210. If it is determined that the record has not been found, processing proceeds to Step S3211

Step S3210: The "grantee" check box 3008 is set to ON based on the determination that the album has already been made available to this guest user. After setting the "grantee" check box, processing returns to Step S3203 and the photo site 105 repeats Steps S3203 to S3211 until Count reaches n.

Step S3211: The "grantee" check box 3008 is set to OFF based on the determination that the album has not yet been made available to this guest user. After clearing the "grantee" checkbox, processing returns to Step S3203 and the photo site 105 repeats Steps S3203 to S3211 until Count reaches n.

Thus, the photo site 105 obtains guest users' email addresses and access URLs to be displayed in the display area 3106, and sets these obtained values in the address-book-screen display file.

Step S3904: The photo site 105 determines which of the buttons 3103 to 3105 on the address book screen 3100 has been pressed. The process proceeds to Step S3905 if it is determined that the photo site 105 has been informed by the owner PC 102A of the pressing of the "add address" button 3101. The process proceeds to Step S3907 if it is determined that the photo site 105 has been informed of the pressing of the "proceed to mailing" button 3103.

Step S3905: The photo site 105 sends an address-addition-screen display file to the owner PC 102A. An example of the address addition screen 1000 that the owner PC 102A displays by expanding the address-addition-screen display file is the same as that of the first embodiment and is shown in FIG. 10.

Step S3906: The photo site 105 is informed by the owner PC 102A of the guest user's name and email address entered in the entry fields 1001 and 1002 along with the pressing of the OK button 1003 on the address addition screen 1000.

Figure 33:
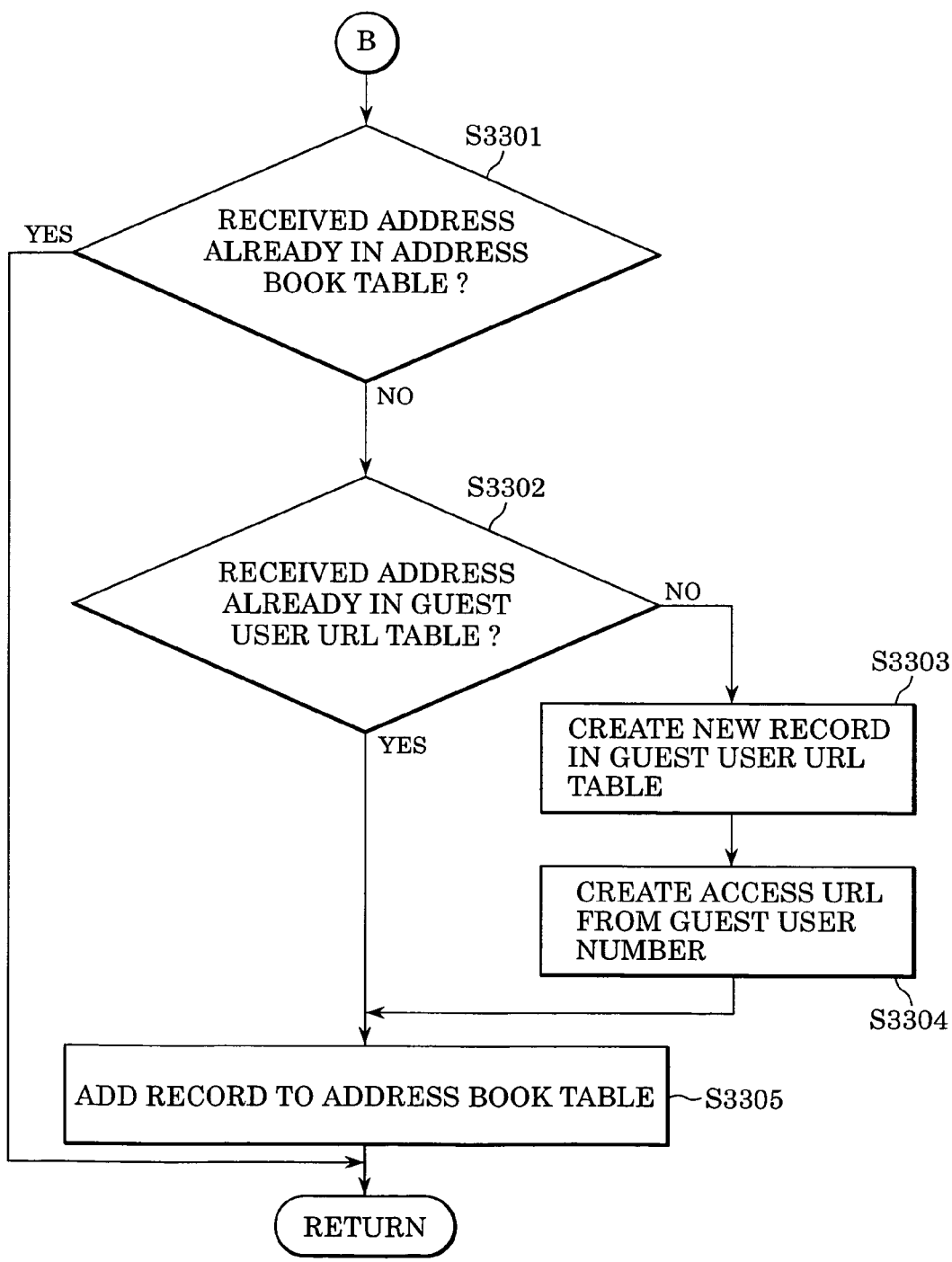
FIG. 33 is a flowchart showing the process by which the photo site of the present invention adds an address.

FIG. 33 is a flowchart showing the process of adding an address to the guest user's attribute information obtained in Step S3906.

Step S3301: The photo site 105 determines whether or not the guest user's email address received from the owner PC 102A in Step S3906 exists in the address book table 2500. If it is determined that it exists, the process ends without doing anything, as there is no need for addition. If it is determined that it does not exist, the process proceeds to Step S3302.

Step S3302: The photo site 105 determines whether or not the guest user's email address received from the owner PC 102A in Step S3906 exists in the guest-user URL table 2400. If it is determined that it does not exist, the process proceeds to Step S3303. If it is determined that it exists, the process proceeds to Step S3305.

Step S3303: The photo site 105 creates a new record in the guest-user URL table 2400. The maximum value of the guest user number issued so far is incremented by one and assigned to the guest user number 2401. The guest user's email address received from the owner PC 102A in Step S3906 is assigned to a guest-user email address 2402.

FIG. 24 shows an example of the guest-user URL table 2400 according to the present embodiment. The photo site 105 stores and manages the guest-user URL table 2400 in the attribute information database 118. In the guest-user URL table 2400, guest users' email addresses are managed in a unified fashion, without depending on the owner user. Items stored in the guest-user URL table 2400 are the guest user number 2401, the guest-user email address 2402, the access URL 2403, a guest-user password 2404, and a guest-user-print-order flag 2405.

Step S3304: The photo site 105 creates, using reversible encryption, an access URL from the guest user number 2401 issued in Step S3303. Any other encryption method may be used as long as the reversible transformation can be performed while maintaining the one-to-one correspondence between the access URL and the guest user number 2401. The created access URL is set in the new record created in the guest-user URL table 2400 in Step S3303.

An example of the access URL created in Step S3304 is shown below:

http://OOO.com/PhotoSite/Album/
AlbumEntry.cgi?accessID=XXXXX

Step S3305: The photo site 105 creates a new record in the address book table 2500. The owner user ID 2501 is assigned the owner user ID received in Step S1403. The guest-user email address 2502 and a guest user name 2503 are assigned attribute information, such as the email address received from the owner PC 102A in Step S3906. Processing then returns.

Figure 25:
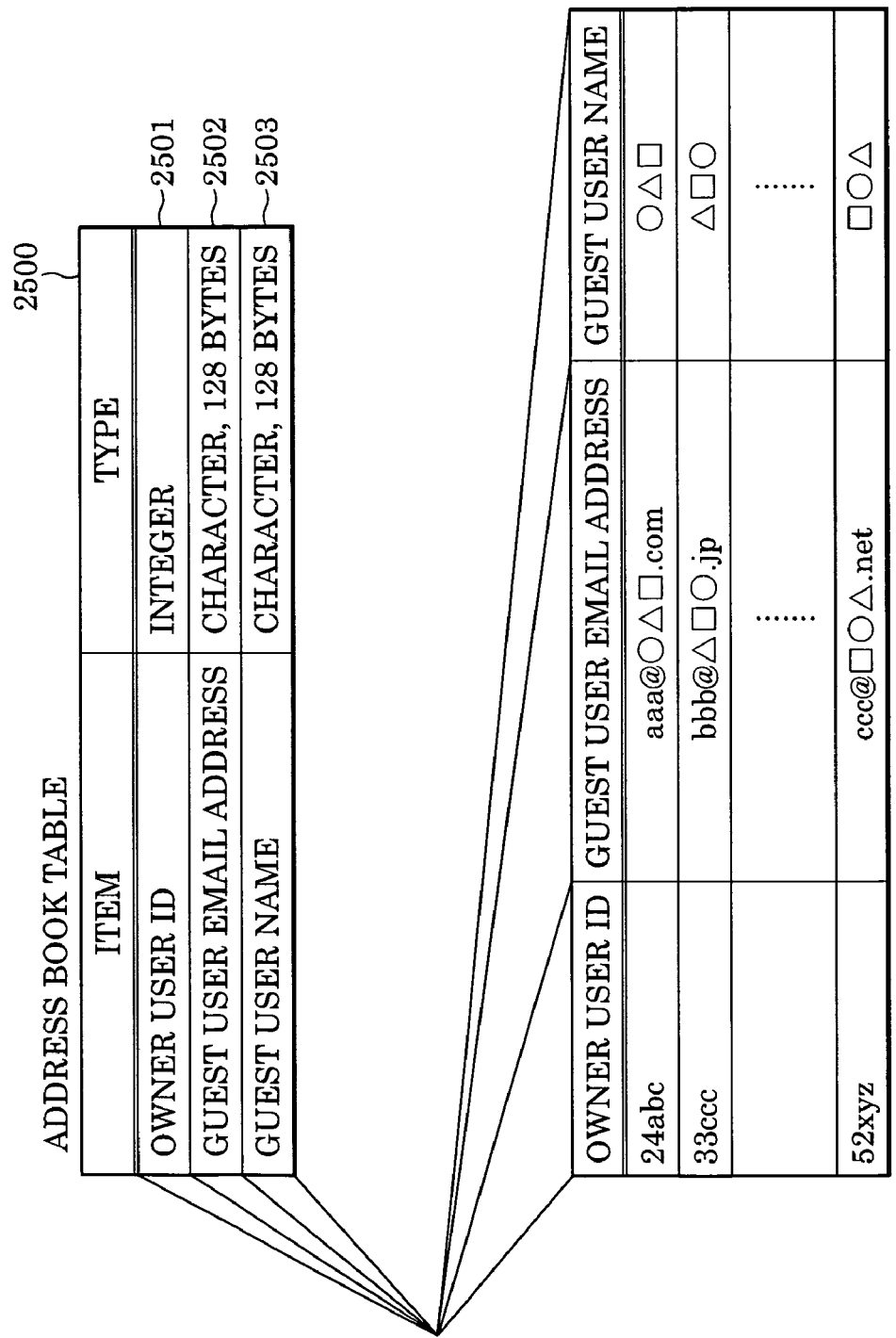
FIG. 25 shows an example of an address book table of the present invention.

FIG. 25 shows an example of the address book table 2500 according to the present embodiment. The photo site 105 stores and manages the address book table 2500 in the attribute information database 118. The address book table 2500 stores records, each containing the owner user ID 2501, the email address 2502 of a guest user designated by the owner user, and the guest user name 2503.

Step S3907: The photo site 105 receives, from the owner PC 102A, guest users' email addresses and the corresponding ON/OFF values entered in the check boxes 3107, 3108, and 3109.

Figure 35:
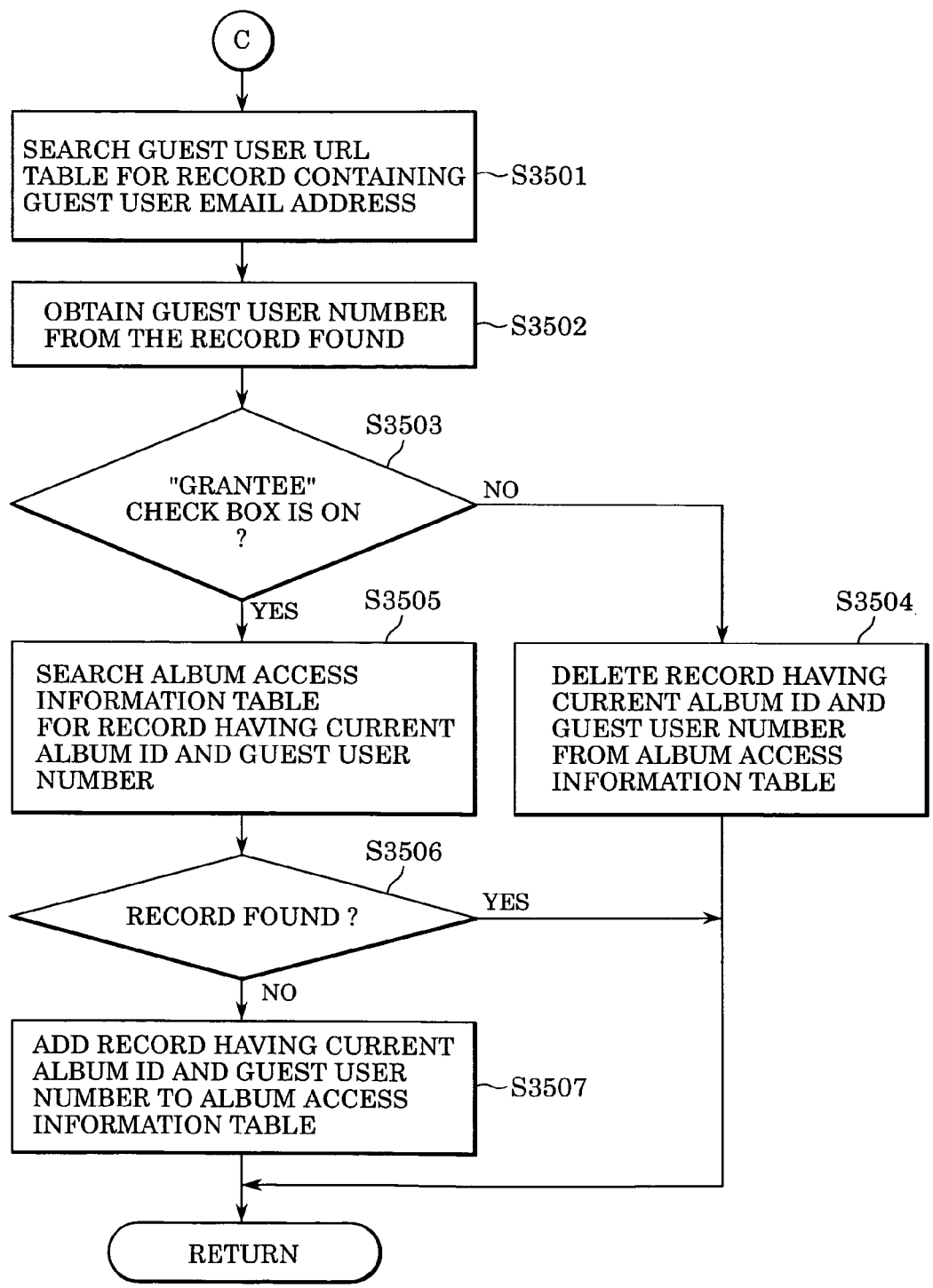
FIG. 35 is a flowchart showing the process by which the photo site of the present invention makes settings for an album-availability notification for each guest user's address.

The flowchart in FIG. 35 shows the process by which the photo site 105 makes the settings for an album-availability notification for each guest user's email address.

Step S3501: The photo site 105 searches the guest-user URL table 2400 for a record of a guest user's email address.

Step S3502: The photo site 105 obtains the guest user number 2401 from the record found in Step S3501.

Step S3503: The photo site 105 determines, for each address on the address book screen 3100, whether or not the "grantee" check box 3108 is ON. If it is determined that the "grantee" check box 3108 is OFF, the process proceeds to Step S3504. If it is determined that the "grantee" check box 3108 is ON, the process proceeds to Step S3505.

Step S3504: The photo site 105 deletes, from the album-access information table 2800, a record containing the album ID obtained in Step S3901 and the guest user number obtained in Step S3502. Processing then returns (to Step S3908)

Step S3505: The photo site 105 searches the album-access information table 2800 for a record containing the album ID obtained in Step S3901 and the guest user number obtained in Step S3502.

Step S3606: A determination is made as to whether a record was found from the search in Step S3505. If it is determined that a record was found, the process is terminated because there is a match in the album-access information table 2800, and notification of the album availability is considered to have already been sent. If no such record is found, the process proceeds to Step S3507.

Step S3507: The photo site 105 creates and adds a new record to the album-access information table 2800, the new record containing the album ID obtained in Step S3901 and the guest user number obtained in Step S3502. Processing then returns (to Step S3908).

Figure 28:
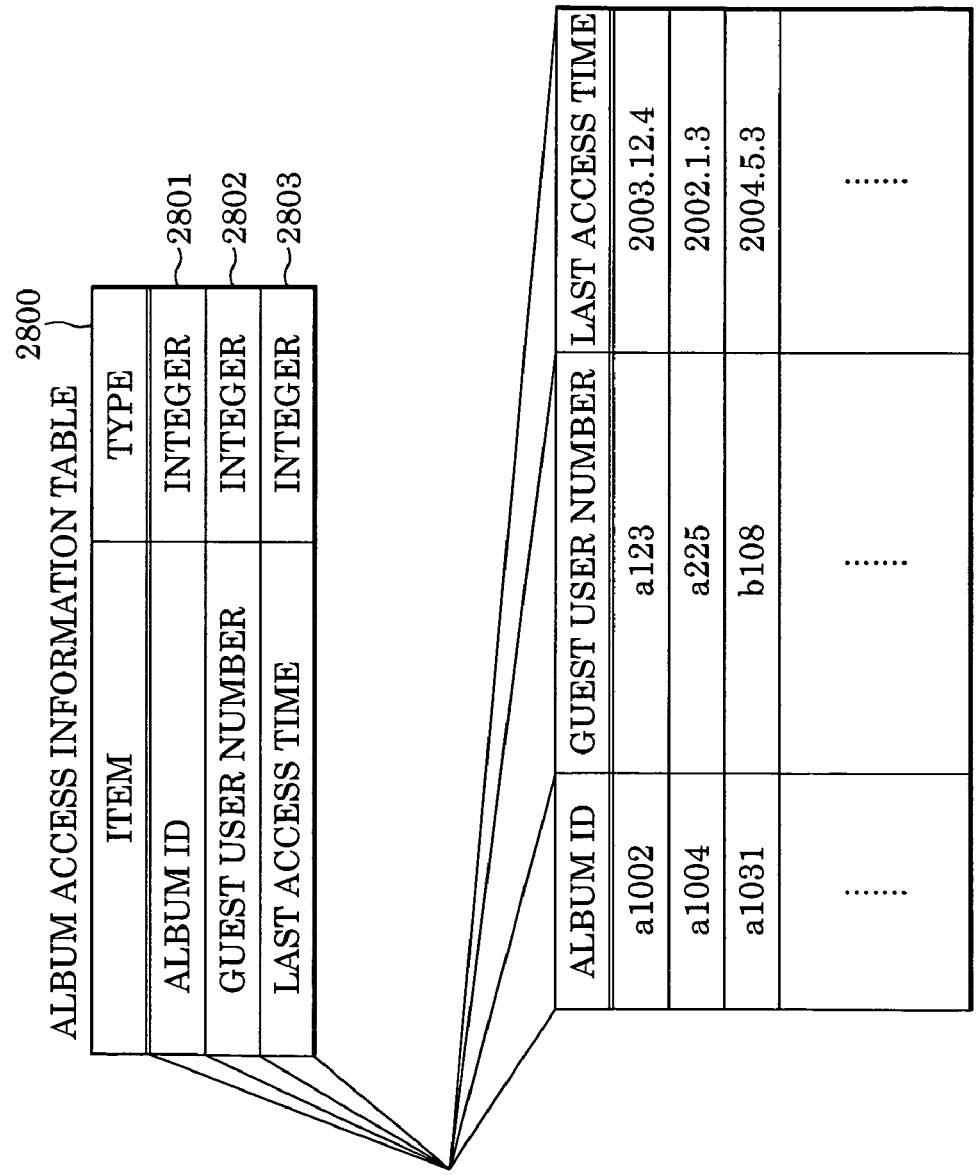
FIG. 28 shows an example of an album-access information table of the present invention.

FIG. 28 shows an example of the album-access information table 2800 according to the present embodiment. The photo site 105 stores and manages the album-access information table 2800 in the attribute information database 118. Items managed in the album-access information table 2800 are the album ID 2801 for albums selected by the owner user to be made available, the guest user number 2802 for guest users selected as recipients to whom such albums are to be made available, and the last access time 2803 for indicating the last time when the guest user viewed the album.

Step S3908: The photo site 105 determines whether or not an ON value is assigned to any of the inform check boxes 3107. If it is determined that an ON value is assigned, the process proceeds to Step S3909. If it is determined that an ON value is not assigned, the process proceeds to Step S3913.

Step S3909: The photo site 105 sends an album-availability-notification-screen display file to the owner PC 102A. An album-availability notification screen that the owner PC 102A displays by expanding the album-availability-notification-screen display file is basically the same as the image-availability notification screen of the first embodiment, and is shown in FIG. 11.

Step S3910: The photo site 105 is informed by the owner PC 102A of the pressing of the send button 1107 on an album-availability notification screen 1100.

Step S3911: The photo site 105 creates and sends one or more email messages, each including a "From" field containing an owner user's email address entered in the entry field 1104; a "To" field containing one of guest users' email addresses listed on the album-availability notification screen 1100; a subject field containing a subject entered in the entry field 1105; a message field containing a message entered in the entry field 1106, and an access URL corresponding to the guest user's email address in the "To" field.

An example of an email message according to the present embodiment is the same as that of the first embodiment, and is shown in FIG. 12. The details entered on the album-availability notification screen 1100 appear in the respective fields of the email message.

Step S3912: The photo site 105 informs the owner PC 102A that the email message has been successfully sent in Step S3911. If the email delivery was unsuccessful in Step S3911, the photo site 105 sends an error notification to the owner PC 102A. At the same time, the photo site 105 sends the owner PC 102A an owner-album-screen display file for displaying the owner album screen 3000. Processing then returns to Step S1405 (of FIG. 14).

Step S3913: The photo site 105 sends the owner PC 102A an alert-screen display file to prompt the owner user to enter an ON value in the inform check box 3107. If the photo site 105 is informed of the pressing of the cancel button 1108, the photo site 105 sends an address-book-screen display file to the owner PC 102A. Processing then returns to Step S3903.

Figure 34:
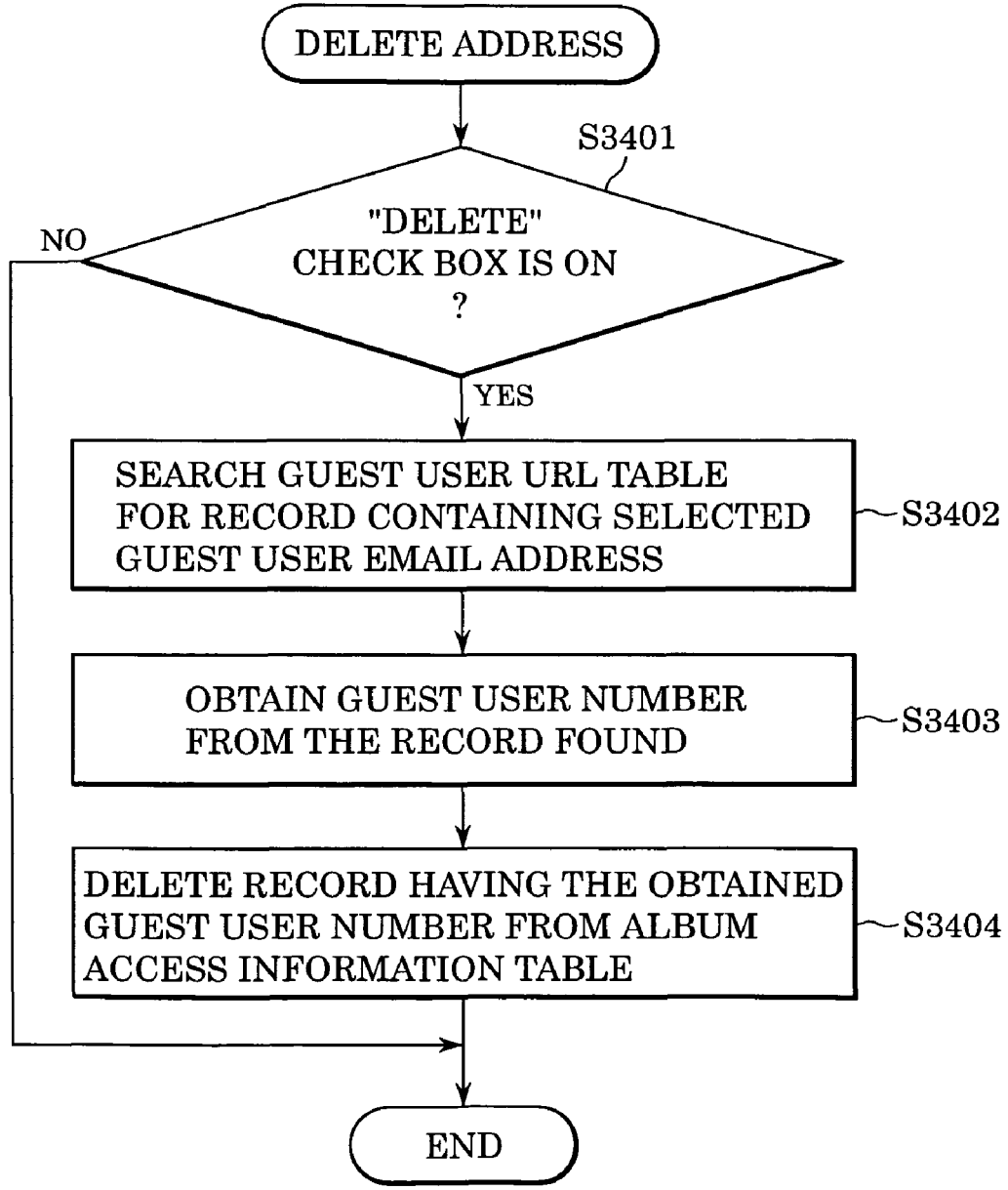
FIG. 34 is a flowchart showing the process by which the photo site of the present invention deletes an address.

The flowchart in FIG. 34 shows the operation of the photo site 105 when being informed by the owner PC 102A of the pressing of the delete address button 3102 on the address book screen 3100.

Step S3401: The photo site 105 determines whether there any delete check boxes 3109 provided with an ON value (i.e., checked). If it is determined that there are not any delete check boxes 3109 with an ON value, the photo site 105 sends the owner PC 102A an alert-screen display file for prompting the owner user to select the check box 3109, and performs no further processing. If it is determined that an ON value is assigned to any of the delete check boxes 3109, processing proceeds to Step S3402.

Step S3402: The photo site 105 searches the guest-user URL table 2400 for a record containing an email address corresponding to the delete check box 3109 with an ON value.

Step S3403: The photo site 105 obtains the guest user number 2401 from the record found in Step S3402.

Step S3404: The photo site 105 deletes, from the album-access information table 2800, all records containing the guest user number obtained in Step S3403. Thus, the designated guest user's email address is deleted from the owner user's address book.

<Album Viewing of Guest User>

The guest PC 102B receives an email notification when the owner user's image data uploaded to the photo site 105 has been made available for viewing. The following describes, with reference to the drawings, the method by which the guest PC 102B receives and displays the owner user's image data stored in the image database 117 for the photo site 105.

The guest user enters and sends, using the guest browser 120B on the guest PC 102B, an access URL appearing in the email notification to the photo site 105 via the Internet 104. The guest user receives, expands, and displays an available-album-screen display file sent from the photo site 105.

Figure 36:
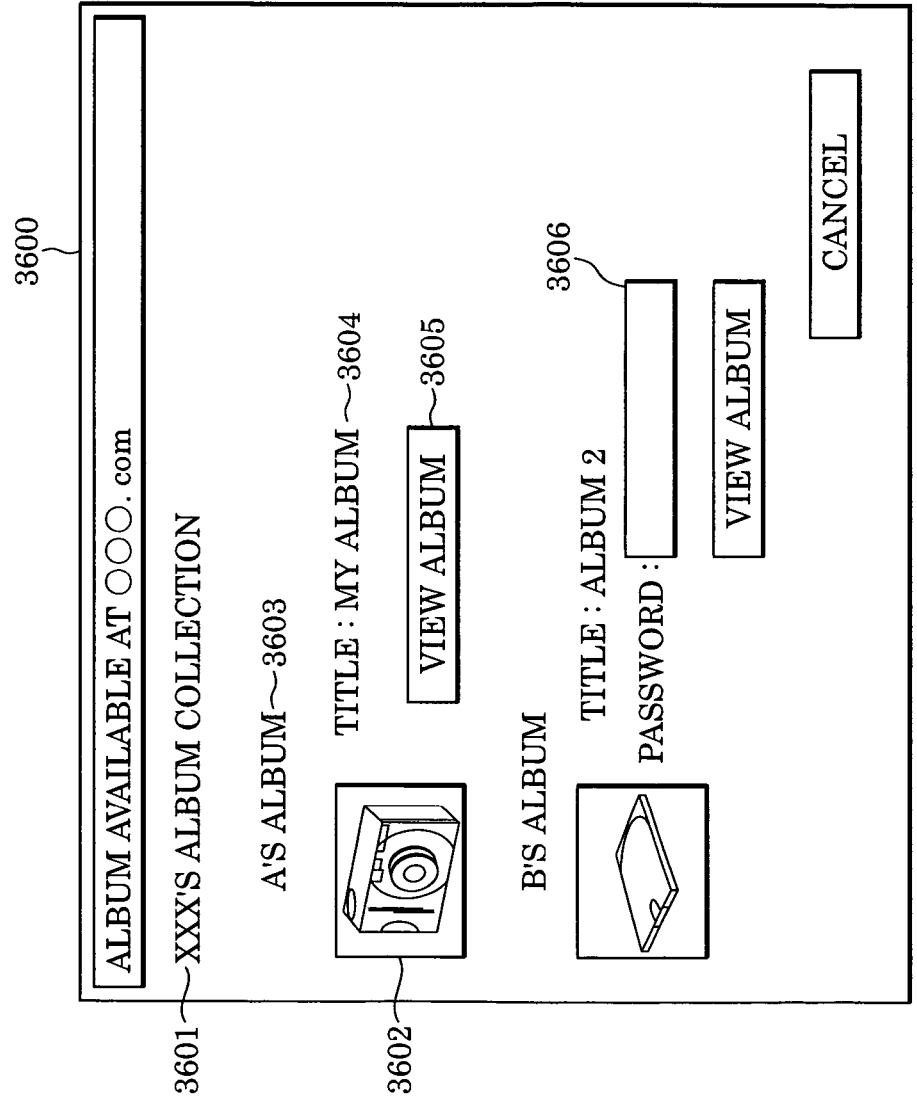
FIG. 36 shows an example of an available-album screen, for a guest user, of the present invention.

FIG. 36 shows an example of an available-album screen 3600 for the guest user, according to the present embodiment. The available-album screen 3600 provides a guest name display area 3601 showing the guest user's name, thumbnail images 3602 showing cover images of owner users' albums made available, an owner name display area 3603 showing the owner users' names, an album title display area 3604 showing the album titles, and view buttons 3605 to view the albums. A password entry field 3606 will also be provided if a password is set for the album.

Figure 37:
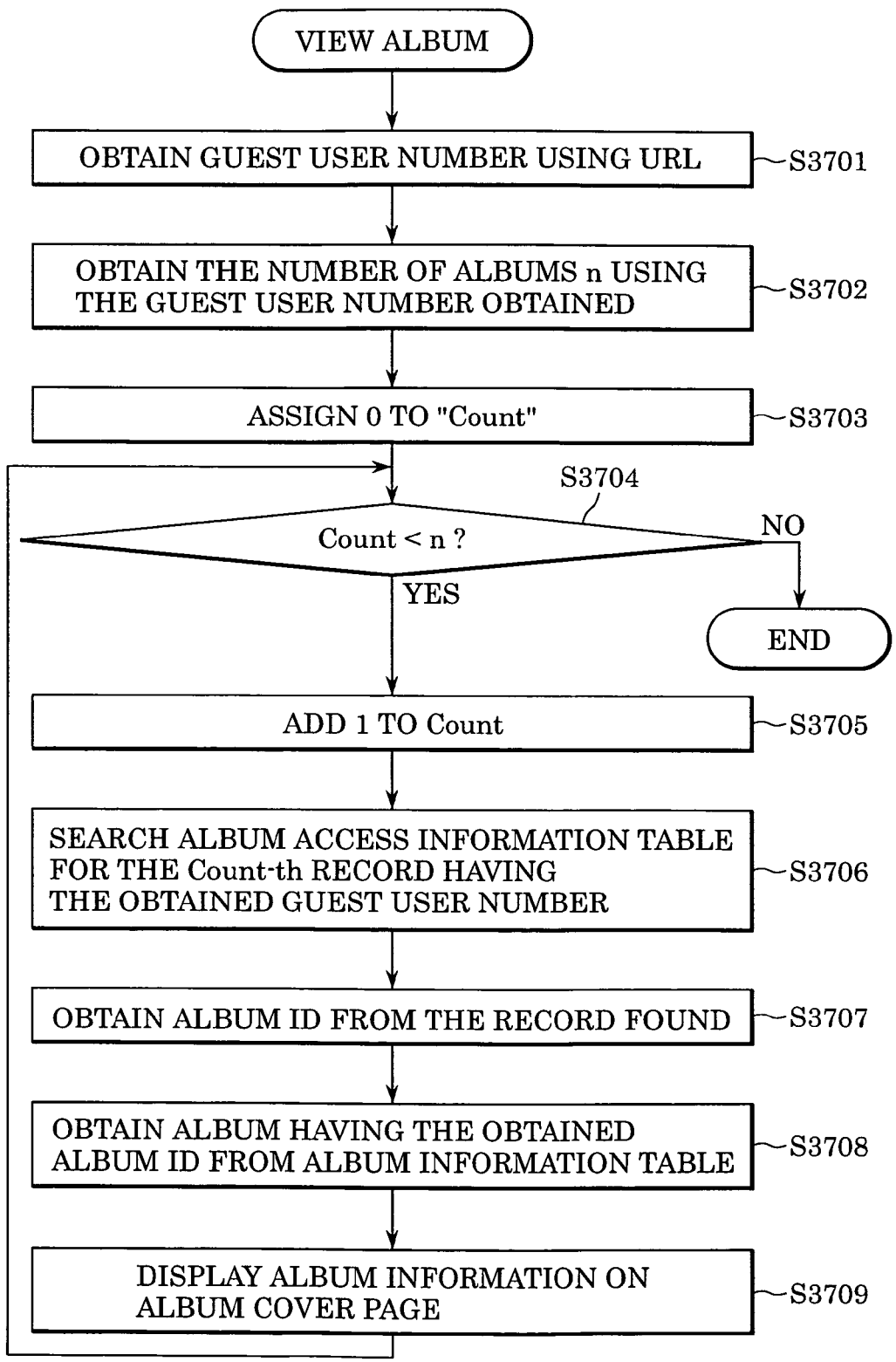
FIG. 37 is a flowchart showing the process by which the photo site of the present invention displays the available-album screen in a browser on a guest user's PC.

FIG. 37 is a flowchart showing the process by which the photo site 105 displays the available-album screen 3600 in the guest browser 120B on the guest PC 102B, according to the present embodiment.

Step S3701: The photo site 105 searches the guest-user URL table 2400 for a record containing an access URL received from the guest PC 102B, and obtains a guest user number from the record found.

Step S3702: The photo site 105 searches the album-access information table 2800, counts the number of albums with the guest user number obtained in Step S3701, and assigns the number to n.

Step S3703: The photo site 105 assigns zero to a processing variable "Count" for counting the number of albums.

Step S3704: The photo site 105 determines whether or not Count has reached n. If it is determined that Count is smaller than n, processing proceeds to Step S3705, otherwise processing ends.

Step S3705: Count is incremented by one.

Step S3706: The photo site 105 obtains, from the album-access information table 2800, the Count-th record with the guest user number obtained in Step S3701.

Step S3707: The photo site 105 obtains an album ID from the record found in Step S3706.

Step S3708: The photo site 105 obtains, from the album information table 2600, a record with the album ID obtained in Step S3707.

Step S3709: The photo site 105 obtains an owner user ID from the record obtained in Step S3708. Moreover, the photo site 105 obtains, from an owner-user information table (not shown), an owner user's name corresponding to the owner user ID obtained, and sets the obtained owner user's name in an available-album-screen display file to be displayed in the owner name display area 3603. The photo site 105 obtains an album title from the record obtained from the album information table 2600 in Step S3708, and sets the album title in the available-album-screen display file to be displayed in the album title display area 3604. The photo site 105 obtains, from the image database 117, a cover image corresponding to the album ID and sets the cover image in the available-album-screen display file to be displayed in the thumbnail image display area 3602. The photo site 105 creates the view button 3605 for displaying image data contained in the album and sets the view album button in the available-album-screen display file. If a password for the album is defined in the column for the password 2604, the photo site 105 sets the available-album-screen display file such that the password entry field 3606 will be displayed. The photo site 105 obtains, from the address book table 2500, a guest user's name corresponding to the guest user number obtained in Step S3701, and sets the guest user's name in the available-album-screen display file to be displayed in the guest name display area 3601. Thus, the photo site 105 can creates the available-album-screen display file for the guest user by repeating Steps S3705 to S3709 until Count reaches n.

Then the photo site 105 sends the available-album-screen display file to the guest PC 102B via the Internet 104. The guest browser 120B on the guest PC 102B expands the received available-album-screen display file to display the available-album screen 3600 for the guest user.

Upon receipt of the access URL from the guest PC 102B in Step S3701, the photo site 105 may send the guest PC 102B a password-entry-screen display file for the guest user, and proceed to Step S3702 only when the password received from the guest PC 102B is verified. This can prevent an album from being exposed to an unauthorized user who has obtained the guest user's access URL by improper means. In this case, the photo site 105 verifies the entered password against the guest password read from the guest-user URL table 2400. It is also possible that the photo site 105 allows a password to be set on the guest PC 102B when the guest user's URL is initially received. The photo site 105 stores the set password in a column for the guest-user password 2404 in the guest-user URL table 2400, thus performing password authentication for the guest user.

Figure 29:
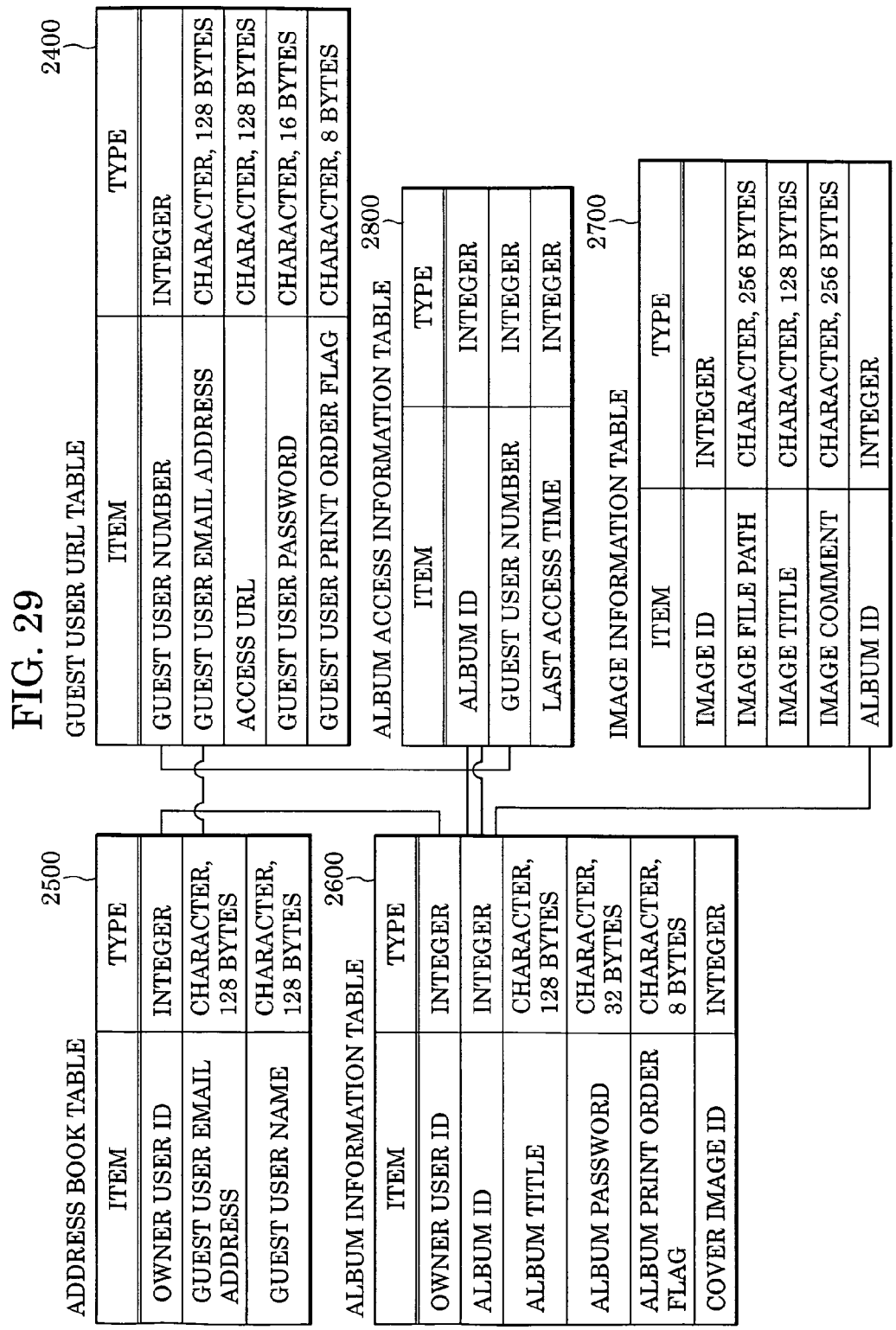
FIG. 29 shows the relationships between the tables in FIGS. 24 to 28, in the present invention.

FIG. 29 shows the relationships between the tables in FIGS. 24 to 28 that the photo site 105 of the present embodiment manages in the attribute information database 118.

As described above, a guest user can access, using a unique URL, a plurality of image data (albums) made available from an owner user.

<Print Order from Guest User>

Figure 40:
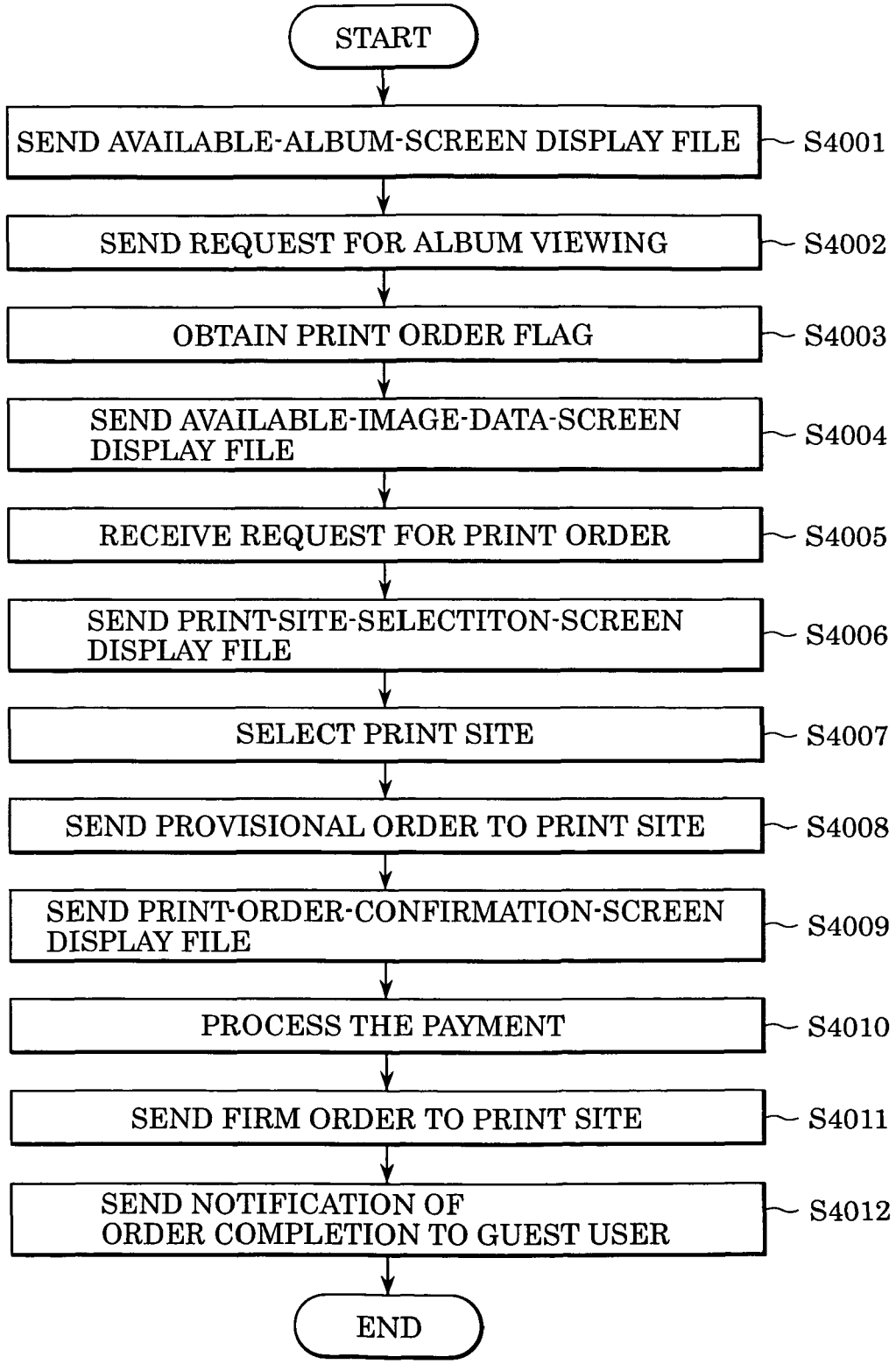
FIG. 40 is a flowchart showing the process by which the photo site of the present invention forwards a print order from a guest user's PC to a print site.

In response to a request from the guest PC 102B, the photo site 105 instructs one of the print sites 109 to print owner user's image data uploaded to the image database 117. This process will now be described with reference to the flowchart in FIG. 40. From one or a plurality of print sites 109, the photo site 105 selects one print site 109 depending on the request from the guest PC 102B or the printing capability of the print site, and instructs the selected print site 109 to print image data.

Step S4001: Upon receipt of an access URL from the guest PC 102B, the photo site 105 sends an available-album-screen display file to the guest PC 102B via the Internet 104.

Step S4002: The photo site 105 is informed by the guest PC 102B of the pressing of a view button 3605 on the available-album screen 3600.

Step S4003: The photo site 105 obtains, from the guest-user URL table 2400, a guest-user-print-order flag corresponding to the accessed URL. In the present embodiment, "1" indicates that the guest user can order prints, "2" indicates that the guest user cannot order prints, and "3" indicates that the guest user can order prints depending on the album settings. If a guest-user-print-order flag "1" is obtained, the photo site 105 creates an available-image-data-screen display file that allows a print order button (not shown) to be displayed. If "2", is obtained, the photo site 105 creates an available-image-data-screen display file that does not allow a print order button to be displayed, and does not perform print order processing which is described below. If "3" is obtained, the photo site 105 obtains, from the album information table 2600, an album-print-order flag corresponding to the album ID. Then, the photo site 105 creates an available-image-data-screen display file that allows the print order button to be displayed depending on the album-print-order flag.

Step S4004: The photo site 105 sends the guest PC 102B an available-image-data-screen display file for displaying image data contained in an album corresponding to the view button 3605 pressed.

Step S4005: The photo site 105 is informed by the guest PC 102B that the print-site selection buttons 2001 on the print-site selection screen 2000 has been pressed.

Step S4006: The photo site 105 sends a print-site-selection-screen display file to the guest PC 102B. An example of a print-site selection screen of the present embodiment is the same as that of the first embodiment and is shown in FIG. 20. The print-site selection screen 2000 provides details of print services (such as available types and sizes of paper), unit prices, delivery schedules, and the like, of each print site 109.

Step S4007: The photo site 105 detects the pressing of one of print-site selection buttons 2001 to 2004 corresponding to the respective print sites 109 displayed on the print-site selection screen 2000.

Step S4008: The photo site 105 creates a provisional print order containing an album ID and sends it to the print site 109 selected in Step S4007. The print site 109 obtains, from the image database 117 in the photo site 105, thumbnail images corresponding to image data in an album having the album ID contained in the provisional print order. Then, the print site 109 creates and sends a print-order-screen display file to the guest PC 102B.

Figure 41:
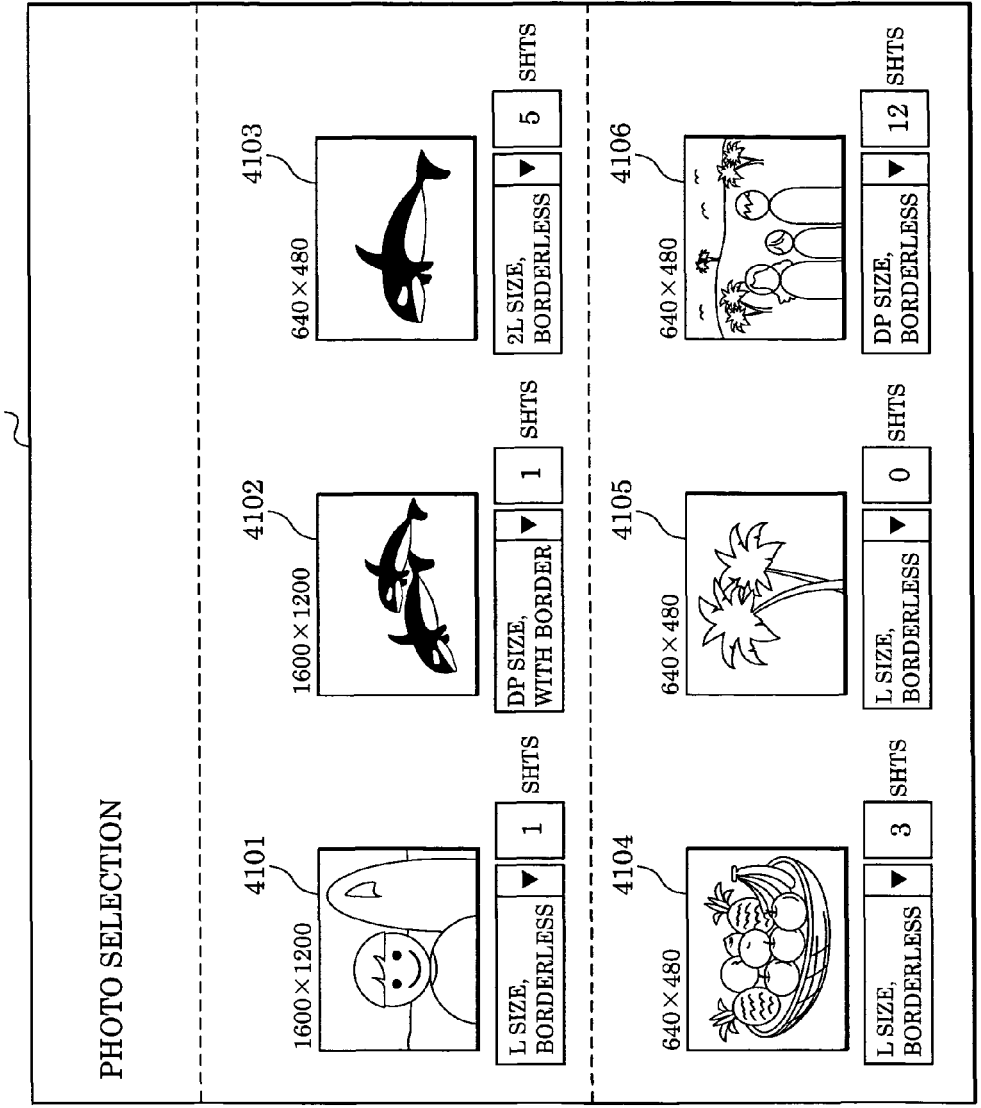
FIG. 41 shows an example of a print order screen of the present invention.

FIG. 41 shows an example of a print order screen that the guest PC 102B displays by expanding the print-order-screen display file. Based on thumbnail images 4101 to 4106 presented on a print order screen 4100, the guest PC 102B selects image data to be printed and inputs information, such as the type and size of paper, the number of copies, and address for delivery, in the corresponding entry fields.

Based on the information, such as the type and size of paper and the number of copies, received from the guest PC 102B, the print site 109 calculates the printing costs using a cost calculation module (not shown). The print site 109 then outputs the printing costs to the photo site 105.

Step S4009: Based on the printing costs and the like received from the print site 109, the photo site 105 creates and sends a print-order-confirmation-screen display file to the guest PC 102B. When the guest user approves the method of payment and the details of the print order presented on a print-order-confirmation screen (not shown), the photo site 105 receives a print-order approval action from the guest PC 102B.

Step S4010: The photo site 105 sends a payment-screen display file to the guest PC 102B. Then, the photo site 105 receives payment information input according to a payment screen (not shown) by the guest PC 102B, the payment information being required for the payment (for example, a credit card number and expiration date). A settlement module 107 in the photo site 105 accepts the payment information and processes the payment. Instead of the photo site 105, a settlement site (not shown) provided by a bank or credit card company may communicate with the guest PC 102B to process the payment, thus outputting the result of the settlement process to the photo site 105.

Step S4011: On completion of the settlement process, the photo site 105 sends a firm print order to the print site 109.

In response to the firm print order, the print site 109 obtains, from the image database 117 in the photo site 105, the image data selected by the guest PC 102B and prints the obtained image data on the printer 111. The printed material 112 is delivered to the address designated by the guest PC 102B.

Step S4012: The photo site 105 informs the guest PC 102B of the completion of the print order process.

By informing the photo site 105, using the owner PC 102A, of the pressing of the order prints button 3009 on the owner album screen 3000, the owner user can order prints from the same image data in an album as that in the case of the guest user described above. In the present embodiment, the owner user can order prints from any of his/her albums.

Figure 42:
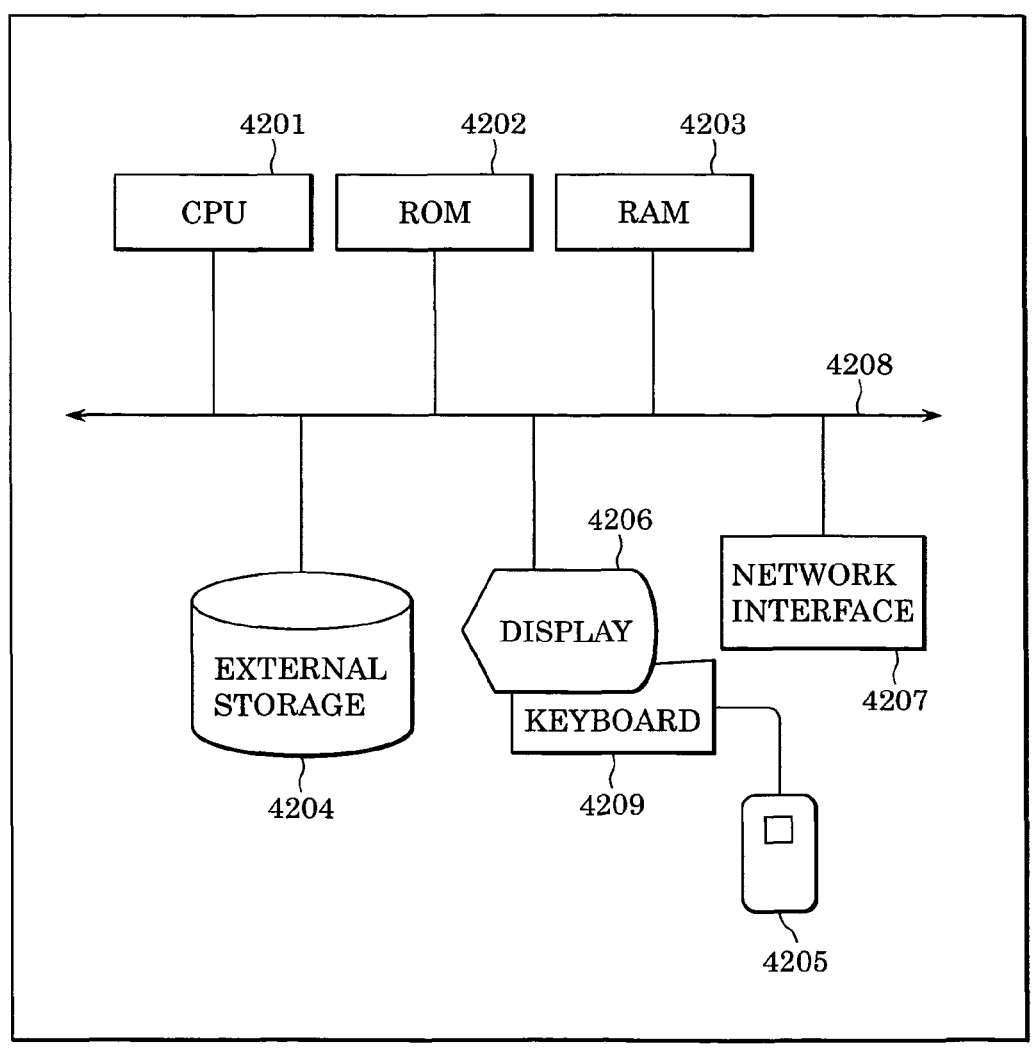
FIG. 42 is a block diagram showing the structure of a computer apparatus of the present invention.

FIG. 42 illustrates a server apparatus constituting the photo site 105 and print site 109 of the embodiments of the present invention, and a computer apparatus constituting the owner PC 102A and guest PC 102B of the embodiments of the present invention. Each of the server apparatuses and the PC may be composed of a single computer apparatus, or may be composed, as necessary, of a plurality of units with different functions that are connected via a communication line, such as a local area network (LAN), so that they can communicate with each other.

In FIG. 42, a CPU 4201 controls the computer apparatus. A read only memory (ROM) 4202 stores programs and parameters requiring no modification. A random access memory (RAM) 4203 temporarily stores programs and data supplied from external units and the like. An external storage 4204 is a hard disk or memory card installed in the computer apparatus, or a removable unit removable from the computer apparatus, such as a floppy disk (FD), an optical disk such as a compact disk (CD), a magnetic card, an optical card, an integrated circuit (IC) card, and a memory card. The external storage 4204 is connected, via an interface, to input devices, such as a pointing device 4205 and a keyboard 4209 for data entry by the user. A monitor 4206 is connected to the computer apparatus via an interface, and displays data stored or supplied to the computer. A network interface 4207 is provided for connection to a network, such as the Internet 104. A system bus 4208 connects the above-described components 4201 to 4207 such that they can communicate with each other.

In the present invention, a storage medium on which a software program code for performing the functions of the above-described embodiments is recorded may be supplied to a system or apparatus such that a computer (or CPU or microprocessing unit (MPU)), that is, the system or apparatus reads out and executes the program code stored in the storage medium. In this case, the program code read out from the storage medium performs the functions of the above-described embodiments, so that the storage medium storing the program code constitutes the present invention.

Examples of the storage medium for supplying the program code include a floppy disk, a hard disk, an optical disk, a magneto-optical disk, a compact disk-ROM (CD-ROM), a CD-recordable (CD-R), a magnetic tape, a non-volatile memory card, a ROM, and a digital versatile disk (DVD).

The functions of the above-described embodiments can be performed not only by a computer reading and executing the program code, but also by an OS running on the computer and executing all or part of the actual processing in accordance with instructions of the program code.

The functions of the above-described embodiments can also be performed, after the program code read out from the storage medium is written in an expansion unit connected to a computer or is written in a memory of a function expansion board in a computer, by a CPU or the like, which is included in the function expansion board or expansion unit, executing a whole or part of the actual processing in accordance with instructions of the program code.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application Nos. 2004-185028 and 2004-185027 filed Jun. 23, 2004, which are hereby incorporated by reference herein.

What is claimed is:

1. An application server apparatus for communicating with an owner information processing apparatus of an owner and a guest information processing apparatus of a guest on a network and making data available for a plurality of guest information processing apparatuses, the application server apparatus comprising:
   a memory unit configured to store computer-executable process steps; and
   a processor unit configured to execute the computer-executable process steps, the computer-executable process steps comprising:
      storing data uploaded from a plurality of owner information processing apparatuses and associating the data with owner identification information uniquely corresponding to owners of each of the plurality of owner information processing apparatuses;
      receiving, from one of the plurality of owner information processing apparatuses, designation of a guest to whom the data associated with the owner identification information of the owner information processing apparatus is to be available;
      receiving, from the owner information processing apparatus, a selection of data which is to be available to the designated guest, the data being selected from among the data associated with the owner identification information of the owner information processing apparatus;
      storing the selected data from among the data associated with the owner identification information by further associating the selected data with guest identification information uniquely corresponding to the designated guest;
      associating a unique guest universal resource locator (URL) with the combination of the owner identification information and the guest identification information of only one guest, wherein the unique guest URL is independent of the data;
      issuing the unique guest URL uniquely corresponding to the designated guest to the guest information processing apparatus of the designated guest;
      obtaining the data based on a combination of the owner identification information and the guest identification information corresponding to the unique guest URL that is used for accessing from the guest information processing apparatus of the designated quest; and
      transferring the obtained data to the guest information processing apparatus,
      wherein the data that the unique quest URL points to is modifiable by the owner information processing apparatus or the application server apparatus without having to send a new or updated URL to the guest information processing apparatus.

2. The application server apparatus according to claim 1, wherein the data includes album data that is an archive in which at least one image data is managed.

3. The application server apparatus according to claim 1, wherein the computer-executable process steps further comprise:
   receiving a request for printing the selected data from the owner information processing apparatus;
   storing print condition information included in the print request, in association with the selected data; and
   setting the guest identification information which is further associated with the print condition information.

4. A method for controlling an application server apparatus for communicating with an owner information processing apparatus of an owner and a guest information processing apparatus of a guest on a network, and making data available for a plurality of guest information processing apparatuses, the method comprising:
   storing data uploaded from a plurality of owner information processing apparatuses and associating the data with owner identification information uniquely corresponding to each of the plurality of owners of the owner information processing apparatuses;
   receiving, from one of the plurality of owner information processing apparatuses, designation of a guest to whom the data associated with the owner identification information of the owner information processing apparatus is to be available;

receiving, from the owner information processing apparatus, a selection of data which is to be available to the designated guest, the data being selected from among the data associated with the owner identification information of the owner information processing apparatus;

storing the selected data from among the data associated with the owner identification information by further associating the selected data with guest identification information uniquely corresponding to the designated guest;

associating a unique guest universal resource locator (URL) with the combination of the owner identification information and the guest identification information of only one guest, wherein the unique guest URL is independent of the data;

issuing the unique guest URL uniquely corresponding to the designated guest to the guest information processing apparatus of the designated guest;

obtaining the data based on a combination of the owner identification information and the guest identification information corresponding to the unique guest URL that is used for accessing from the guest information processing apparatus of the designated guest; and transferring the obtained data to the guest information processing apparatus, wherein the data that the unique quest URL points to is modifiable by the owner information processing apparatus or the application server apparatus without having to send a new or updated URL to the guest information processing apparatus.

5. A computer-readable medium having stored thereon computer-executable instructions for causing a computer apparatus to execute a method according to claim 4.

* * * * *